United States Patent [19]
Kihara

[11] B 3,995,316
[45] Nov. 30, 1976

[54] VIDEO RECORDING AND/OR REPRODUCING APPARATUS, AND RECORD ASSEMBLY FOR USE THEREIN

[75] Inventor: Nobutoshi Kihara, Tokyo, Japan
[73] Assignee: Sony Corporation, Tokyo, Japan
[22] Filed: Aug. 23, 1974
[21] Appl. No.: 500,176
[44] Published under the second Trial Voluntary Protest Program on February 3, 1976 as document No. B 500,176.

[30] Foreign Application Priority Data
Sept. 8, 1973  Japan.............................. 48-101790

[52] U.S. Cl..................................... 360/81; 360/2; 360/84; 360/132
[51] Int. Cl.²...................... G11B 5/52; G11B 5/80; G11B 25/04
[58] Field of Search.............. 360/98, 84, 86, 2, 81, 360/131, 132, 133; 206/62 P, 309–312; 353/27

[56] References Cited
UNITED STATES PATENTS

| | | |
|---|---|---|
| 2,915,596 | 12/1959 | Lyon et al............................. 360/84 |
| 3,534,182 | 10/1970 | Prochrow.............................. 360/84 |
| 3,668,310 | 6/1972 | Yano et al. ........................... 360/84 |
| 3,836,731 | 9/1974 | Wilisch et al......................... 360/86 |

Primary Examiner—Alfred H. Eddleman
Attorney, Agent, or Firm—Lewis H. Eslinger; Alvin Sinderbrand

[57] ABSTRACT

An apparatus for recording and/or reproducing at least video signal information employs, as a record medium, a record assembly including a cover, for example, in the form of a relatively rigid envelope having an open end, and at least one flexible sheet adapted to have at least video signal information recorded thereon and slidable through the open end of the envelope between a stored position, in which the sheet is substantially enclosed and protected by the envelope, and an operative position in which a major portion of said sheet is withdrawn from the envelope and a minor portion of the sheet remains within the envelope.

58 Claims, 91 Drawing Figures

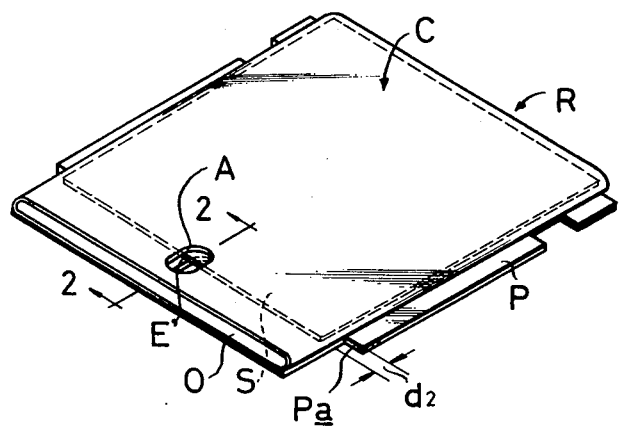
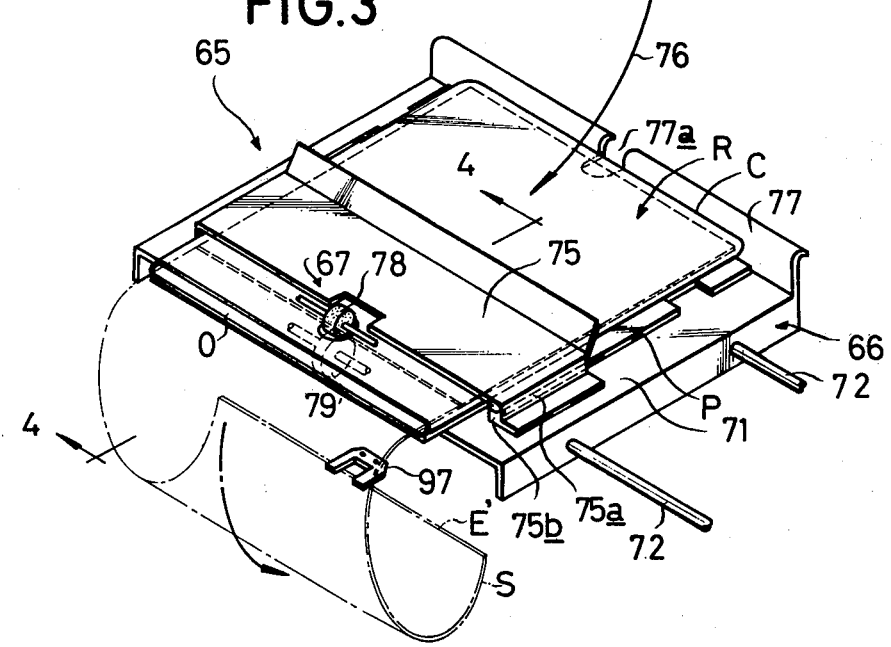

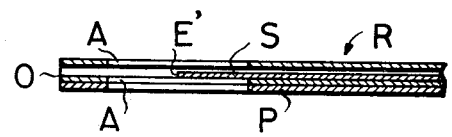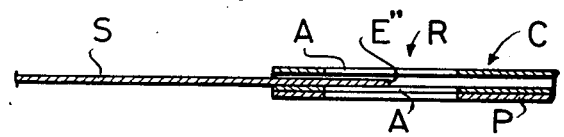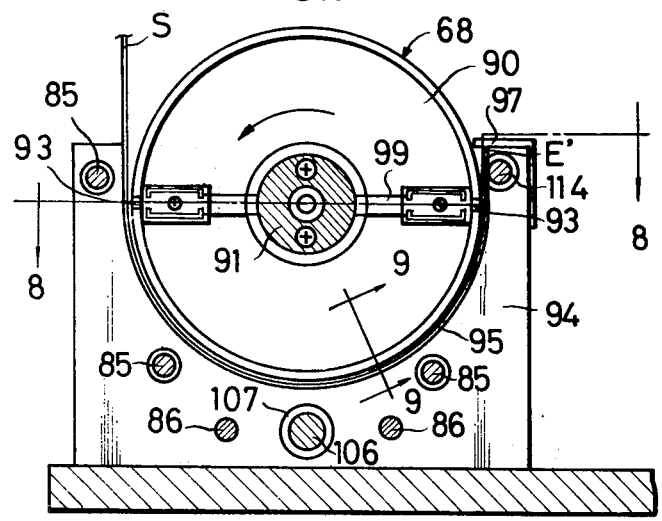

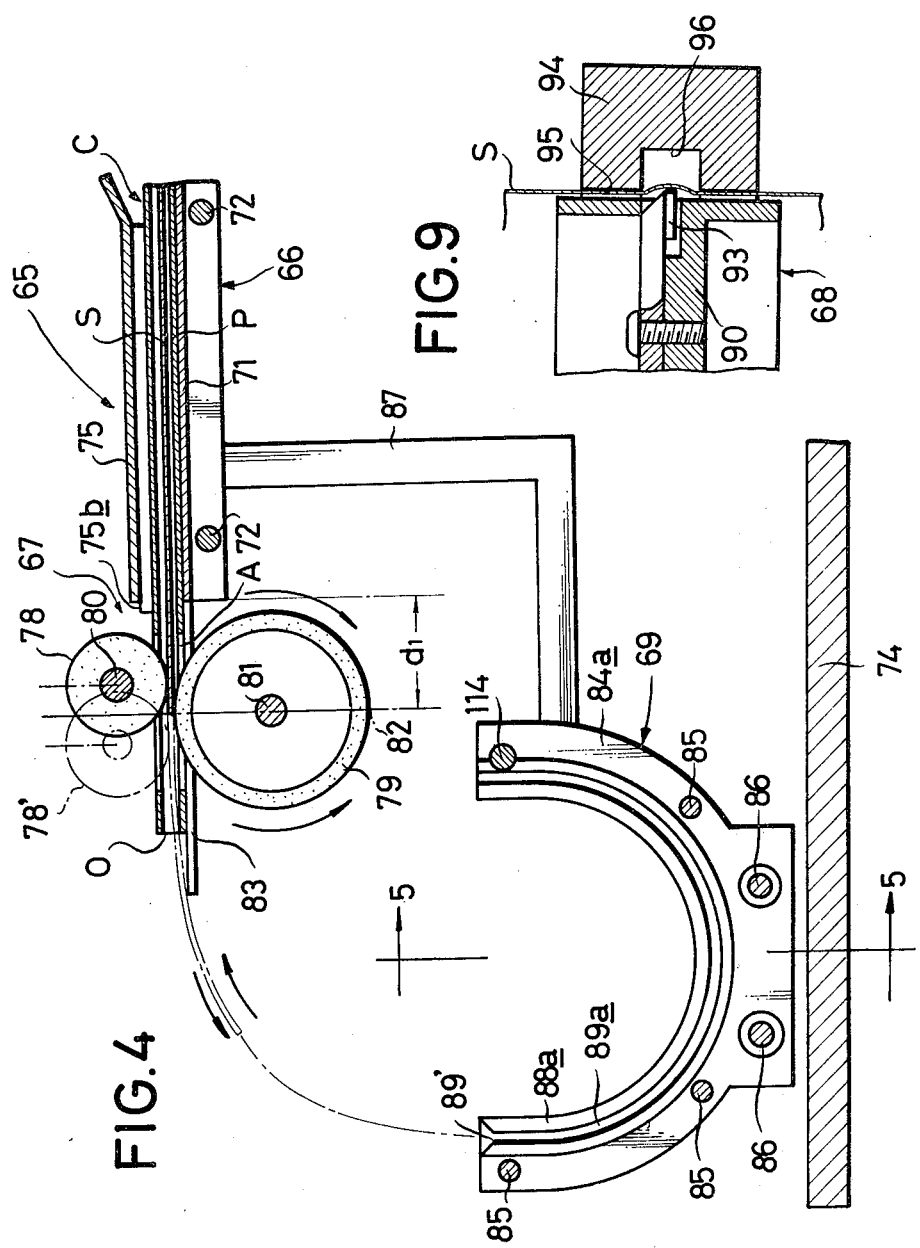

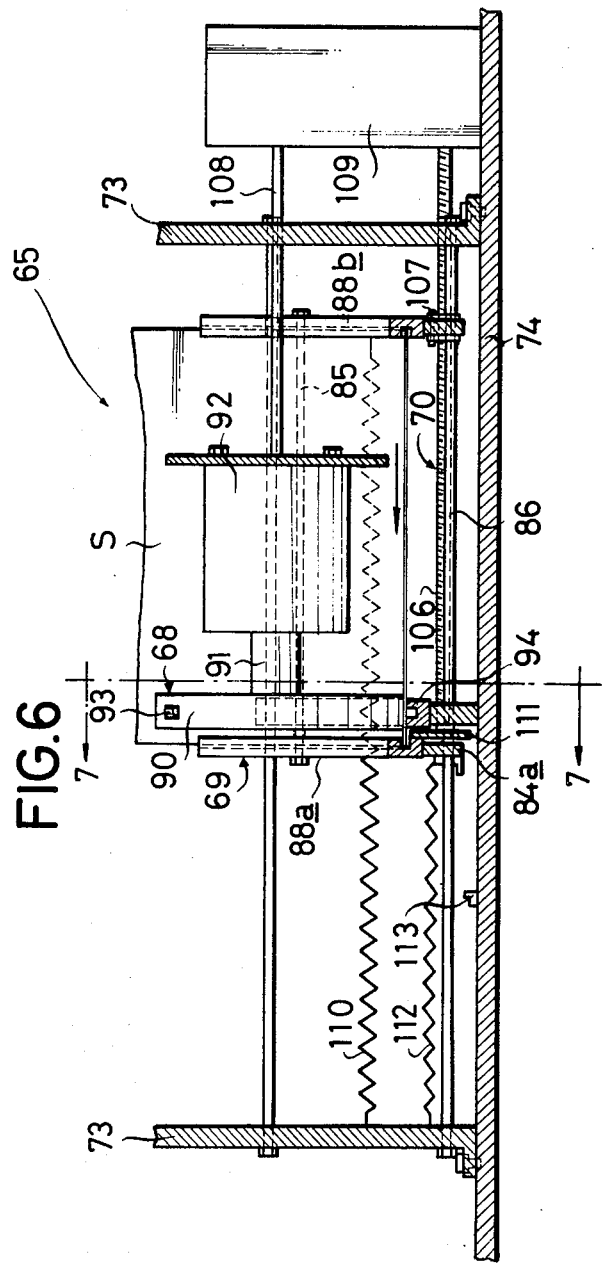

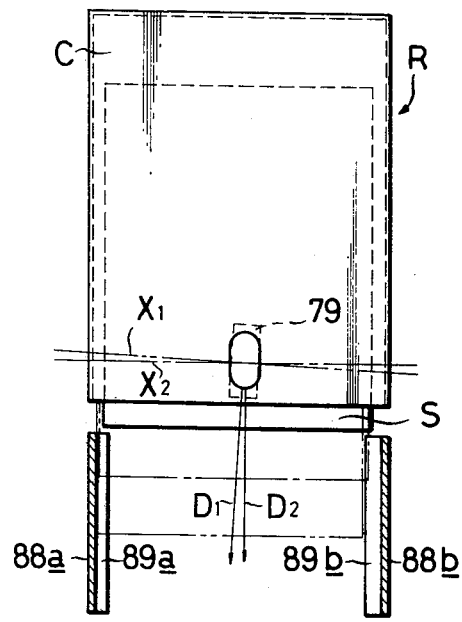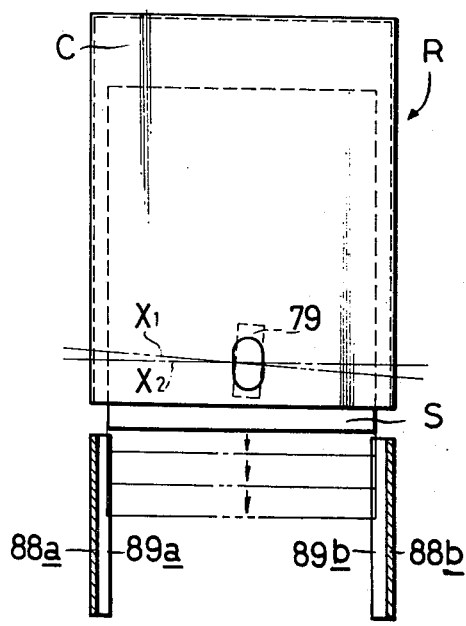

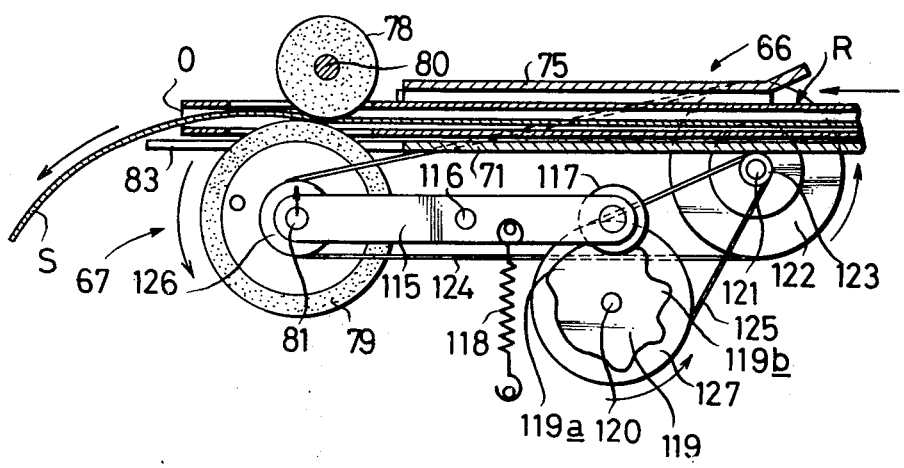
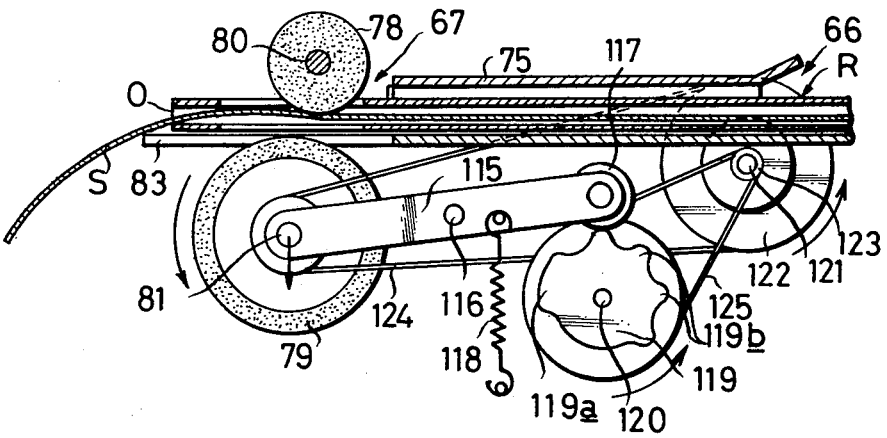

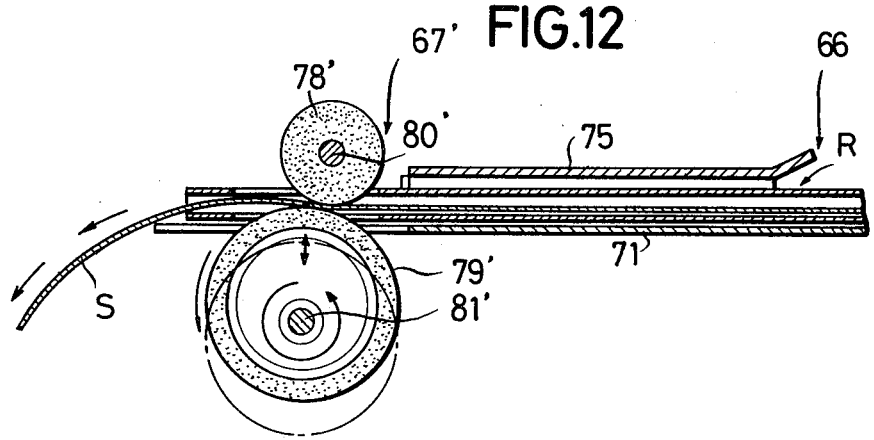
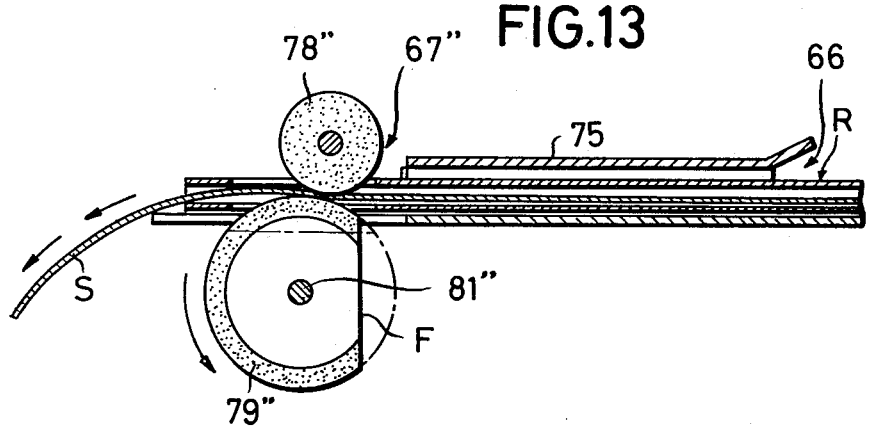

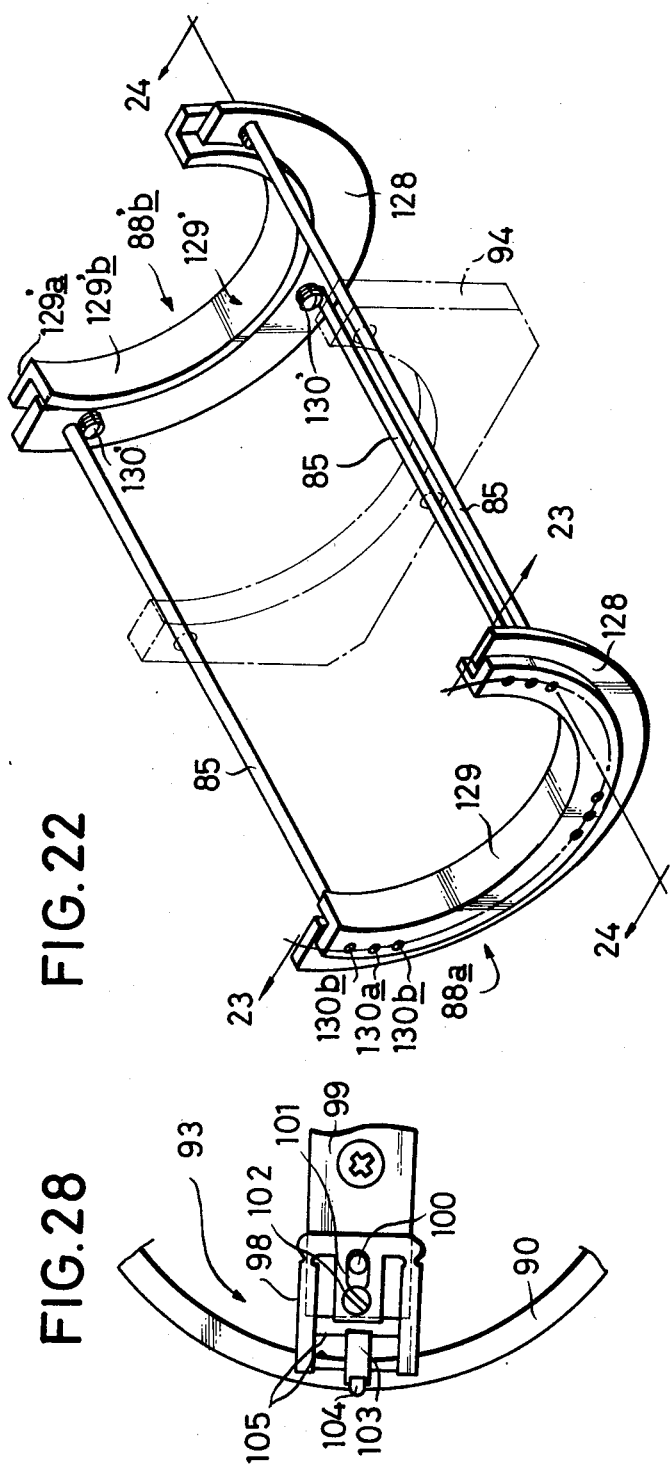

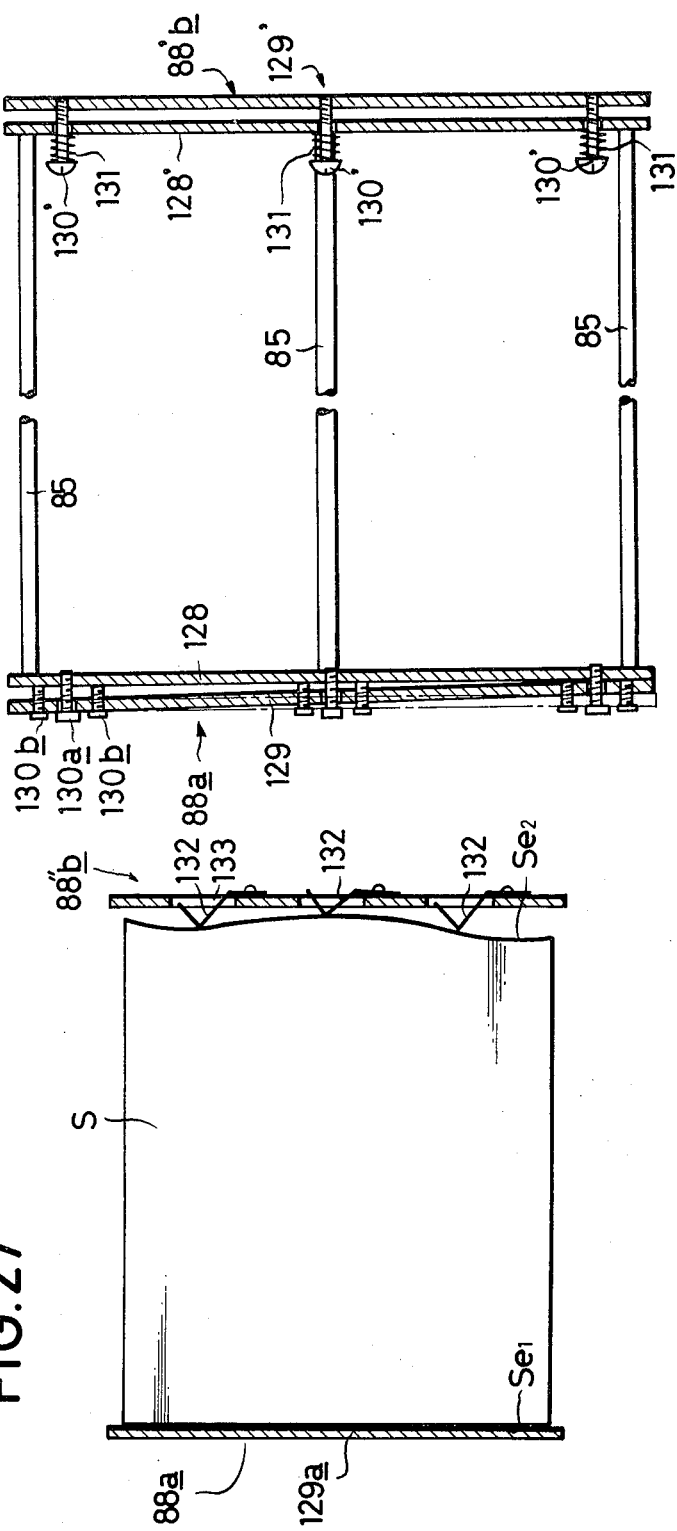

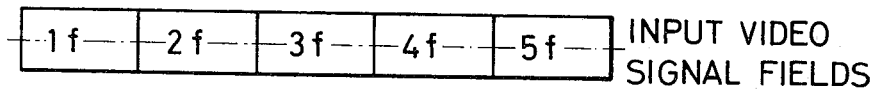
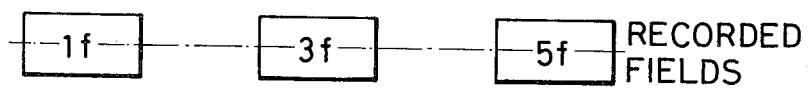
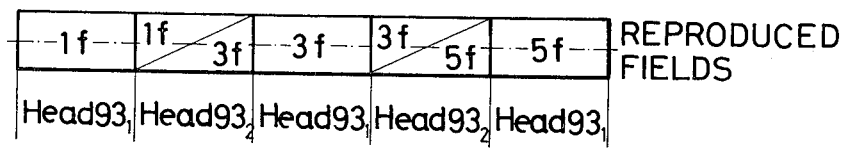
FIG. 29C
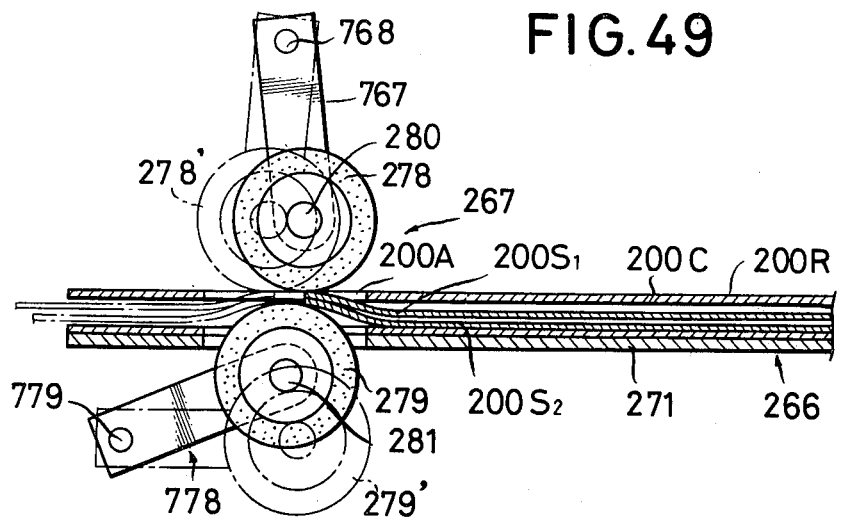
FIG. 49

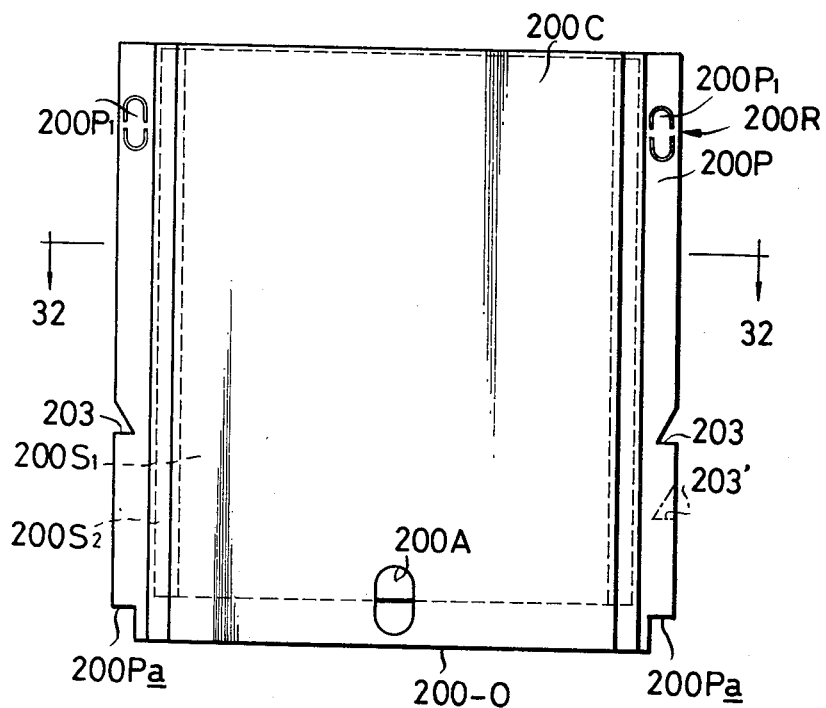
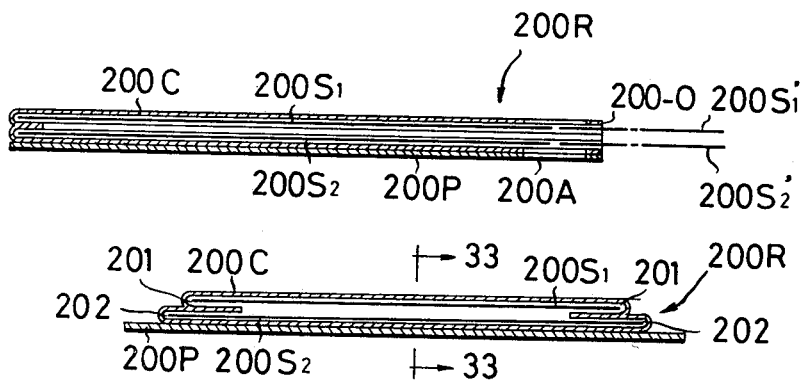

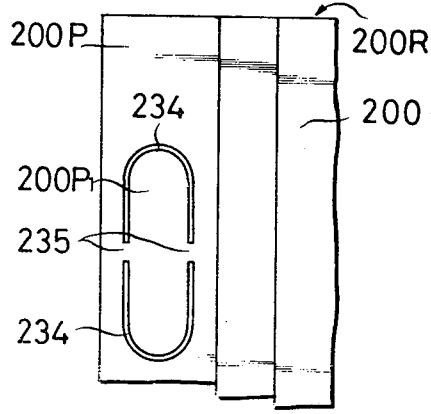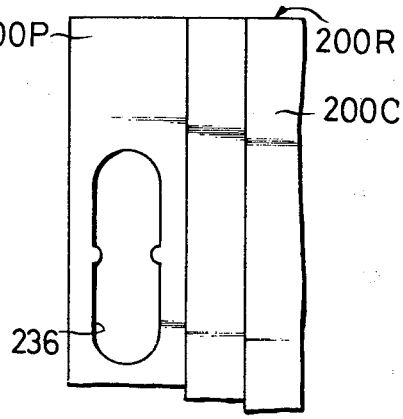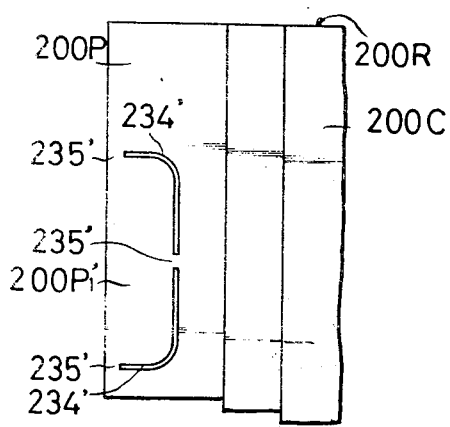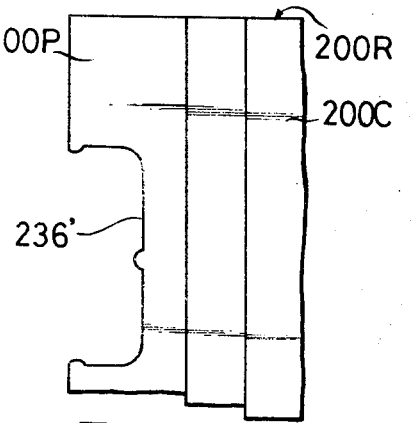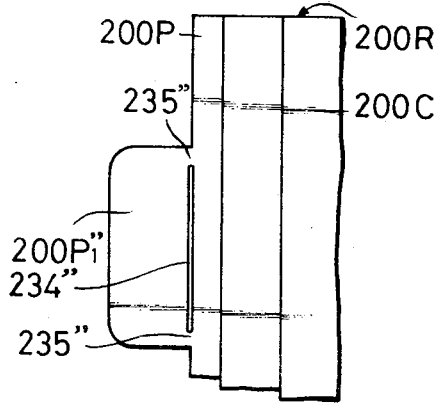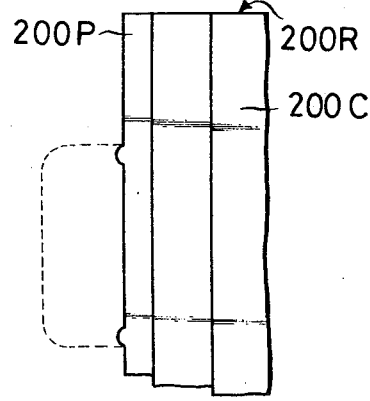

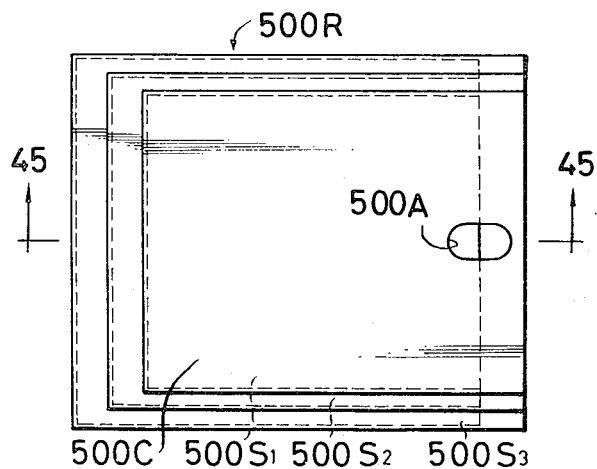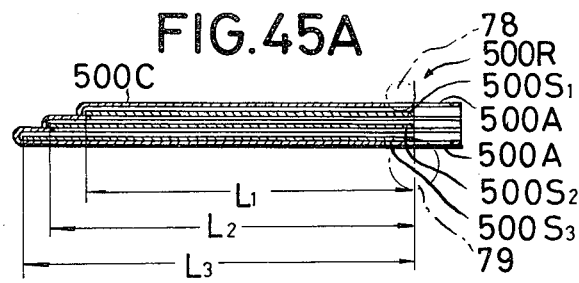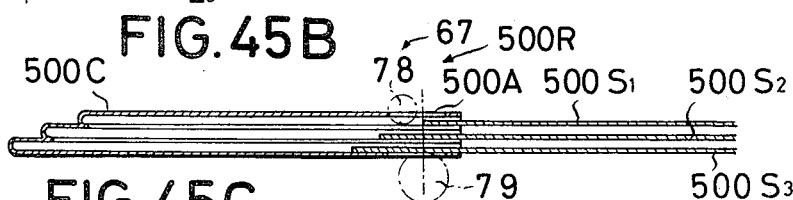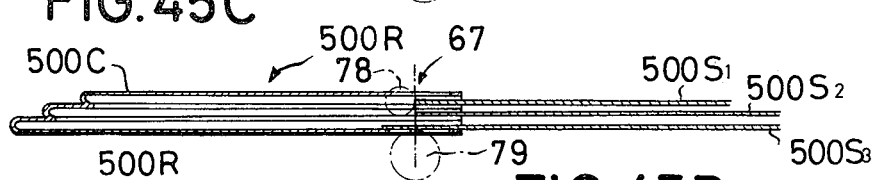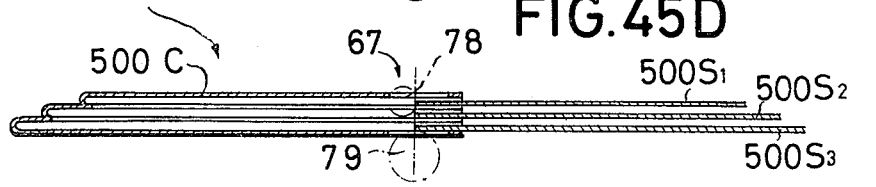

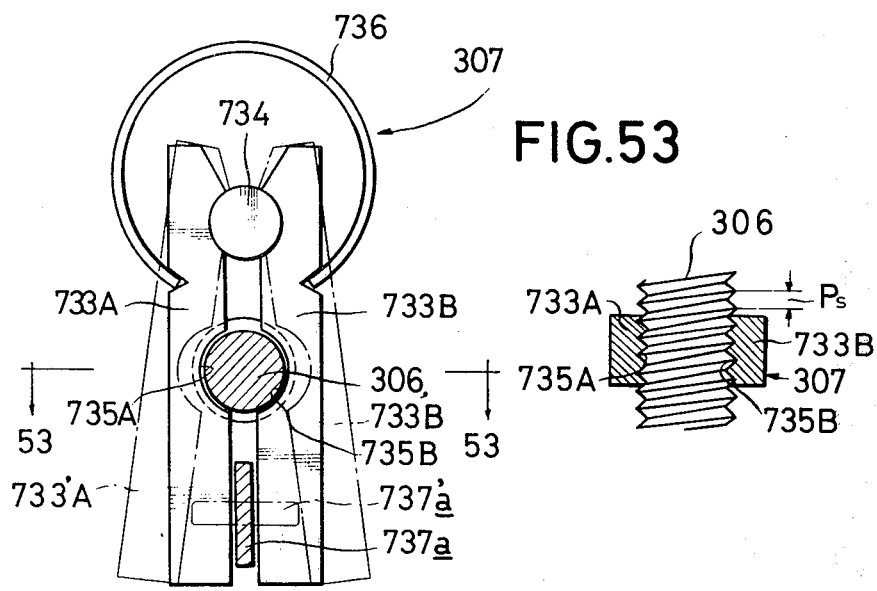
FIG.53
FIG.52
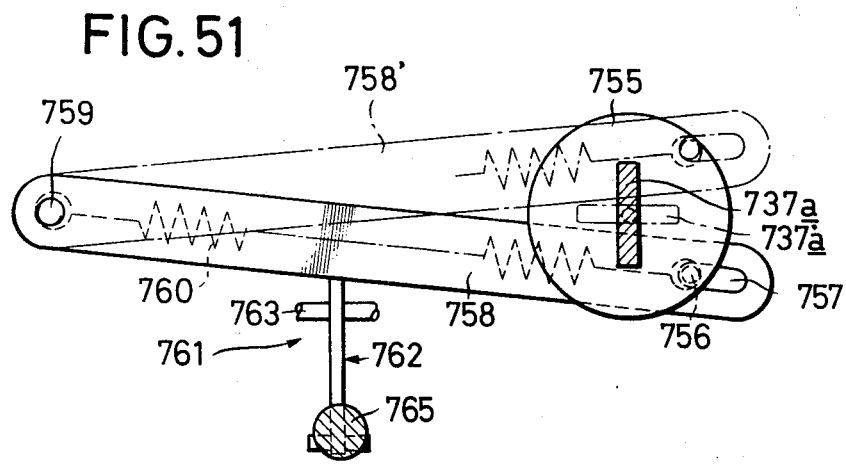
FIG.51

VIDEO RECORDING AND/OR REPRODUCING APPARATUS, AND RECORD ASSEMBLY FOR USE THEREIN

BACKGROUND OF THE INVENTION

1. Field of the Invention

This invention relates generally to an apparatus for recording and/or reproducing at least video signal information on a record sheet, and more particularly is directed to a recording and/or reproducing apparatus of the type in which signal transducers are mounted for rotation in a circular path transverse to the direction of movement of the record sheet, whereby such video signal information is recorded on and/or reproduced from the sheet in a series of parallel record tracks.

2. Description of the Prior Art

Conventional apparatus for recording and/or reproducing video signals, that is, a video tape recorder (hereinafter referred to as VTR), has employed a magnetically coated recording tape which is wound on at least one reel and which is transported from such reel in a helical path about the circular path of rotation of magnetic heads or transducers so that the latter record and/or reproduce video signal information in parallel record tracks extending obliquely across the tape. However, the reel or reels having the tape wound thereon are bulky and relatively heavy, and thus are inconvenient for transportation and storage thereof. Further, when it is desired to record or reproduce signals on a portion of the tape intermediate its ends, it is necessary to either unwind or rewind the tape on the supply reel in order to gain access to the desired portion of the tape, and such unwinding or rewinding is time consuming. If such wasted time is to be reduced, for example, by providing fast forward and rewind operating modes, the apparatus becomes undesirably complicated. The described existing apparatus is also disadvantageous in that special operations are required for still- or slow-motion reproduction.

The existing VTR employing magnetic tape as the recording medium, as described above, requires a highly accurate servo system for ensuring that the transducers accurately scan the record tracks during recording and/or reproducing operations. In cases where the magnetic tape is contained in a cassette, relatively complex mechanisms are required for withdrawing the tape from the cassette housing and training the withdrawn tape about the usual guide drum associated with the rotary heads or transducers. Finally, in the case of video signals recorded on magnetic tape, as aforesaid, the mass reproduction of the recorded tape is difficult and expensive.

It has been proposed, for example, in U.S. Pat. No. 2,915,596, issued Dec. 1, 1959, to record and/or reproduce intelligence or information on a sheet of paramagnetic material in an apparatus that comprises a cabinet provided with an interiorly directed, semi-cylindrical guide channel into which the sheet is insertable in the direction of curvature of the channel so as to engage a straight margin of the sheet with an abutment extending parallel to the longitudinal axis of the semi-cylindrical channel for guiding the sheet in its slidable movement within the channel parallel to that axis by means of a rotated drive roller extendable into the channel. Rotary magnetic transducers or heads are moved in a circular path that substantially coincides with the curvature of the channel for recording or reproducing signals on the sheet therein, with the slidable movement of the sheet and the rotary movement of the transducers combining to cause the transducers to scan spaced-apart, parallel record tracks on a portion of the sheet. The foregoing arrangement is disclosed specifically only for the magnetic recording and reproducing of sound and is suitable, if at all, only for that purpose. If an attempt is made to employ the apparatus disclosed in U.S. Pat. No. 2,915,596 for recording and/or reproducing video signal information, the spaced apart relation of the successive record tracks and the consequent poor utilization of the sheet area for the recording of signal information results in a relatively short playing time for each sheet. Further, the existing apparatus, as aforesaid, is incapable of simultaneously recording and/or reproducing both video signal information and associated audio signal information. It is also apparent that the sheets employed individually as the recording medium in the existing apparatus have their para-magnetic coatings exposed to damage when not in use, particularly after recording, and futher that such sheets are susceptible to creasing when not in use or when being inserted into the apparatus, particularly if formed of desirably thin film material.

It has also been proposed, for example, as in German patent application No. P 21 43 382.9, filed Aug. 26, 1971, and No. P 21 50 524.8, filed Oct. 6, 1971, to record video signal information on a record disc which is normally contained in a protective cover or envelope and which, in the recording and/or reproducing apparatus, is fully removed from the cover or envelope and displaced to an operative position where the disc is rotated about its center while being scanned by a transducer or head in a spiral track. The foregoing arrangement is undesirable in that difficulties are experienced in returning the disc to the protective cover or envelope at the completion of a recording or reproducing operation, and further in that the conditions necessary for high fidelity recording and reproducing of video and audio signals are not realized. Further, the last proposed arrangement provides an undesirably short playing time for the recording or reproducing of the video signals.

SUMMARY OF THE INVENTION

Accordingly, it is an object of this invention to provide an improved recording and/or reproducing apparatus in which at least video signal information is recorded on a recording sheet by rotating transducer means.

Another object of this invention is to provide an improved apparatus, as aforesaid, in which audio signal information, as well as video signal information is recorded on one or more flexible sheets by means of respective rotary transducers or heads.

A further object is to provide an improved apparatus, as aforesaid, in which the video signal information and the audio signal information are recorded in respective series of parallel record tracks on one or more flexible record sheets, and such sheet or sheets, when not in use, are protected from damage within a relatively rigid cover or envelope.

Still another object is to provide an apparatus, as aforesaid, with improved devices for feeding the sheet or sheets from the protective cover or envelope to an operative position extending about at least a portion of the circular path of travel of the respective rotary transducers, and for returning the sheet or sheets to a stored position within the cover.

A still further object is to provide an apparatus, as aforesaid, with improved guiding means for positioning each record sheet during the recording or reproducing of signal information thereon.

Still another object is to provide an apparatus, as aforesaid, in which the various operations thereof are performed substantially automatically so as to minimize the intervention required by an operator of the apparatus.

In accordance with an aspect of this invention, an apparatus for recording and/or reproducing at least video signal information employs a record assembly which includes a protective cover, for example, in the form of an envelope having an open end, and at least one flexible sheet adapted to have at least video signal information recorded thereon and being movable in respect to said cover between a stored position, in which the sheet is substantially enveloped and protected by said cover, and an operative position in which a major portion of said sheet is withdrawn from said cover while a minor portion of the sheet remains within the cover. The recording and/or reproducing apparatus generally comprises a sheet driving device operative selectively for moving each sheet relative to the cover from its stored position to its operative position and for returning the sheet to its stored position from the operative position, rotary signal transducers movable in a circular path about an axis substantially at right angles to the direction of movement of the sheet between its stored and operative positions, sheet guides receiving each sheet during the movement of the latter to its operative position and guiding the major portion of the sheet in an arcuate path substantially coinciding with at least a portion of said circular path of travel of the respective rotary signal transducers, and translating means for moving the record assembly and the rotary signal transducers relative to each other in directions parallel to the axis of rotation of the rotary signal transducers so that the latter scan successive parallel record tracks on the major portion of the sheet in said arcuate path.

In a preferred embodiment of the invention, the rotary signal transducers are fixed in the direction of their axis of rotation, the translating means includes a carriage supporting the sheet guides and being movable parallel to the axis of rotation between spaced apart starting and terminal positions, a holder is fixed relative to the carriage for receiving and positioning the cover of the record assembly in respect to the sheet guides, and means are provided for driving the carriage from the starting position to the terminal position, and for returning the carriage from its terminal position to the starting position.

Further, it is a feature of the apparatus according to this invention, as aforesaid, that, upon the disposition of the cover or envelope of the record assembly at a loaded position on the holder, the sheet driving device is operable to move each sheet from its stored position to its operative position for recording or reproducing operation, and that, upon the arrival of the carriage at its terminal position, the carriage is automatically returned to its starting position and the sheet driving device is then operable to return each sheet to its stored position within the cover or envelope, whereupon, the cover or envelope is ejected from its loaded position on the holder.

The above, and other objects, features and advantages of the invention, will be apparent in the following detailed description of illustrative embodiments which is to be read in connection with the accompanying drawings.

BRIEF DESCRIPTION OF THE DRAWINGS

FIG. 1 is a perspective view of a record assembly according to an embodiment of this invention which includes a single flexible record sheet;

FIG. 2A and 2B are enlarged, fragmentary sectional views taken along the line 2—2 on FIG. 1, and respectively showing the record sheet in its stored and operative positions;

FIG. 3 is a schematic perspective view illustrating the record assembly of FIG. 1 in a loaded position on a holder therefor, and showing the record sheet in its operative position, in broken lines, with a major portion of the sheet disposed in an arcuate path for the recording or reproducing of signal information thereon;

FIG. 4 is an enlarged vertical sectional view taken along the line 4—4 on FIG. 3, and further schematically illustrating components of an apparatus according to this invention by which the record sheet is moved between its operative and stored positions and, when in its operative position, has a major portion of the sheet guided in the arcuate path shown on FIG. 3;

FIG. 6 is a view similar to that of FIG. 5, but with the carriage being shown in its terminal position;

FIG. 7 is an enlarged sectional view taken along the line 7—7 on FIG. 6 for showing the association of the transducer assembly with a sheet support;

FIG. 9 is a further enlarged, detail sectional view taken along the line 9—9 on FIG. 7 for showing the mannner in which the sheet support ensures uniform contact pressure of each signal transducer or head with the record sheet;

FIGS. 10A and 10B are diagrammatic views to which reference will be made in describing the advantages of intermittent driving of the record sheet between its storage and operative positions;

FIGS. 11A and 11B are detail elevational views of a device for the intermittent driving of the sheet in accordance with one embodiment of this invention;

FIGS. 12 and 13 are view similar to FIGS. 11A and 11B, but showing other embodiments of devices according to this invention for the intermittent driving of the record sheet between its stored and operative positions;

FIG. 22 is a perspective view illustrating another embodiment of sheet guides according to this invention for avoiding the condition illustrated by FIGS. 18A and 18B;

FIG. 23 is a developed sectional view taken along the line 23—23 on FIG. 22;

FIG. 27 is a diagrammatic view illustrating the operation of the sheet guide shown on FIGS. 25 and 26;

FIG. 28 is an enlarged schematic view illustrating the preferred mounting for each signal transducer in the recording and/or reproducing apparatus according to this invention;

FIG. 29C is a diagram illustrating the relationship of input video signals, recorded signals and reproduced signals when the field skip technique is employed in the recording of video signals with an apparatus according to this invention;

FIG. 31 is a plan view of a record assembly according to another embodiment of this invention, and in which the cover or envelope contain two record sheets;

FIG. 32 is a transverse sectional view taken along the line 32—32 on FIG. 31;

FIG. 33 is a longitudinal sectional view taken along the line 33—33 on FIG. 32;

FIGS. 40A–40C illustrate various forms of removable portions provided on the cover or envelope of the record assembly for indicating, by their absence as on FIGS. 40A'–40C', that the contained record sheets have signal information recorded thereon which is not to be erased.

FIG. 44 is a schematic plan view of a record assembly according to still another embodiment of this invention;

FIGS. 45A–45D are longitudinal sectional views taken along the line 45—45 on FIG. 44 and showing the record sheets in various positions relative to the cover or envelope;

FIG. 49 is a sectional view similar to that of FIG. 11A, but illustrating the sheet driving device of the apparatus shown on FIGS. 48A and 48B;

FIG. 51 is a detail sectional view taken along the line 51—51 on FIG. 50;

FIG. 52 is an enlarged sectional view taken along the line 52—52 on FIG. 48A;

FIG. 53 is a detail sectional view taken along the line 53—53 on FIG. 52;

DESCRIPTION OF THE PREFERRED EMBODIMENTS

Figure 5:
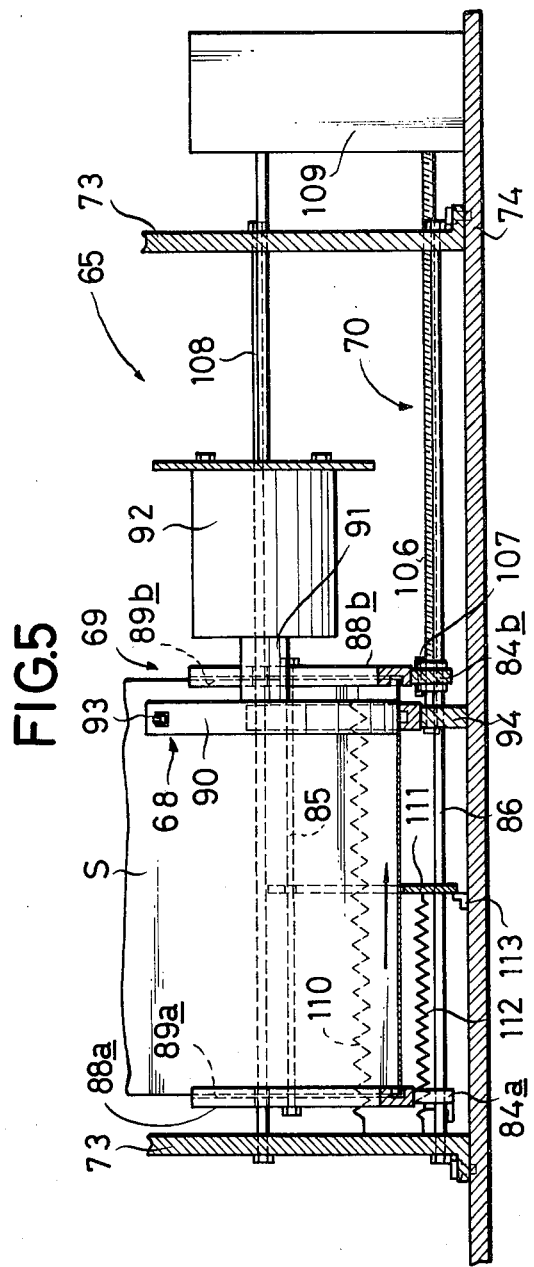
FIG. 5 is a schematic sectional view taken along the line 5—5 on FIG. 4, and further showing a rotary transducer assembly for recording and/or reproducing signal information on the major portion of the record sheet in the above mentioned arcuate path, and a carriage supporting the sheet guides and to which translatory movements are imparted for moving the record sheet in directions parallel to the axis of rotation of the transducer assembly, with such carraige being shown in its starting position.

Referring to the drawings in detail, and initially to FIGS. 1, 2A and 2B thereof, it will be seen that a record medium in accordance with this invention for the recording and reproducing of at least video signal information may be in the form of a record assembly R comprising a cover C and at least one flexibly resilient record sheet S which is movable in respect to the cover C between a stored position (FIGS. 1 and 2A), in which sheet S is substantiallly enveloped and protected by cover C, and an operative position (FIG. 2B) in which a major portion of sheet S is withdrawn from cover C while a minor portion of the sheet remains within the cover. When the record sheet S is to have signal information magnetically recorded thereof, such sheet may be formed of a flexible plastic material, such as, the plastic sheet or film material available commercially under the tradename Mylar from E.I. DuPont Company, having a thickness of 0.3 to 1.3 micron, with a magnetic coating thereon, for example, of $CrO_2$ in the case where video signal information is to be recorded on the sheet. If record sheet S is to be adapted for the magnetic recording thereon of audio signal information, the mangetic coating of the sheet may be formed of $\gamma Fe_2O_3$. Further, if both video signal information and audio signal information are to be recorded on the same record sheet, then the flexible plastic film or substrate is provided with successive coatings of $\gamma Fe_2O_3$ and $CrO_2$. With such a record sheet, the audio signal information is initially recorded thereon, whereupon, the sheet is heated so as to erase the audio signal information from the $CrO_2$-coating, and then the video signal information is recorded on the $CrO_2$ coating. When both the audio signal information and the video signal information are recorded on coextensive areas of the record sheet, the reproduced audio and video signals are separated from each other by suitable filters.

As is apparent on FIG. 1, the record sheet S is preferably of substantially rectangular configuration, and the cover or envelope C is similarly of substantially rectangular configuration and has an open end O through which sheet S is slidable with the opposite side edges of the sheet being loosely guided by the corresponding sides of cover or envelope C. The cover or envelope C is preferably relatively rigid and may be formed, for example, of cardboard or the like, and is preferably cemented or otherwise secured on a relatively rigid base or plate P, for example, of a rigid plastic material, which is laterally dimensioned so that the opposite side portions of base P extend laterally beyond the adjacent sides of cover or envelope C.

In order that a limited area of sheet S is exposed even when the sheet is in its stored position, and at which the sheet may be engaged for movement of the sheet toward its operative position, the opposed walls of cover or envelope C and the underlying base plate P are formed with registering cutouts or apertures A adjacent the open end O of the cover or envelope. Sheet S is longitudinally dimensioned so that, in its stored position, the end edge E' of the sheet adjacent open end O of the cover or envelope will be spaced inwardly from such open end and will extend across cutouts or apertures A intermediate the ends of the latter (FIGS. 1 and 2A). Further, as shown on FIG. 2B, in the operative position of record sheet S, the opposite or trailing end edge E" of the record sheet extends across cutouts or apertures A intermediate the ends of the latter for a purpose that will hereinafter be described in detail.

Figure 14A:
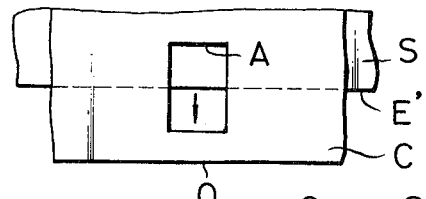
FIGS. 14A–14F are diagrammatic plan views of cutouts of various configurations that may be provided in the cover or envelope of record assemblies according to this invention for permitting engagement of the record sheet in such cover or envelopes by a sheet driving device.
Figure 14B:
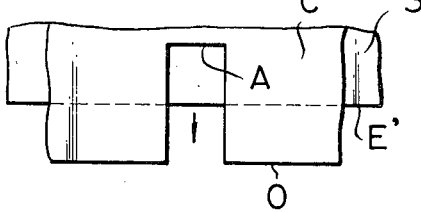
Figure 14C:
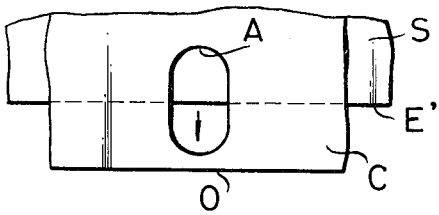
Figure 14D:
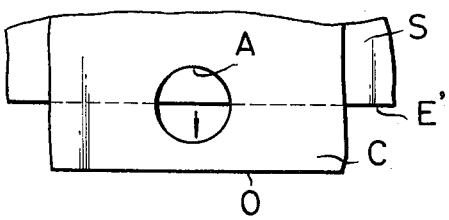
Figure 14E:
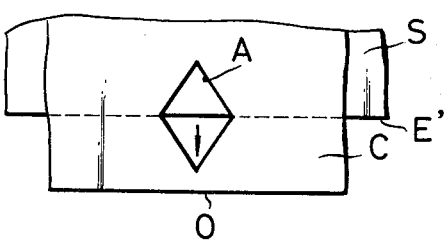
Figure 14F:
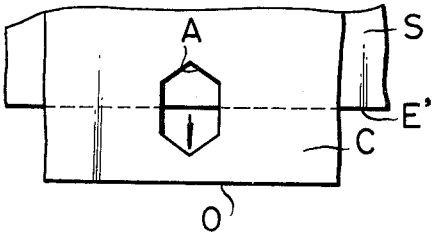

Since record sheet S is formed of a thin, flexible film or sheet material, the end edges E' and E'' of the record sheet can bow into the cutouts or apertures A in the stored and operative positions, respectively, of the record sheet. Therefore, if the apertures or cutouts A are provided with rectangular configurations, that is, have opposite end portions extending parallel to the transverse direction of sheet S, as shown on FIG. 14A, the end edges E' and E'' of the sheet may engage the opposite end edges of the cutouts or apertures A and interfere with the movement of sheet S from its stored position to its operative position, and from its operative position to its stored position, respectively. If the rectangular cutouts or apertures A are made to extend to the open end O of cover C, as on FIG. 14B, then interference with movement of sheet S from its stored position to its operative position is avoided, however, the inner ends of the rectangular cutouts or apertures A may still be engaged by the trailing end edge E'' of the sheet to interfere with movement of the latter from its operative position to its stored position. Accordingly, the cutouts or apertures A are preferably formed so as to have ends which extend at substantial angles to the transverse direction of the sheet S. For example, the cutouts or apertures A may be elongated in the longitudinal direction of sheet S and have rounded opposite ends (FIG. 14C), or the cutouts or apertures A may be circular (FIG. 14D), diamond-shaped (FIG. 14E) or hexagonal (FIG. 14F).

Referring now to FIGS. 3–6, it will be seen that an apparatus 56 in accordance with this invention for recording and/or reproducing signal information on sheet S of record assembly R generally comprises a holder 66 for receiving and positioning cover or envelope C, a sheet driving device 67 (FIGS. 3 and 4) operative selectively for moving sheet S relative to cover C from its stored position to its operative position and for returning the sheet to its stored position from the operative position, a rotary signal transducer assembly 68 (FIGS. 5 and 6) movable in a circular path about an axis substantially at right angles to the direction of movement of sheet S between its stored and operative positions, a sheet guiding assembly 69 (FIGS. 4–6) receiving the sheet S during movement of the latter to its operative position and guiding the major portion of the sheet in an arcuate path substantially coinciding with at least a portion of the circular path of travel of the rotary signal transducer assembly 68, and translating means 70 for moving the holder 66 and sheet guiding assembly 69, as a unit, and hence record assembly R, and the rotary signal transducer assembly 68 relative to each other in directions parallel to the axis of rotation of transducer assembly 68 so that transducers or heads of the latter scan successive parallel record tracks on the major portion of sheet S in the arcuate path defined by guide assembly 69.

As shown on FIGS. 3 and 4, the holder 66 for receiving and positioning record assembly R may simply comprise a substantially horizontal table 71 which is laterally slidable on guide rails or rods 72 extending parallel to the axis of rotation of transducer assembly 68 and being supported, at their ends, by upright walls 73 (FIGS. 5 and 6) which are spaced apart on a base 74. A locating member 75 for record assembly R extends across the forward portion of table 71 and has depending side flanges 75a secured to the table so that record assembly R can be inserted in the direction of the arrow 76 on FIG. 3 under locating member 75 with open end O of cover or envelope C projecting forwardly from the locating member. When record assembly R is thus inserted, the opposite side edges of base plate P slidably engages the inner surfaces of flanges 75a for laterally locating record assembly R on table 71. Further, flanges 75a of the locating member have inwardly directed tabs or abutments 75b at their forward ends (FIG. 3) engageable by shoulders Pa formed on the laterally projecting side edge portions of base plate P adjacent open end O of cover or envelope C (FIG. 1), whereby to longitudinally locate cover or envelope C in respect to table 71. An upstanding rim 77 (FIG. 3) extends across the back end of table 71 for engagement with the adjacent end edge of base plate P when record assembly R is loaded on table 71 so as to hold shoulders Pa in contact with abutments 75b. Thus, the loaded position of record assembly R on table 71 is accurately determined. In order to facilitate removal of record assembly R from table 71, rim 77 and the adjacent back end portion of table 71 may be formed with a cutout 77a at which the back end portion of cover C can be grasped for lifting above rim 77 prior to the withdrawal of record assembly R from under locating member 75 in the direction opposed to the arrow 76.

As shown on FIG. 4, sheet driving device 67 generally includes cooperating rollers 78 and 79 having at least their peripheries formed of rubber and being respectively rotatably mounted above and below the forward portion of table 71 on shafts 80 and 81. The lower roller 79, which may be a driving roller, is adapted to extend upwardly through a suitable cutout 83 provided in the forward portion of table 71, and the axis of its shaft 81 lies in a vertical plane 82 which is spaced forwardly from abutments 75b by a distance $d_1$ which is substantially equal to the distance $d_2$ (FIG. 1), in the longitudinal direction of cover C, between shoulders Pa and the center of cutouts or apertures A. Thus, when cover C is in its loaded position on holder 66, driving roller 79 is adapted to extend upwardly through cutouts A in base plate P and in the lower wall of cover C for engagement with the limited area of sheet S exposed at such cutouts. The upper roller 78, which may constitute a pinch roller and may be smaller in diameter than driving roller 79, as shown, has its shaft 80 suitably mounted for limited movement in the fore and aft direction, that is, in the longitudinal direction of the sheet S, between a first position shown in full lines on FIG. 4, in which the axis of shaft 80 is in back of the vertical plane 82 extending through the axis of shaft 81, and a second position indicated in broken lines at 78' on FIG. 4, in which the axis of shaft 80 is spaced forwardly from plane 82. In such first and second positions of pinch roller 78, the latter is adapted to extend through cutout A in the top wall of cover C located at its loaded position for selective engagement with the area of sheet S exposed at such cutout.

When the sheet driving device 67 is to be operated for moving sheet S from its stored position (FIG. 2A) to its operative position (FIG. 2B), pinch roller 78 is disposed in its first position shown in full lines on FIG. 4, and thus is engageable through cutout A in the top wall of cover C with the leading edge portion of the sheet exposed at such cutout. With pinch roller 78 being thus positioned and driving roller 79 being suitably rotated in the counterclockwise direction, as viewed on FIG. 4, rollers 78 and 79 cooperate to drive sheet S engaged therebetween toward the left, that is, in the direction out of the open end O of cover C. Rollers 78 and 79 continue their cooperative action in driving sheet S in the direction out of cover C until sheet S arrives at its operative position (FIG. 2B) and thus has its trailing end edge E'' located at the middle of cutouts A, that is, approximately at the plane 82 on FIG. 4. Thus, when sheet S attains its operative position, pinch roller 78 has ridden off the trailing end edge E'' of the sheet and can no longer press the latter against driving roller 79 with the result that the driving of the sheet is halted.

When it is desired to operate sheet driving device 67 for returning sheet S from its operative position to its stored position within cover C on holder 66, the pinch roller is shifted to its second position shown in broken lines at 78' on FIG. 4, whereby to engage the trailing end edge portion of the sheet exposed at cutout A in the top wall of cover C, and driving roller 79 is then rotated in the clockwise direction, as viewed on FIG. 4. As a result of the foregoing, rollers 78 and 79 cooperate to drive sheet S therebetween in the direction toward the right, as viewed on FIG. 4, with the result that sheet S is moved longitudinally into cover C. When sheet S has been returned to its stored position in cover C (FIG. 2A), that is, when the leading end edge E' of the sheet extends across the middle of cutouts A, pinch roller 78 in its forward position indicated in broken lines at 78' rides off the forward or leading edge portion of sheet S and is no longer capable of pressing the sheet against driving roller 79 with the result that driving of the sheet ceases with the latter returned to its stored position.

By reason of the flexibly resilient character of record sheet S, the latter flexes or curves downwardly as it moves off the forward edge of table 71 when being driven by sheet driving device 67 from the stored position toward the operative position of the record sheet. As shown on FIGS. 4, 5 and 6, the sheet guiding assembly 69 for receiving sheet S during movement of the latter to its operative position may be in the form of a carriage composed of side members 84a and 84b fixed relative to each other in spaced apart, parallel relation by spacing rods 85, and being slidably mounted on guide rods 86 which extend between upright walls 73 parallel to the axis of rotation of rotary transducer assembly 68. Carriage 69 and holder 66 are suitably joined together, as indicated schematically at 87 on FIG. 4, so as to be movable as a unit along guide rods 72 and 86 between a starting position of carriage 69 (FIG. 5) and a terminal position (FIG. 6). Arcuate guide members 88a and 88b are mounted on side members 84a and 84b and define respective guide grooves 89a and 89b which open, in the direction of the axis of rotation of rotary transducer assembly 68, toward each other and which are generally U-shaped so that the opposite ends of each guide groove open upwardly. Side members 84a and 84b are located relative to each other and relative to hold 66 so that the lateral distance between the inner surfaces of grooves 89a and 89b will substantially correspond to the width of sheet S, and further so that when the sheet S flexes downwardly from the front edge of table 71 during driving of the sheet toward its operative position, the opposite side edges of sheet S, adjacent its leading end edge E', will move downwardly into the upwardly opening entry ends 89' of grooves 89a and 89b (FIG. 4). Thus, as sheet S continues its movement toward its operative position, a major portion of the sheet has its opposite side edges slidably received in, and guided by arcuate grooves 89a and 89b for disposing such major portion of the sheet in a corresponding arcuate path. Further, the arcuate grooves 89a and 89b are dimensioned and positioned so as to be concentric with the axis of rotation of rotary transducer assembly 68 and to make the previously mentioned arcuate path in which a major portion of the sheet is guided substantially coincide with at least a portion of the circular path of travel of the rotary transducer assembly, for example, with the lower half of such circular path of travel.

Figure 8:
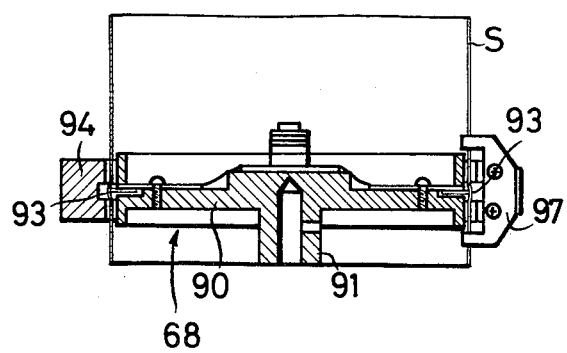
FIG. 8 is a detail sectional view taken along the line 8—8 on FIG. 7.

In the embodiment of the invention being described, the rotary signal transducer assembly 68 is fixed in the axial direction relative to base 74 and is shown to include a relatively narrow rotary drum 90 mounted, at its center, on the shaft 91 of an electric motor 92 which is suitably fixedly supported above base 74. A pair of signal transducer heads 93 (FIGS. 7-9) for example, magnetic recording and/or reproducing heads, project from the periphery of drum 90 at substantially diametrically opposed locations, and drum 90 is axially located between side members 84a and 84b of carriage 69 so as to be adjacent sheet guide member 88b in the starting position of carriage 69 (FIG. 5) and adjacent the other sheet guide member 88a in the terminal position of carriage 69 (FIG. 6.). In order to maintain proper engagement of each of the heads 93 with the inner surface of sheet S in the arcuate path of the latter about the lower half of the circular path of the heads, the apparatus 65 further preferably includes a sheet support member 94 which is suitably fixed on base 74 at the location of rotary drum 90 and which has a width, in the direction of the axis of the drum, no greater than the latter. Sheet support member 94 is provided with a U-shaped sheet support surface 95 which extends along the lower semi-circular portion of the periphery of drum 90, and which is spaced radially from the drum periphery to provide a clearance therebetween for loosely accommodating sheet S. The sheet support surface 95 has a central recess 96 extending therealong in registry with the plane of rotation of heads 93 so that the latter can press the engaged sheet into recess 96 while the sheet is accurately supported at the opposite sides of recess 96 on the surface 95 (FIG. 9).

In accordance with this invention, the sheet S is precisely located at its operative position, in the longitudinal direction of the sheet, by means of a stop 97 (FIGS. 7 and 8) mounted on an upper surface of sheet support member 94 at one side of rotary drum 90 and projecting inwardly beyond sheet support surface 95 for engagement by the leading end edge E' of the sheet. Sheet S is longitudinally dimensioned so that, when its leading end edge E' engages stop 97, as on FIG. 7, the trailing end edge E'' of the sheet will have moved out of engagement with pinch roller 78 located in the position shown in full lines on FIG. 4. Further, during recording or reproducing operations of apparatus 65, motor 92 rotates drum 90 and transducer heads 93 in the counterclockwise direction, as viewed on FIG. 7, so that the peripheral surface of drum 90 and heads 93 move along sheet S in the direction toward the leading end edge E' located against stop 97.

By reason of the foregoing arrangement, the high speed rotation of drum 90 induces the flow of air in the direction of rotation into the semi-annular gap or clearance between sheet S and the periphery of drum 90.

Figure 15A:
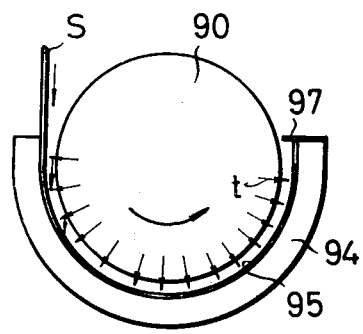
FIGS. 15A–15D are diagrammatic views to which reference will be made in explaining advantages of the sheet support according to this invention for locating the record sheet relative to the rotary transducer assembly.

Such air flow frictionally urges sheet S longitudinally against stop 97 and, by reason of the arcuate configuration of the sheet about the lower half of drum 90 and the flexibly resilient character of the sheet material, the frictional force of the sheet on sheet S is converted into radially outward forces urging the sheet against support surface 95, as indicated by the arrows *t* on FIG. 15A. Since sheet S is thus securely held against support surface 95, and since heads 93 alternately press against sheet S along the portion of the latter which spans the recess 96 in support surface 95, each head applies a relatively soft contact pressure against the magnetic surface of record sheet S, which contact pressure is constant over substantially the extent of the lower half of rotary drum 90, as indicated at PU on FIG. 15B.

As shown particularly on FIG. 28, each of the magnetic heads 93 associated with rotary drum 90 preferably includes a frame 98 which is adjustably mounted on an adjacent end portion of a rotary head support bar 99, for example, by means of a guide pin 100 extending from bar 99 and being slidably received in a slot 101 in frame 98, and by a locking screw 102 extending into a tapped hole in bar 99. The frame 98 is generally U-shaped and a member 103 supporting a head chip 104 is resiliently supported between the arms of frame 98, for example, by resilient wire springs 105. Thus, the head chip 104 which extends slightly beyond the periphery of drum 90 for engagement with record sheet S is resiliently or yieldably supported for smooth and vibration-free contact with the record sheet. Since magnetic heads 93 scan the magnetic surface of record sheet S with a relatively soft constant contact pressure against the latter, signals can be recorded and reproduced with high fidelity. By reason of the air cushion that is maintained between record sheet S and the peripheral surface of drum 90, and further by reason of the very soft contact pressure of heads 93 with the record sheet and also the small width of sheet support member 94, the frictional resistance to the movement of record sheet S relative to rotary transducer assembly 68 in the direction of the axis of the latter is reduced to a minimum and thus such movement of the sheet can be effected smoothly during recording and reproducing operations. Further, the previously mentioned air cushion maintained between sheet S and the peripheral surface of drum 90 ensures that any vibration of drum 90 occurring during the high speed rotation of the latter will not be transmitted to sheet S, whereby to avoid the jitter that may occur during recording and reproducing operations by reason of such vibration. The very small axial width of drum 90 further results in a minimum mass of the drum, whereby to minimize the torque that needs to be applied by motor 92 to drum 90 for effecting the high speed rotation of the latter.

Figure 15C:
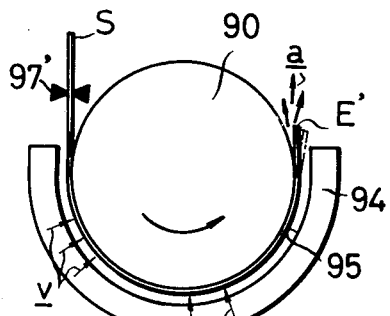
Figure 15B:
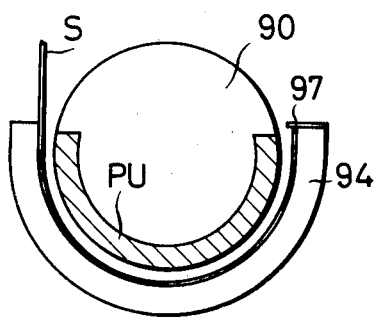
Figure 15D:
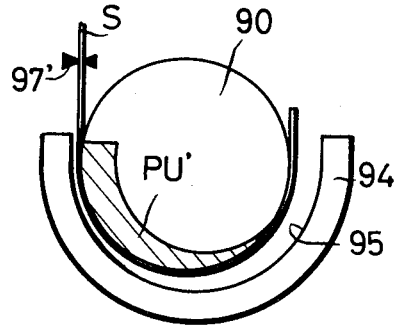

The importance of the described location of the stop 97 for engagement by the leading end edge of the record sheet S in the operative position of the latter will be appreciated from a consideration of FIG. 15C in which such stop 97 engageable by the leading end edge E' of the sheet is replaced by a stop or sheet gripping member 97' which engages sheet S in advance of rotated drum 90 for determining the operative position of the sheet. With the arrangement shown on FIG. 15C, and assuming that drum 90 is again subjected to high speed rotation in the counter-clockwise direction, as shown, the air drawn in between sheet S and the moving peripheral surface of drum 90 again frictionally urges sheet S in the direction of rotation. However, by reason of the fixing of sheet S in advance of drum 90, the frictional effect of the air flow produces a longitudinal tension in the sheet between stop 97' and the leading end edge portion of the sheet, with the result that radially inward forces, as represented by the arrows V, are applied for urging sheet S against the periphery of drum 90. Thus, the record sheet S is separated from the surface 95 of sheet support member 94, and the contact pressure of the magnetic heads 93 with record sheet S becomes independent of the accuracy with which the sheet support surface 95 is formed relative to the peripheral surface of drum 90. It is also to be noted that the pressure of sheet S against the periphery of drum 90 is relatively large at the region of initial contact therebetween and is relatively small adjacent the free leading end portion E' of the sheet, with the result that the contact pressure of each magnetic head 93 with the record sheet S is not uniform along the lower half of the rotated drum, as indicated at PU' on FIG. 15D. Furthermore, as air exits from between the peripheral surface of rotated drum 90 and sheet S at the leading end edge E' of the sheet, as indicated by the arrows *u* on FIG. 15C, such free leading end edge E' is vibrated horizontally. As a consequence of the foregoing, the contact of each magnetic head 93 with the record sheet S is unstable, and the fidelity with which signals are recorded and reproduced is lowered. Furthermore, the useful life of the record sheet and of the magnetic heads is decreased.

Returning to FIGS. 5 and 6, it will be seen that the translating means 70 for effecting relative movement of the record sheet S and rotary transducer assembly 68 in the direction of the axis of the latter may generally comprise one or more feed screws 106 extending parallel to guide rods 86 and being suitably journaled, for example, in sheet support member 94 and one of the upright walls 73, so as to be rotatable while being held against axial displacement, and a nut or other threaded member 107 on carriage 69, for example, on the side member 84*b* of the carriage, which nut or threaded member 107 is engageable with feed screw 106 for displacing carriage 69 in the axial direction of the feed screw in response to rotation of the latter. The rotation of each feed screw 106 at a predetermined slow speed may be effected from an extension 108 of the shaft of motor 92 by way of a speed-reducing transmission indicated at 109.

If desired, and as hereinafter described in detail, carriage 69 may be yieldably urged to its starting position (FIG. 5) as by springs 110, in which case, the cooperative action of rotated feed screw 106 and the associated nut or threaded member 107 is employed for effecting movement of carriage 69 only in the direction from the starting position (FIG. 5) to the terminal position (FIG. 6), that is, during a recording or reproducing operation of apparatus 65. When carriage 69 arrives at its terminal position (FIG. 6), that is, upon the completion of a signal recording or reproducing operation, nut or threaded member 107 is suitably released or disengaged from feed screw 106, as hereinafter described in detail, whereupon springs 110 become effective to relatively rapidly return carriage 69 to its starting position.

Figure 16:
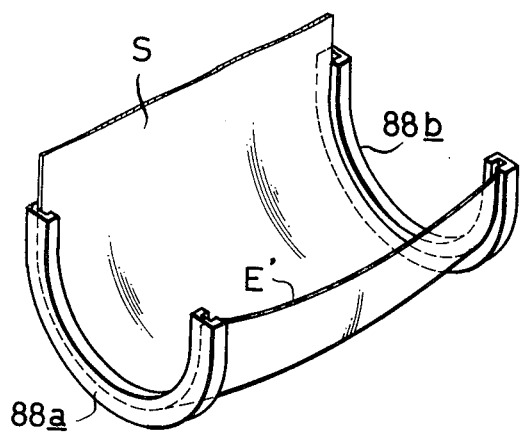
FIG. 16 is a diagrammatic perspective view illustrating the possible bowing or bulging of the record sheet when the latter is guided only at its opposite side edges.
Figure 17:
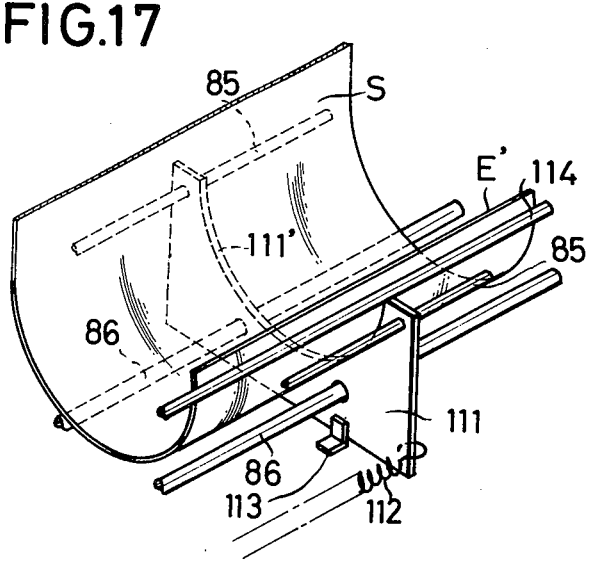
FIG. 17 is a schematic perspective view illustrating additional sheet guides preferably provided in the apparatus according to the invention for avoiding the bowing or bulging condition of FIG. 16.

It will be apparent that, with carriage 69 in its starting position (FIG. 5), fixed sheet support member 94 at the location of rotary transducer assembly 68 is disposed closely adjacent to side member 84*b* of the carriage, that is, closely adjacent to the side edge of sheet S supported in guide groove 89b so that a major portion of the width of sheet S would be unsupported between sheet support member 94 and arcuate guide member 88a guiding the opposite side edge of the sheet. If a major portion of the width of sheet S is unsupported, there is the possibility that the record sheet will bow outwardly, particularly at its leading end edge E', as schematically illustrated on FIG. 16. In order to avoid the foregoing, a sheet guide plate 111 may be slidably mounted on guide rods 86 and spacing rods 85 between end members 84a and 84b of carriage 69, and may be formed with a substantially semi-circular edge 111' (FIG. 17) which substantially conforms to the arcuate path in which a major portion of record sheet S is disposed when in its operative position. Sheet guiding plate 111 is yieldably urged, as by springs 112, to a normal position (FIG. 5) against a stop 113 located on base 74. Such normal position of sheet guiding plate 111 is selected to be substantially midway between side members 84a and 84b of carriage 69 when the latter is in its starting position (FIG. 5). Thus, during the movement of sheet S from its stored position within cover or envelope C to its operative position, as described above, with carriage 69 in its starting position, sheet guiding plate 111 supports or guides the sheet S approximately midway between its opposite side edges and thereby avoids the bowing illustrated on FIG. 16 which might cause the removal of one or the other of the opposite side edges of the sheet from the respective guide groove 89a or 89b.

In the course of the movement of carriage 69 to its terminal position, side member 84a of the carriage comes against the sheet guiding plate 111 and thereafter displaces the latter in the direction of movement of the carriage so that, in the terminal position of carriage 69 (FIG. 6), sheet guiding plate 111 is disposed closely between side member 84a of the carriage and the adjacent sheet support member 94. Bulging or sagging of the sheet S between arcuate sheet guide members 88a and 88b is further preferably prevented by a sheet supporting rod 114 (FIGS. 4, 7 and 17) which extends between side members 84a and 84b of carriage 69 parallel to the direction of movement of the latter, and which is located to engage the outer surface of sheet S closely adjacent to the leading end edge E' of the sheet in its operative position. Thus, although sheet S, in its operative position, is held in arcuate guide members 88a and 88b only at its opposite side edges, so as to make possible the utilization of substantially the entire width of the sheet for the recording of signal information thereon, the sheet is well stabilized during recording and reproducing operations for ensuring that signals will be recorded and reproduced with high fidelity.

Referring now to FIG. 10A, it will be apparent that during movement of sheet S from its stored position to its operative position, such sheet movement occurs in a direction $D_1$ which is substantially at right angles to the axis of rotation $X_1$ of driving roller 79. Thus, if the axis of rotation $X_1$ of driving roller 79 is at an angle to the desired axis $X_2$ perpendicular to the planes of arcuate sheet guide members 88a and 88b, the direction $D_1$ of sheet movement will be at a similar angle to the desired direction $D_2$ parallel to the sheet guide members 88a and 88b. If the foregoing condition prevails during the movement of sheet S toward its operative position, one of the side edges of sheet S, for example, the left-hand side edge as viewed on FIG. 10A, will be moved progressively deeper into the associated guide groove 89a and will bear with increasing pressure against the inner surface of that guide groove. Similarly, the left-hand side edge of sheet S will be made to bear against the adjacent side of cover or envelope C with the result that the frictional resistance to movement of sheet S will be increased. The progressively increasing pressure of a side edge of sheet S against the adjacent side of cover or envelope C and against the inner surface of the respective guide groove 89a or 89b will eventually cause wrinkling or creasing of the relatively thin record sheet and this will result in defective recording or reproducing of the signal information.

In order to avoid the foregoing problem, the sheet driving device for moving record sheet S between its stored and operative positions in the apparatus 65 according to this invention is preferably arranged for intermittent engagement with record sheet S during operation of the sheet driving device. Thus, for example, as shown on FIGS. 11A and 11B, the driving roller 79 of sheet driving device 67 has its shaft 81 rotatably mounted at one end of a lever 115 which is pivotally supported intermediate its ends, as at 116, and which carries a cam follower roller 117 at its end remote from shaft 81. A spring 118 is connected to lever 115 for urging the latter in the clockwise direction, as viewed on FIGS. 11A and 11B, that is, in the direction moving driving roller 79 upwardly toward pinch roller 78, and moving cam follower roller 117 into engagement with the periphery of a radial cam 119 which is rotatable on a shaft 120. A reversible electric motor (not shown) suitably drives a shaft 121 having pulleys 122 and 123 fixed thereon, and such pulleys 122 and 123 respectively drive belts 124 and 125 which run around pulleys 126 and 127 fixed on the shafts 81 and 120, respectively. By reason of the relative diameters of pulleys 122 and 126 and of pulleys 123 and 127, rotation of shaft 121 in one direction or the other is effective to cause rotation of driving roller 79 and cam 119 in the same direction at relatively high and low speeds, respectively. The radial cam 119 is shown to be formed with a radially raised portion 119a of substantial angular extent which is engaged by cam follower roller 117 in the inoperative condition of sheet driving device 67 for holding driving roller 79 in its lowered position (FIG. 11B) spaced from pinch roller 78, for example, during the movement of record assembly R to and from its loaded position on holder 66. Further, radial cam 119 is formed with a series of radially raised nodes 119b which are spaced apart along a substantial portion of the remaining circumference of the cam. It will be apparent that, when cam 119 is angularly positioned as on FIG. 11A, so that cam follower roller 117 engages a radially small portion of cam 119 intermediate raised portion 119a and nodes 119b, spring 118 is effective to raise or press driving roller 79 against pinch roller 78 with the record sheet S therebetween.

In the operation of sheet driving device 67 for moving sheet S from its stored position to its operative position following the installation of record assembly R in its loaded position on holder 66, shaft 121 is rotated in the counterclockwise direction, as viewed on FIGS. 11A and 11B, so as to effect rotation of driving roller 79 and cam 119 in the same direction. During the initial turning of cam 119 from its initial position, cam follower roller 117 moves off raised cam portion 119a with the result that driving roller 79 is moved upwardly to cooperate with pinch roller 78, as previously described, for driving sheet S. As the rotation of cam 119 continues, roller 117 is periodically engaged by nodes 119b of the cam (FIG. 11B) with the result that driving roller 79 is moved to its lowered position to disengage sheet S and thereby to interrupt the driving of the sheet. Similarly, during the operation of device 67 for returning record sheet S from its operative position to its stored position, shaft 121 is rotated in the clockwise direction, as viewed on FIGS. 11A and 11B for rotating driving roller 79 and turning cam 119 in the same direction with the result that the sheet is intermittently engaged between rollers 78 and 79 for intermittent driving of the sheet toward its stored position.

With the foregoing arrangement of sheet driving device 67, even if the axis $X_1$ of its driving roller 79 is at an angle with respect to the desired axis $X_2$ (FIG. 10B), the intermittent engagement of the driving device with sheet S prevents the progressive buildup of the lateral pressure of a side edge of sheet S against the adjacent side of cover C and against the inner surface of the respective guide groove 89a or 89b. Thus, during each of the periods when driving roller 79 is out of engagement with sheet S (FIG. 11B) sheet S is freed for relaxation of the lateral pressure of a side edge thereof against the adjacent side of the cover or envelope C and against the inner surface of the respective guide groove. Accordingly, the described arrangement of sheet driving device 67 avoids wrinkling of the sheet and the development of excessive frictional resistance to its movement between the stored and operative positions of the sheet. Furthermore, by reason of the foregoing, the lateral distance between the inner surfaces of guide grooves 89a and 89b may be made very nearly equal to the lateral width of sheet S so as to increase the accuracy with which the sheet is laterally located by guide members 88a and 88b during signal recording or reproducing operations of apparatus 65.

Although the illustrated sheet driving device 67 employs a driving roller 79 which is moved vertically into and out of engagement with the sheet S, it is apparent that the shaft 81 of driving roller 79 may be mounted for rotation about a fixed axis, while the shaft 80 of pinch roller 78 is moved vertically for intermittently engaging the record sheet between pinch roller 78 and driving roller 79 during the operation of the sheet driving device. Further, other arrangements are possible for effecting the desired intermittent engagement of the record sheet by the sheet driving device during the operation of the latter for moving the sheet between its stored and operative positions. For example, as shown on FIG. 12, in a sheet driving device 67' according to this invention, the driving roller 79' may be eccentrically mounted on its shaft 81' so that, when shaft 81' is rotated, the periphery of driving roller 79' is intermittently pressed against the associated pinch roller 78' with sheet S therebetween, whereby to effect the previously described intermittent movement of the record sheet between its stored and operative positions. A similar result may be achieved with the sheet driving device 67'' shown on FIG. 13, in which sheet driving roller 79'' has a flattened peripheral portion F so that record sheet S between driving roller 79'' and the associated pinch roller 78'' is disengaged whenever the flat peripheral portion F of the driving roller faces toward the pinch roller.

Further, it will be understood that, although the sheet driving devices 67, 67' and 67'' have been described as having a freely rotatable pinch roller and a rotated driving roller respectively engageable from above and below with the record sheet for moving the latter between its stored and operative positions, in such sheet driving devices, both of the rollers may be rotatably driven, or the upper roller may be rotatably driven while the lower roller is freely rotatable.

Figure 18B:
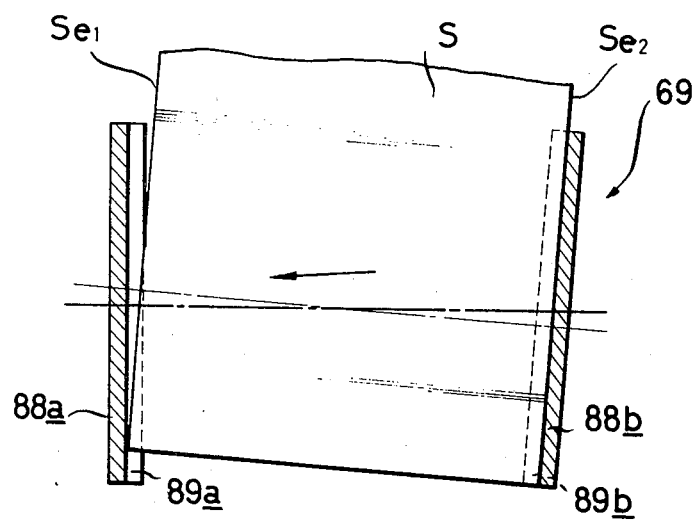
FIGS. 18A and 18B are diagrammatic views illustrating possible canting of the record sheet during its movement in directions parallel to the axis of rotation of the transducer assembly if the sheet guides engaging the opposite side edges of the sheet are not precisely parallel to each other.
Figure 18A:
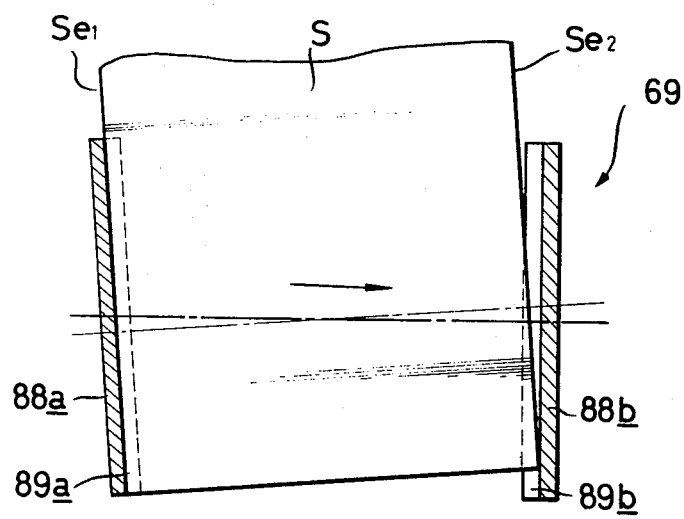

Since there is some frictional resistance to the movement of record sheet S, in its operative position, relative to rotary transducer assembly 68 in the directions parallel to the axis of the latter by reason of the contact of the record sheet with transducer heads 93 and with sheet support surface 95, the side edge $S_{e1}$ is pressed against the inner surface of the respective groove 89a during movement of carriage 69 in the direction from its starting position to its terminal position (FIG. 18A), and the opposite side edge $S_{e2}$ of sheet S is pressed against the inner surface of the associated guide groove 89b during the return of carriage 69 from its terminal position to its starting position (FIG. 18B). Thus, if the inner surfaces of guide grooves 89a and 89b do not lie in planes that are precisely perpendicular to the directions of movement of carriage 69, or if the opposite side edges of sheet S are not precisely parallel to each other, the record sheet S, when in its operative position, will be canted in respect to the axis of rotation of rotary transducer assembly 68 in response to the translatory movement of carriage 69, as shown on FIGS. 18A and 18B. It will be apparent that, with record sheet S in its operative position and having a major portion thereof guided in an arcuate path about at least a portion of the circular path of travel of heads 93 of rotary transducer assembly 68, the relatively high speed rotation of transducer assembly 68 combines with the relatively slow translatory movement of carriage 69 from its starting position to its terminal position to cause heads 93 to scan parallel, successive record tracks arranged in a series across the width of sheet S, as at $T_1$, $T_2$, $T_3$ - - - etc. on FIG. 29A, with such record tracks being inclined relative to the side edges of sheet S by an angle $a_1$ which is determined by the relationship of the rotary speed of movement of heads 93 and the speed of translatory movement of carriage 69. However, if the record sheet S is free to cant or shift relative to the direction of translatory movement of carriage 69 in response to such movement, as shown on FIGS. 18A and 18B, the pattern of record tracks scanned by the rotary heads on the record sheet will be correspondingly shifted relative to the side edges of the sheet with the result that the desired interchangeability of record assemblies R and recording and/or reproducing apparatus 65 in accordance with this invention will be disadvantageously affected.

Figure 19:
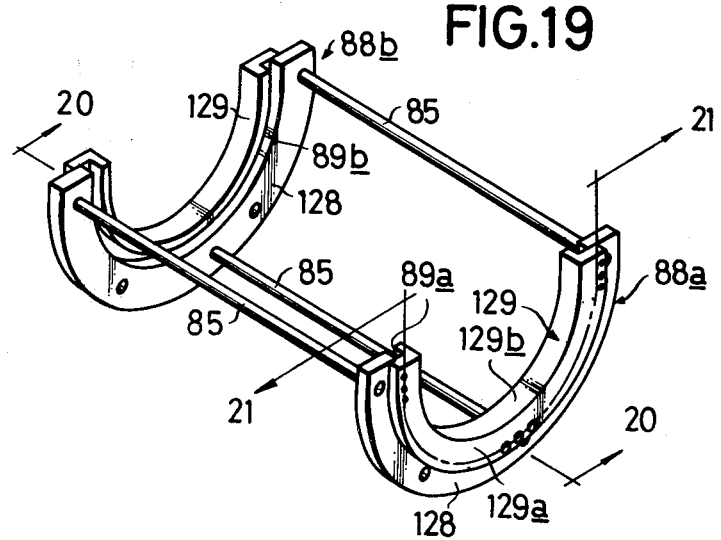
FIG. 19 is a perspective view illustrating one embodiment of sheet guides according to this invention for avoiding the condition illustrated by FIGS. 18A and 18B.
Figure 20:
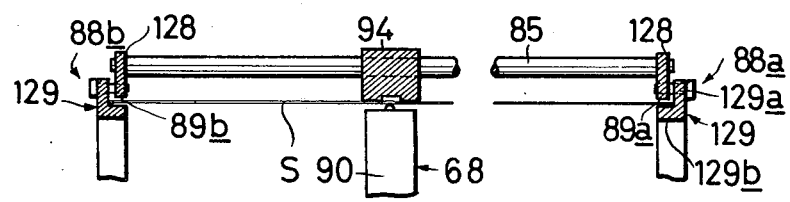
FIG. 20 is a sectional view taken along the line 20—20 on FIG. 19.
Figure 21:
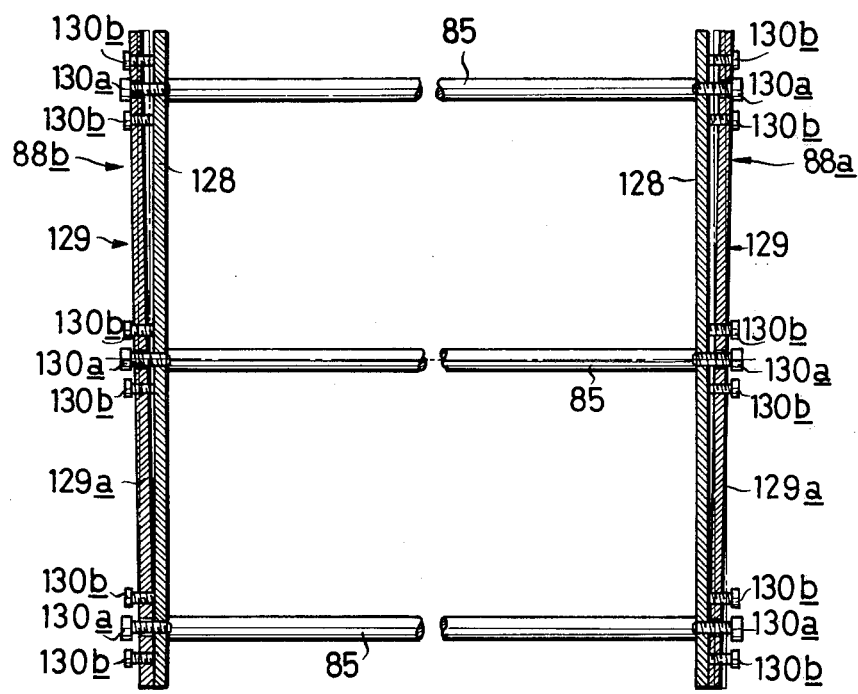
FIG. 21 is a developed sectional view taken along the line 21—21 on FIG. 19.
Figure 24A:
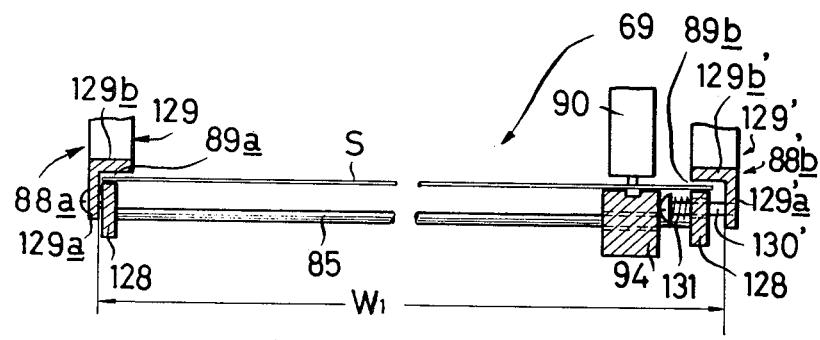
FIGS. 24A and 24B are sectional views taken along the line 24—24 on FIG. 22, respectively showing the condition of one of the sheet guides when the carriage supporting the latter is at a starting position for movement of the record sheet between its stored and operative positions, and when the carriage is located intermediate its starting and terminal positions, as during a recording or reproducing operation.
Figure 24B:
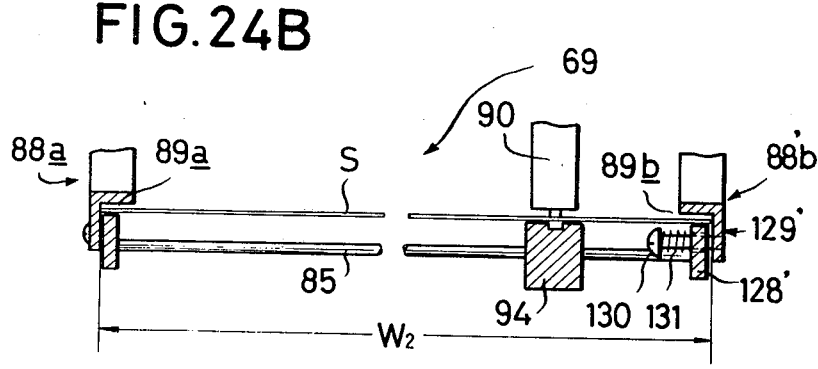

In order to avoid the foregoing problem and to promote the interchangeability of record assemblies R and recording and/or reproducing apparatus 65 according to this invention, at least the one of the arcuate sheet guiding members 88a and 88b toward which the respective side edge of record sheet S is pressed during a recording or reproducing operation of the apparatus is constructed so as to permit adjustment of the plane of the inner surface of the respective sheet guiding groove relative to the direction of translatory movement of carriage 69, and hence relative to the axis of rotation of rotary transducer assembly 68. For example, as shown on FIGS. 19, 20 and 21, each of arcuate guide members 88a and 88b may be constituted by two substantially semi-circular members 128 and 129, with each member 128 having a substantially rectangular cross-section with the major axis of the latter extending radially while each member 129 is of L-shaped cross-section to define an arcuate, radially directed portion 129a which has an axially directed flange 129b extending from its inner edge. The arcuate members 128 and 129 are relatively dimensioned so that flange 129b will be spaced radially inward from the inner edge surface of member 128, with the result that the respective groove 89a or 89b for receiving a side edge of sheet S has its wall surfaces defined by the inner edge surface of the respective member 128 and the confronting surface of the respective flange 129b, while the inner surface of the groove 89a or 89b is defined by the end wall or radially directed portion 129a of the respective member 129. As shown, the arcuate members 128 of guide members 88a and 88b may be fixed relative to each other by spacing rods 85 extending therebetween, while the planes of portions 129a of members 129 are adjustable relative to the respective members 128.

In order to effect the above described adjustment, each of members 129 may have its radially extending portion 129a adjustably secured to the outside of the respective member 128 at three locations spaced apart along the respective guide member 88a or 88b. For example, as shown, at each of such locations there may be provided a central fastening screw 130a which extends loosely through a suitable hole in the radially extending portion 129a of member 129 and threadably engages in a respective tapped hole in member 128, and positioning screws 130b disposed at opposite sides of the central fastening screw 130a and being threaded through tapped holes in member portion 129a so as to bear against the adjacent face of member 128. It will be apparent that, by suitably adjusting the groups of screws 130a and 130b, the planes of the inner or end wall surfaces of grooves 89a and 89b can be adjusted relative to each other and relative to the axis of rotation of rotary transducer assembly 68, for example, as indicated by the broken lines on FIG. 21. By reason of such adjustment, the canting or shifting of the record sheet during a recording or reproducing operation, as described above with reference to FIGS. 18A and 18B, can be eliminated. Further, it will be apparent that the described arrangement and adjustability of the arcuate guide members 88a and 88b permits adjustment of the lateral distance between the inner surfaces of guide grooves 89a and 89b for adapting the apparatus 65 to use with record sheets of different widths.

Referring now to FIGS. 22, 23, 24A and 24B, it will be seen that, in accordance with another embodiment of this invention, the arcuate guide member 88a may be constituted of members 128 and 129 which are adjustable relative to each other in the manner described above with reference to FIGS. 19–21, while the opposite arcuate guide member 88'b is constituted by arcuate members 128' and 129' which are similar to the previously described members 128 and 129, respectively, but which are resiliently mounted relative to each other. More specifically, as shown, the mounting of arcuate member 129' on the associated arcuate member 128' is effected by a plurality of spaced apart screws 130' which are secured in tapped holes in radially directed portion 129'a of member 129' and which extend loosely in the axially inward direction through suitable holes in member 128' so that member 129' is displaceable in the axial direction relative to member 128'. Further, helical compression springs 131 are provided on screws 130' between the heads of the latter and member 128' so as to yieldably urge member 129' relative to member 128' in the direction for reducing the width or distance between the inner surfaces of grooves 89a and 89b. Further, as shown on FIG. 24A, the heads of screws 130' are positioned so as to be engaged, and displaced in opposition to the force of the associated springs 131 by the fixed sheet support member 94 when carriage 69 is in its starting position, whereby to provide a width or distance $W_1$ between the inner surfaces of guide grooves 89a and 89b which is greater than the width of the sheet S. Thus, wiith carriage 69 in its starting position, sheet S can be moved between its stored and operative positions, as previously described, with minimum frictional resistance to the movement of the opposite side edges of the sheet along guide grooves 89a and 89b. However, when carriage 69 is moved away from its starting position, as during a recording or reproducing operation of the apparatus (FIG. 24B), the heads of screws 130' are released or spaced from sheet supporting member 94 so that springs 131 can then urge member 129' relative to the associated member 128' in the direction for reducing the width $W_2$ between the inner surfaces of guide grooves 89a and 89b, with the result that the opposite side edges of sheet S are closely engaged by such inner surfaces of the grooves for precisely locating the record sheet during the recording or reproducing operation. It will be apparent that, with the arrangement of the arcuate guide members 88a and 88'b as described above with reference to FIGS. 22, 23, 24A and 24B, the position or orientation of the sheet S during the recording or reproducing operation is determined by the adjustment of member 129 relative to the associated member 128, with the spring-urged member 129' of guide member 88'b being effective to maintain engagement of a side edge of sheet S against the adjusted inner surface of guide groove 89a.

Figure 26:
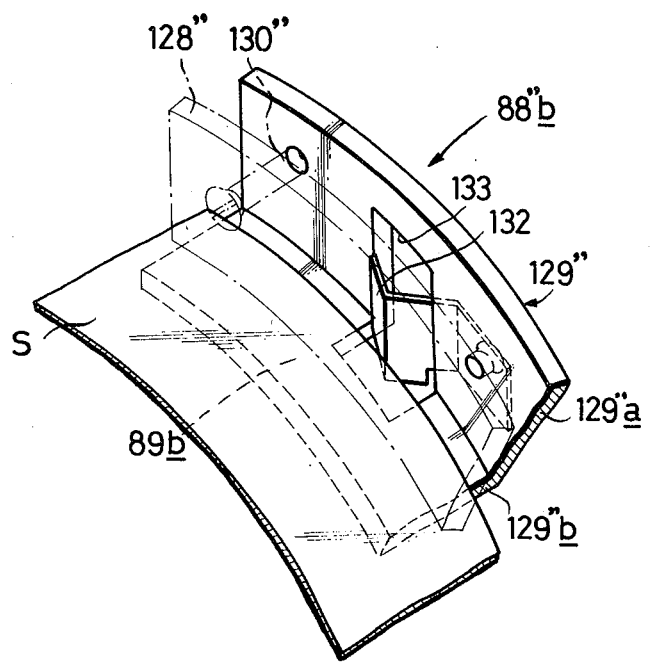
FIG. 26 is an enlarged, fragmentary perspective view of the sheet guide portion shown on FIG. 25.
Figure 25:
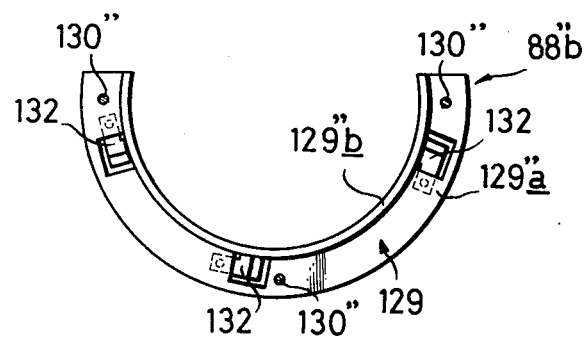
FIG. 25 is a side elevational view of a portion of one of the sheet guides in accordance with another embodiment of this invention.

Referring now to FIGS. 25, 26 and 27, it will be seen that in another arrangement of an arcuate guide member 88''b for achieving substantially the same effect as the previously described guide member 88'b, at least during a recording or reproducing operation, an arcuate member 128'' (shown in broken lines on FIG. 26) and an arcuate member 129'' which are substantially similar in configuration to the previously described members 128 and 129 are fixedly located relative to each other, as by screws 130'' so as to define the respective guide groove 89b therebetween. Further, the radially directed portion 129''a of member 129'' carries a plurality of spaced apart spring members 132 which project through cutouts 133 in member 129'' so as to engage yieldably against the side edge $S_{e2}$ of sheet S received in guide groove 89b (FIG. 27). With such arrangement, even if the side edge $S_{e2}$ of sheet S is uneven, as shown in exaggerated fashion on FIG. 27, springs 132 are effective to uniformly urge sheet S laterally for maintaining smooth and precise sheet locating contact of the opposite side edge $S_{e1}$ of the sheet with the inner surface of the respective guide groove 89a defined by the radially directed portion 129a of the respective arcuate guide member 88a.

SUMMARY OF THE OPERATION OF THE RECORDING AND/OR REPRODUCING APPARATUS

With carriage 69 in its starting position and holder 66 similarly located, record assembly R is disposed in its loaded position on table 71 of holder 66. The operation of motor 92 is then commenced, and sheet driving device 67 is made to operate for moving sheet S from its stored position within cover C to its operative position in which a major portion of the sheet is guided in an arcuate path by guide members 88a and 88b extending around a portion of the circular path of rotation of transducer heads 93, with the operative position of record sheet S being limited by the engagement of its leading end edge E' with stop 97. In response to the operation of motor 92 and the consequent rotation of feed screw 106, carriage 69 is moved in the direction parallel to the axis of rotation of transducer assembly 68 from the starting position of the carriage toward the terminal position shown on FIG. 6. By reason of the rotary movement of heads 93 and the translatory movement of carriage 69 and of holder 66 with the latter, the heads 93 scan successive parallel record tracks arranged in a series across the width of the record sheet. During such scanning of the record tracks, suitable recording or reproducing circuits (not shown) associated with heads 93 are selectively made operative to either record or reproduce video signals in the scanned record tracks. When carriage 69 reaches its terminal position (FIG. 6) the recording or reproducing operation is terminated, and carriage 69 is returned to its starting position (FIG. 5). With carriage 69 returned to its starting position and holder 66 being similarly located, sheet driving device 67 is again operated in the direction for returning sheet S to its stored position within cover or envelope C. Since the trailing end portion of sheet S remains within envelope or cover C during the recording or reproducing operation of apparatus 65, the return of sheet S to its stored position in cover or envelope C at the completion of a recording or reproducing operation is greatly facilitated. Finally, the record assembly R with the sheet S in its stored position within cover or envelope C can be removed from holder 66.

In recording video signals with the described apparatus 65, the so-called field skip method may be employed so as to increase the duration or playing time of the video signals that can be recorded on each record sheet S. For example, in the case of a standard video signal having 30 frames per second with two fields per frame, the motor 92 may rotate transducer assembly 68 at a speed of 30 revolutions per second, while the speed of translatory movement of carriage 69 is selected, for example, by means of the transmission 109 and the pitch of the thread on feed screw 106, so as to move carriage 69, and hence sheet S, through a distance $W_3$ (FIG. 29A) equal to the width of the gap of each of the transducer heads 93 during the period required for one complete revolution of transducer assembly 68. With the foregoing relation between the speed of rotation of transducer assembly 68 and the speed of translatory movement of carriage 69, each track, for example, the track $h_1$ on FIG. 29A, scanned by one of the transducer heads, for example, the head $93_1$ on FIG. 29B, is overlapped by approximately one-half of the width of the track by the track $h_2$ (FIG. 29A) immediately thereafter scanned by the other head $93_2$. Further, the tracks $T_1, T_2, T_3$ - - - etc. successively scanned by the one head $93_1$ are immediately adjacent each other, that is, have no gaps or guard bands therebetween on sheet S.

Figure 29A:
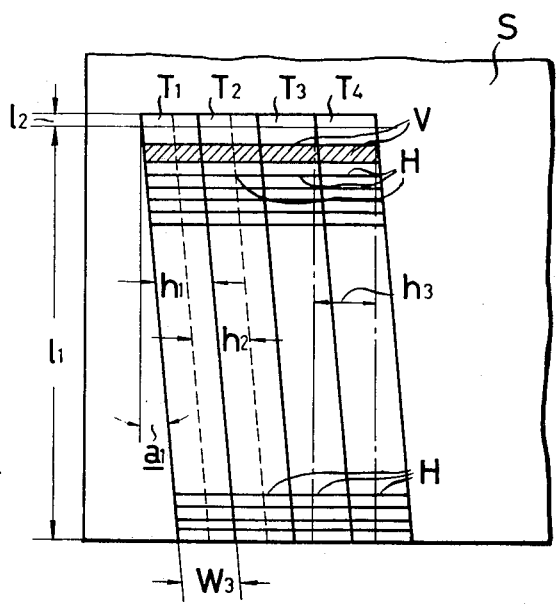
FIG. 29A is a diagrammatic plan view illustrating the manner in which video signal information may be magnetically recorded on the record sheet in accordance with an embodiment of this invention.
Figure 29B:
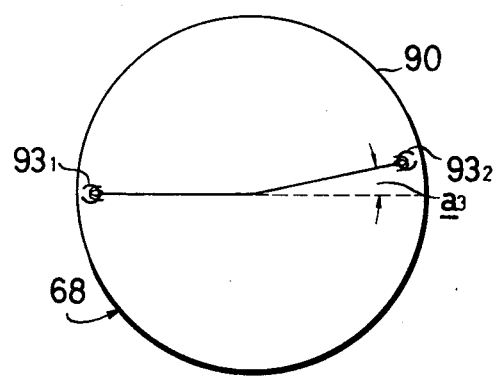
FIG. 29B is a diagrammatic view illustrating the positional relationship of the signal transducers or magnetic heads for recording video signal information in the manner shown on FIG. 29A.

When using the field skip method, and assuming that the input video signal has successive field signals $1f, 2f, 3f, 4f, 5f$ - - - etc., as shown on FIG. 29C, then only the head $93_1$ is made operative during the recording operation so as to record only odd or even numbered fields, for example, to record only the fields $1f, 3f, 5f$ - - - etc., in the successive tracks $T_1, T_2, T_3$ - - - etc. scanned by head $93_1$. Such signals representing every other field are recorded in the successive tracks with the vertical synchronizing signals V and the horizontal synchronizing signals H recorded in adjacent tracks being aligned with each other in the lateral direction of sheet S, that is, in the direction of the translatory movement of carriage 69, as shown on FIG. 29A. Further, on FIG. 29A, the distance $l_1$ represents a field period, while the distance $l_2$ at the commencement of each record track represents an overlap period. Since the signals representing every other field are recorded on sheet S with the horizontal synchronizing signals H and the vertical synchronizing signals V in adjacent tracks being aligned in the lateral direction of the sheet, the recorded video signals can be reproduced from the sheet S without requiring the usual tracking operation.

More specifically, during a reproducing operation, both transducer heads $93_1$ and $93_2$ are made operative while the transducer assembly 68 is rotated and the carriage 69 is moved at the same speeds as for the recording operation. Thus, if, during the reproducing operation, head $93_1$ scans the successive tracks $T_1, T_2, T_3$ - - - etc. during the respective halves of successive revolutions of transducer assembly 68 for reproducing field signals $1f, 3f, 5f$ - - - etc., then head $93_2$ will, in the intervening half revolutions of transducer assembly 68, scan adjacent halves of tracks $T_1$ and $T_2$, tracks $T_2$ and $T_3$, tracks $T_3$ and $T_4$ - - - etc., for simultaneously reproducing field signals $1f$ and $3f$, field signals $3f$ and $5f$ - - - etc., as shown on FIG. 29c. Therefore, the reproduced signals will provide a smoothly moving video picture without the unnatural or jerky movements that are usually associated with the field skip method of recording. In order that the reproduced video signal will contain continuous horizontal synchronizing signals, that is, horizontal synchronizing signals that do not change phase for adjacent record tracks, it is necessary that heads $93_1$ and $93_2$ be at the same level, and that the angular spacing between heads $93_1$ and $93_2$ be $180° \pm a_3$, in which $a_3$ (FIG. 29B) is an angle equivalent to one-half the horizontal period of the video signal.

When it is desired to obtain still reproduction of the recorded video signals, the rotation of transducer assembly 68 is continued while the translatory movement of carriage 69 is suitably halted, with the result that heads $93_1$ and $93_2$ will alternately and repeatedly scan sheet S along a single track, for example, as indicated in dot-dash lines at $h_3$ on FIG. 29A, which is at an angle to the direction of the record tracks. Thus, during still reproduction of the recorded video signal, each of heads $93_1$ and $93_2$ will scan varying portions of adjoining tracks, for example, the tracks $T_3$ and $T_4$ in the case of the scanning along the track $h_3$ on FIG. 29A. Since the horizontal synchronizing signals in such adjoining tracks are aligned in the lateral direction of the sheet S, the reproduced still video signal will have stable horizontal synchronization and, consequently, a still video picture of excellent quality can be obtained with the described apparatus. Further, since the successive record tracks on sheet S do not have any gaps or guard bands therebetween, the "noise" commonly associated with such guard bands in the reproduction of a still video signal is eliminated.

Figure 30:
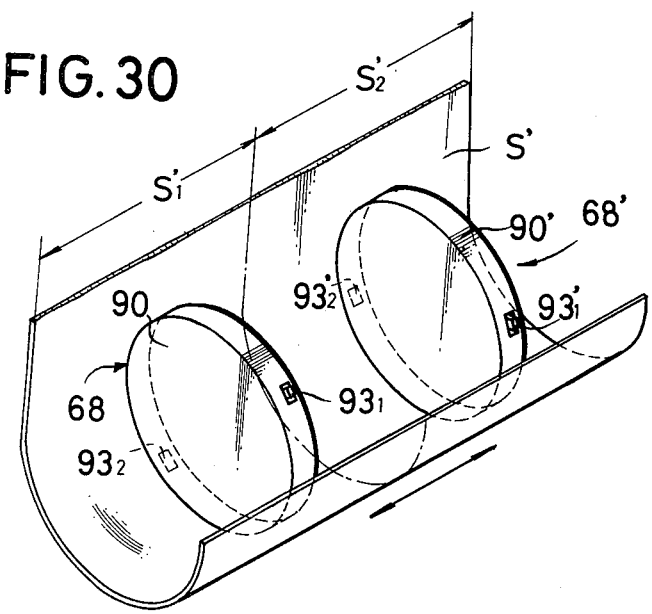
FIG. 30 is a schematic perspective view illustrating the manner in which both video signal information and audio signal information may be recorded on a signal record sheet in an apparatus according to this invention.

In the above description of apparatus 65 according to this invention, reference has been made only to the recording and reproducing of video signal information on the record sheet S. However, if desired, audio signal information and video signal information can be simultaneously recorded on the same sheet, for example, by providing rotary transducer assembly 68 with an additional pair of audio signal recording and reproducing heads (not shown) arranged so that the gaps of such heads and the gaps of the heads for recording and reproducing the video signal information are at different angles or azimuths in respect to the plane of rotation of the transducer assembly. Alternatively, as shown schematically on FIG. 30, an apparatus according to this invention which is generally similar to the previously described apparatus 65 may be adapted for simultaneously recording and/or reproducing both video signal information and audio signal information by providing such apparatus with an additional rotary audio signal transducer assembly 68' which is axially aligned with and spaced from the previously described rotary video signal transducer assembly 68. Such additional transducer assembly 68' is shown generally to include a drum 90' similar to the previously described drum 90 which carries substantially diametrically opposed audio signal transducers or heads $93'_1$ and $93'_2$. Thus, when transducer assembly 68' is rotated, preferably at a rotational speed slower than that of the transducer assembly 68, and the single record sheet S' is moved in directions parallel to the axis of rotation of the transducer assemblies, for example, in response to movement of the carriage 69 between its starting and terminal positions, heads $93_1$ and $93_2$ of transducer assembly 68 will scan successive, parallel video record tracks arranged in a series across the lateral portion $S'_1$ of the record sheet, while heads $93'_1$ and $83'_2$ will similarly scan successive parallel audio record tracks extending in a series across the other lateral portion $S'_2$ of record sheet S'. In the case of the record sheet S' intended to have video signal information and audio signal information recorded on its lateral portions $S'_1$ and $S'_2$, respectively, by corresponding magnetic heads, the magnetic coating on portion $S'_1$ of the sheet for the recording of video signal information may be formed of $CrO_2$, while the magnetic coating on the portion $S'_2$ of the sheet intended to have audio signal information recorded thereon may be formed of $\gamma Fe_2O_3$.

The apparatus 65, as described above, is intended for use with interchangeable record assemblies R each having a single record sheet S normally contained in the cover or envelope C so that, upon the completion of the recording or reproducing of signal information on the record sheet S, the record sheet is returned to its stored position in the cover or envelope C and the record assembly R is replaced by a similar record assembly on holder 66 for the continuation of the recording or reproducing operation. However, as shown on FIG. 43, the described apparatus 65 may be simply modified, particularly in respect to its sheet driving device, so as to adapt the recording and/or reproducing apparatus for use with a record assembly 100R including a substantially rectangular cover or envelope 100C which is open at one end and a plurality of substantially rectangular record sheets $100S_1, 100S_2, 100S_3$ and $100S_4$ which are individually movable in respect to cover 100C through the open end of the latter between superposed stored positions within the cover or envelope and operative positions in which a major portion of the selected sheet is exposed outside the cover or envelope and is directed by guide members 88a and 88b of apparatus 65 in an arcuate path extending about a portion of the circular path of travel of the transducer heads of assembly 68.

In order to provide for the selective movement of the plural record sheets between their stored and operative positions, the top and bottom walls of cover 100C have laterally elongated cutouts 100A (indicated in broken lines on FIG. 43) extending thereacross adjacent the open end of the cover or envelope, and the sheets $100S_1-100S_4$ have respective tabs $100T_1-100T_4$ extending from their leading end edges and being laterally spaced from each other for exposure at cutouts 100A when the respective sheets are in their stored positions.

The modified sheet driving device for use with the record assembly 100R, and which is generally identified by the reference numeral 167, is shown to include a pinch roller 178 and a driving roller 179 for engaging therebetween a selected one of the tabs $100T_1-100T_4$ with the sheets in their stored positions, and a mechanism for displacing at least one of the rollers 178 and 179 in the lateral direction of the sheets so as to determine which of the tabs $100T_1-100T_4$ is engaged between such rollers. For example, as shown on FIG. 43, the driving roller 179 may be axially elongated so as to cover the full lateral extent of the tabs $100T_1-100T_4$, while the pinch roller 178 has an axial width less than the width of each of the tabs $100T_1-100T_4$ and is rotatably carried by a bracket 168 which is threadably engaged by a feed screw 169. Thus, in response to suitable rotation of feed screw 169, bracket 168 and pinch roller 178 are laterally displaced, for example, from the position shown in full lines on FIG. 43 where pinch roller 178 is engageable with tab $100T_4$ to the position indicated in broken lines at 168' where the pinch roller is engageable with tab $100T_2$. The pinch roller 178 preferably has a peripheral surface which is rounded in lateral cross-section so as to facilitate the lateral movement of pinch roller 178 from one tab to the other. Following the lateral movement of bracket 168 to dispose pinch roller 178 for engagement with a tab of a selected one of the record sheets $100S_1-100S_4$, the sheet driving device 167 may be operated similarly to the previously described sheet driving device 67 for moving the selected sheet from its stored position to its operative position, and for returning that sheet to its stored position at the completion of the recording or reproducing of signal information thereon.

Figure 43:
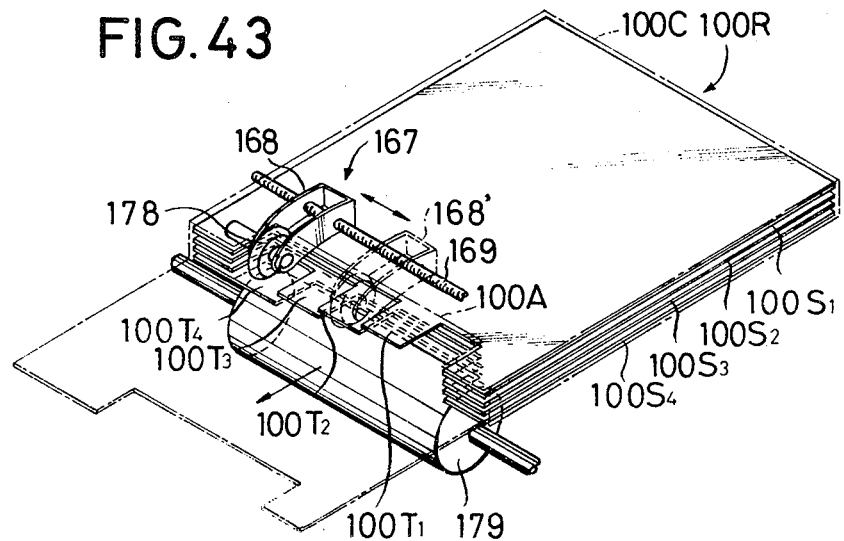
FIG. 43 is a schematic perspective view similar to that of FIG. 42, but showing a record assembly and sheet driving device according to another embodiment of the invention by which any selected one of the plurality of record sheets may be moved from its stored position to its operative position for the recording or reproducing of signal information thereon.

It will be apparent that, with the arrangement illustrated on FIG. 43, recording or reproducing operations may be conducted with reference to the sheets $100S_1-100S_4$ in succession and without removal of the record assembly 100R from the holder 66 of apparatus 65. Although the sheet driving device 167 has been shown as having an axially fixed, elongated driving roller 179 and a relatively narrow pinch roller 178 which is axially displaced for selecting one of the record sheets, the described functions of sheet driving device 167 can be performed by providing the latter with relatively narrow pinch and driving rollers which are simultaneously moved in the axial or lateral direction for engagement with a selected one of the tabs $100T_1-100T_4$, or by providing an axially elongated, fixed pinch roller in association with a relatively narrow sheet driving roller which is axially shifted for selecting the tab to be engaged between the pinch and driving rollers.

In the previously described embodiments of this invention, during a recording or reproducing operation, only a single record sheet is disposed at a respective operative position for the recording or reproducing of signal information thereon. However, as hereinafater described in detail, recording and/or reproducing apparatus according to this invention may be provided for use with interchangeable record assemblies each having two or more flexible record sheets which are simultaneously disposed in respective operative positions for the recording or reproducing of signal information thereon. For example, as shown on FIGS. 31-33, a record assembly 200R according to this invention may include a substantially rectangular cover or envelope 200C having an open end 200-O and being mounted on a substantially rigid base plate 200P, and two substantially rectangular, flexibly resilient record sheets $200S_1$ and $200S_2$ which are movable through open end 200-O of the cover between superposed stored positions within cover 200C, as shown in full lines on FIG. 33, and operative positions, as indicated in broken lines at $200S'_1$ and $200S'_2$, in which major portions of the sheets are exposed outside of cover 200C while minor or trailing end portions of the sheets remain within the cover or envelope.

In the record assembly 200R, the sheets $200S_1$ and $200S_2$ have different widths, as shown on FIGS. 31 and 32, for example, the width of the upper sheet $200S_1$ may be smaller than the width of the lower sheet $200S_2$, and the opposite sides of cover 200C are formed to define upper and lower guide channels 201 and 202, respectively, with the lateral distance between the upper guide channels 201 being smaller than the lateral distance between the lower guide channels 202, as shown on FIG. 32, so that the opposite side edges of sheets $200S_1$ and $200S_2$ are loosely guided in channels 201 and 202, respectively, during the movement of the sheets between their stored and operative positions. As in the case of the record assembly R, the top and bottom walls of cover 200C and the base plate 200P of record assembly 200R have registering cutouts or apertures 200A adjacent the open end of the cover or envelope, and the sheets $200S_1$ and $200S_2$ are longitudinally dimensioned so that, in the stored positions of the sheets, the leading end edges thereof extend substantially midway across cutouts or apertures 200A and, in the operative positions of the sheets, the trailing end edges of the sheets extend substantially midway across the cutouts or apertures 200A. Finally, the base plate 200P of record assembly 200R is shown to have side portions projecting laterally beyond cover 200C and being formed with locating shoulders 200Pa adjacent the open end of the cover, and also with triangular notches 203 suitably located along the opposite sides of plate 200P and which, as hereinafter described, are employed for latching or locking record assembly 200R in its loaded position on a suitable holder.

Figure 34:
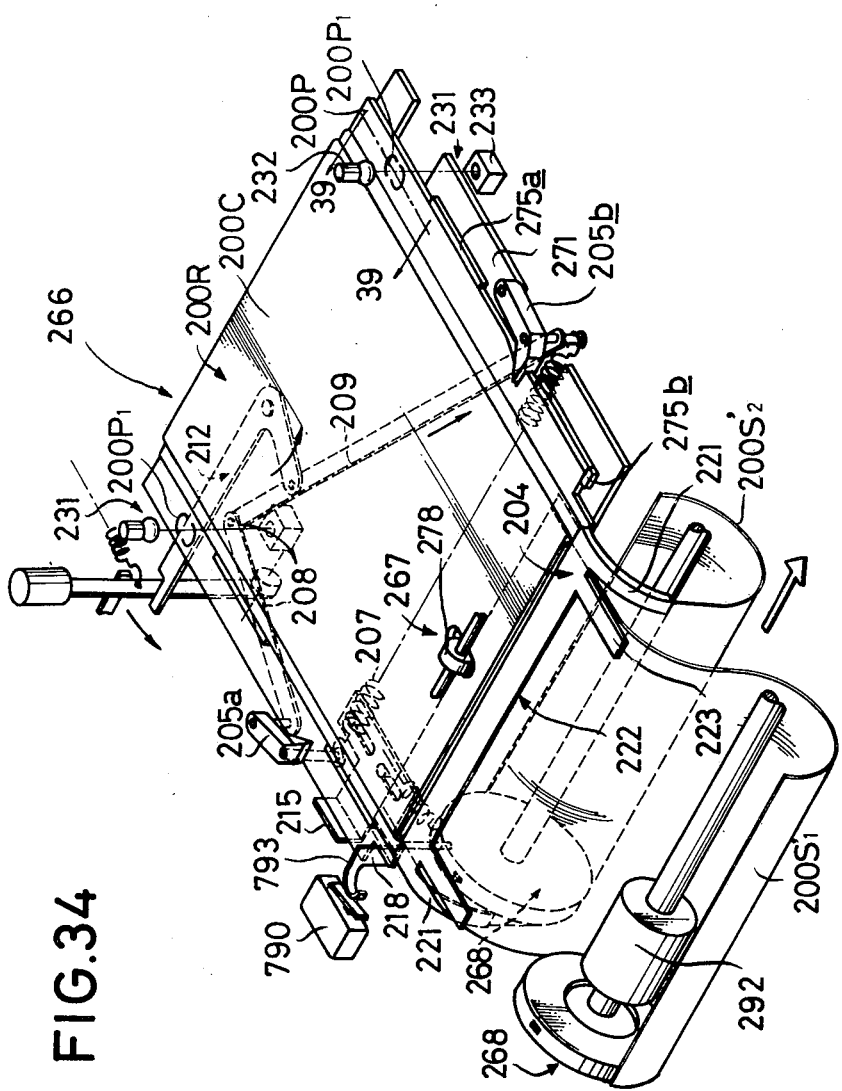
FIG. 34 is a schematic perspective view illustrating portions of an apparatus according to this invention for recording and/or reproducing signal information on the record sheets of the record assembly shown on FIGS. 31–33.
Figure 35:
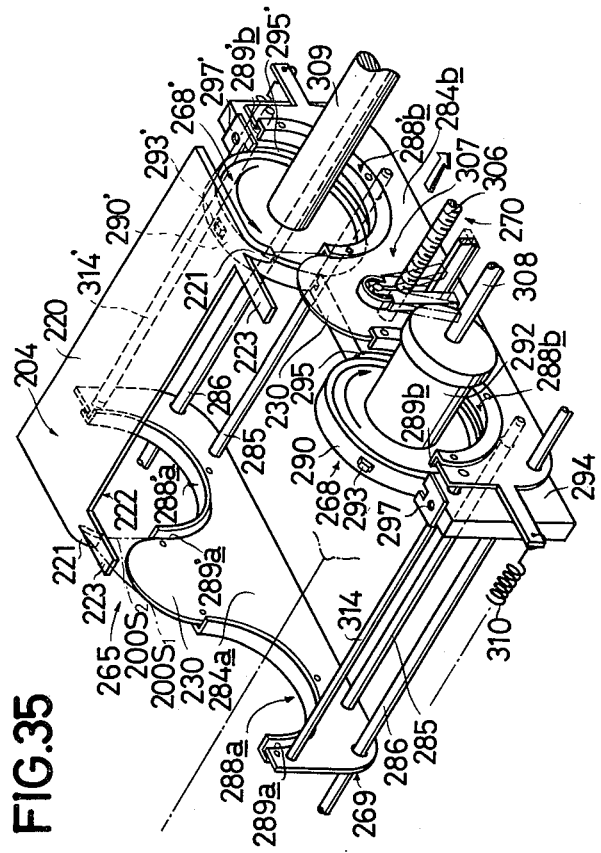
FIG. 35 is a schematic perspective showing the carriage of the apparatus illustrated on FIG. 34 in the starting position of such carriage.

Referring now to FIGS. 34 and 35, it will be seen that a recording and/or reproducing apparatus 265 in accordance with this invention for use with the record assembly 200R may generally comprise a holder 266 for receiving and positioning the cover 200C of the record assembly, a sheet driving device 267 operative selectively for moving sheets $200S_1$ and $200S_2$ relative to cover 200C from their stored positions to respective operative positions and for returning the sheets to their stored positions from such operative positions, rotary signal transducer assemblies 268 and 268' movable in respective circular paths about axes substantially at right angles to the directions of movement of the sheets between the stored and operative positions, with such axes being parallel and spaced from each other, a sheet separator 204 which is operative, upon the movement of the sheets from their stored positions within cover 200C, to separate major portions of the sheets from each other, a sheet guiding assembly 269 (FIG. 35) receiving the separated major portions of the sheets during the movement of the latter to their operative positions and guiding such major portions of sheets $200S_1$ and $200S_2$ in respective arcuate paths substantially coinciding with at least portions of the circular paths of travel of the rotary signal transducer assemblies 268 and 268', respectively, and translating means 270 for moving holder 266 and sheet guiding assembly or carriage 269, as a unit, and hence record assembly 200R, relative to the transducer assemblies 268 and 268' in directions parallel to the axes of rotation of the transducer assemblies so that the transducers or heads of the latter scan respective successive record tracks on the major portions of sheets $200S_1$ and $200S_2$.

Figure 36:
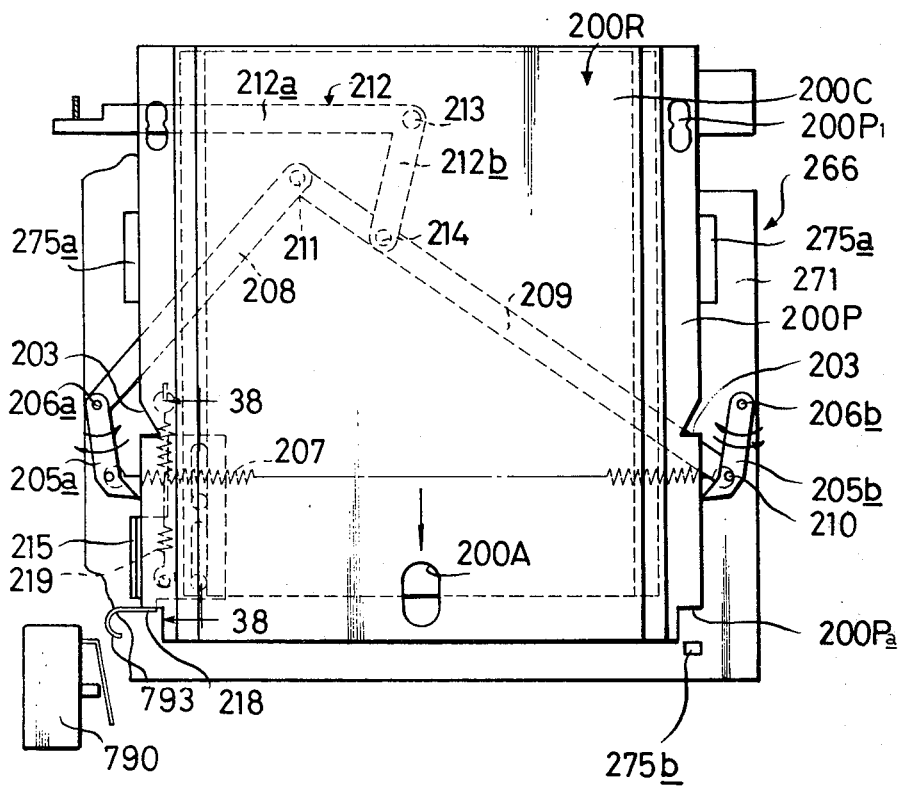
FIG. 36 is a top plan view of the holder of the apparatus shown on FIG. 34 during the movement of a record assembly to its loaded position on such holder.

As shown particularly on FIGS. 34 and 36, the holder 266 for receiving and positioning a record assembly 200R may simply comprisee a substantially horizontal table 271 which is laterally movable in directions parallel to the axes of rotation of transducer assemblies 268 and 268'. Guide members 275a are directed upwardly from the opposite side portions of table 271 and are slidably engageable by the opposite side edges of base plate 200P for guiding the record asembly 200R during its longitudinal sliding movement to and from its loaded position on table 271 (FIG. 34). Further, a stop 275b projects upwardly from one side portion of table 271 adjacent the front end of the latter and is engageable by the shoulder 200Pa at the respective side of base plate 200P for limiting the movement of the record assembly to its loaded position.

In order to releasably lock record assembly 200R in its loaded position, latch elements 205a and 205b are pivotally mounted on the opposite side portions of table 271, as at 206a and 206b, and are provided with noses at their free ends which are engageable in notches 203 when record assembly 200R is in its loaded position on table 271 (FIG. 34). A tension spring 207 is connected, at its opposite ends, to latch elements 205a and 205b for urging the latter in the directions moving the noses thereof against the adjacent side edges of base plate 200P, and hence for retaining the noses of latch elements 205a and 205b in the respective cutouts 203. For the purpose of effecting release of latch elements 205a and 205b, a lever arm 208 is angularly fixed relative to latch element 205a and extends generally rearwardly and inwardly under table 271 from the pivot pin 206a, and a link 209 which also extends under table 271 is pivotally connected, at one end, to latch element 205b, as by a pin 210, while the opposite end of link 209 is connected to the free end of lever arm 208 by a pin and slot connection 211. A bellcrank 212 having angularly related arms 212a and 212b is pivotally mounted under table 271, as at 213, with its arm 212a extending laterally from the pivot 213 beyond a side of table 271, and with its other arm 212b extending forward from pivot 213 and being pivotally connected, at its free end, to link 209, as at 214 (FIG. 36). It will be apparent that, when bellcrank 212 is turned in the counter-clockwise direction, as viewed on FIG. 36, link 209 is substantially longitudinally displaced in the direction toward latch element 205b whereby to angularly displace the latter in the direction for releasing its nose from the respective notch 203. Such longitudinal displacement of link 209 causes turning of lever arm 208, and hence of latch element 205a, in the clockwise direction for also releasing the nose of latch element 205a from the respective notch 203. Thus, when record assembly 200R is in its loaded position with the noses of latch elements 205a and 205b engaged in the respective nothes 203, as on FIG. 34, angular displacement of bellcrank 212 in the counter-clockwise direction is effective to release the latch elements from notches 203 and thereby free record assembly 200R for rearward sliding movement from its loaded position.

Figure 38:
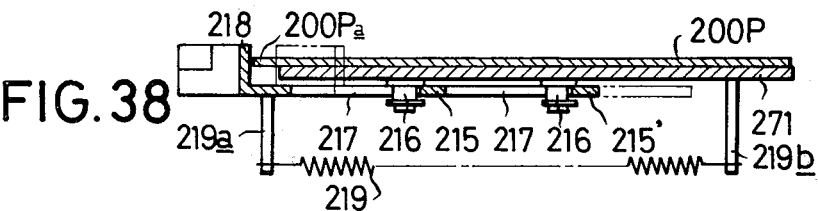
FIG. 38 is an enlarged, detail sectional view taken along the line 38—38 on FIG. 36.

In order to automatically eject record assembly 200R from its loaded position on table 271, the illustrated apparatus has a slide 215 disposed under the forward portion of table 271 adjacent the side of the latter remote from stop 275b and being mounted for longitudinal sliding movement of the slide 215 relative to table 271, for example, by pins 216 depending from table 271 and engaging in slots 217 in slide 215 (FIG. 38). The forward end of slide 215 has an upwardly directed abutment 218 extending above the surface of table 271 and being engageable by the shoulders 200Pa at the respective side of base plate 200P in the course of the movement of record assembly 200R to its loaded position. A tension spring 219 extends rearwardly from an anchor pin 219a on slide 215 to an anchor pin 219b depending from table 271 for yieldably urging slide 215 to a relatively rearward position indicated in broken lines at 215'. Thus, in moving record assembly 200R forwardly over table 271 toward its loaded position, the abutment 218 is engaged by the respective shoulder 200Pa prior to the arrival of the record assembly at its loaded position and, thereafter, as the record assembly is further moved forwardly to its loaded position, slide 215 is driven fowardly against the force of spring 219, for example, to the position shown in full lines on FIG. 38. Finally, when record assembly 200R arrives at its loaded position against stop 275b, latch elements 205a and 205b engage in the respective notches 203 for retaining the record assembly in its loaded position against the force of spring 219. However, when latch elements 205a and 205b are released from the respective notches 203, as described above, spring 219 is then free to displace slide 215 rearwardly and, by reason of the engagement of abutment 218 against the respective shoulder 200Pa, to also rearwardly displace record assembly 200R from its loaded position to an ejected position (not shown) at which the rear end portion of the cover or envelope record assembly 200R projects rearwardly off table 271 and thus can be easily grasped for removal from holder 266.

The sheet driving device 267 may be similar in construction and operation to the sheet driving device 67 previously described with reference to FIGS. 4, 11A and 11B, and is shown on (FIG. 37) to generally comprise an upper or pinch roller 278 rotatable on a shaft 280 which is located so that, with cover 200C of the record assembly in the loaded position on table 271, pinch roller 278 extends through the cutout 200A in the top wall of the cover or envelope for engagement with the upper sheet 200S$_1$, and a lower or driving roller 279 rotatable on a shaft 281 and being adapted, in the raised position of such shaft shown on FIG. 37, to extend through the cutouts 200A in base plate 200P and in the lower wall of the cover or envelope for engagement with the lower record sheet 200S$_2$, with both sheets being thereby pressed between rollers 278 and 279. Thus, with driving roller 279 being rotated in the counter-clockwise direction, as viewed on FIG. 37, both sheets 200S$_1$ and 200S$_2$ are moved by the cooperative action of rollers 278 and 279 in the direction away from their stored positions so that the leading end portions of the sheets are progressively extended out of the open end of cover or envelope 200C. By reason of the flexible resilience of sheets 200S$_1$ and 200S$_2$, the leading end portions of the sheets tend to curve downwardly as the sheets are progressively moved from their stored positions toward their operative positions.

In the case of the sheets 200S$_1$ and 200S$_2$ having different widths, as previously described, the sheet separator 204 may simply consist of a laterally extending plate 220 (FIGS. 34, 35 and 37) which extends across the open end of cover or envelope 200C in the loaded position of record assembly 200R and which is disposed above the level of the record sheets as the latter are moved out of the open end of the cover or envelope in response to the operation of sheet driving device 267. The edge portion of plate 220 remote from the open end of cover or envelope 200C has laterally spaced apart, downwardly curving extensions or fingers 221 extending therefrom and defining a cutout 222 therebetween which extends across plate 220 and which is substantially as wide as the upper sheet 200S$_1$. The downward curvature of fingers or extensions 221 is preferably greater than the natural downward curvature of resiliently flexible sheets 200S$_1$ and 200S$_2$ due to the force of gravity acting thereon as the sheets are moved out of cover or envelope 200C. Thus, as sheets 200S$_1$ and 200S$_2$ are moved out of cover 200C under plate 220 toward their operative positions, the upper, relatively narrow sheet 200S$_1$ passes freely through cutout 222 between downwardly curving fingers 221 and thus assumes the normal downward curvature due to the force of gravity, whereas the opposite side edge portions of the relatively wider lower sheet 200S$_2$ engage slidably against the downwardly curved extensions or fingers 221 and are further downwardly deflected or curved by the latter for separation from sheet 200S$_2$, as shown particularly on FIG. 37. If desired, and as shown on FIGS. 34 and 35, separator 204 may further include additional substantially horizontal guiding fingers extending from plate 220 at locations spaced inwardly from the downwardly curving fingers 221 for ensuring the the leading edge of the upper sheet 200S$_1$ will not inadvertently curl upwardly as it moves out from under plate 220.

As shown on FIG. 35, the carriage or sheet guiding assembly 269 to which holder 266 and sheet separator 204 are suitably fixed may be generally similar to the previously described carriage 69 and may include side members 284a and 284b which are fixed relative to each other in spaced apart parallel relation by spacer rods 285 and by sheet guide rods 314 and 314' which also function, in respect to sheet 200S$_1$ and 200S$_2$, in the same manner as the sheet guide rod 114 described above in connection with FIG. 17. Support rods 286 which are suitably fixed on a base (not shown) extend parallel to the axes of rotation of transducer assemblies 268 and 268' and extend slidably through suitable holes or bushings in side members 284a and 284b so as to mount carriage 269 for movements between its starting and terminal positions in directions parallel to the axes of rotation of the transducer assemblies.

In order to dispose the major portions of the two sheet in arcuate paths which extend substantially about the lower halves of the circular paths of travel of transducer assemblies 268 and 268' when such sheets are in their operative positions, as indicated at 200S₁ and 200S₂ on FIG. 34, arcuate guide members 288a and 288'a are mounted on side member 284a and similar arcuate guide members 288b and 288'b are mounted on side member 284b and define respective guide grooves 289a, 289'a, 289b and 289'b (FIG. 35) which are generally U-shaped. Arcuate guide members 288a and 288b are shown to be laterally aligned with each other at the front portion of carriage 269, while arcuate guide members 288'a and 288'b are similarly laterally aligned with each other at the back portion of carriage 269. The arcuate guide members 288a and 288b and the arcuate guide members 288'a and 288'b are spaced apart laterally by distances which respectively conform to the widths of sheets 200S₁ and 200S₂ so that, during movement of such sheets to their operative positions, the opposite side edges of sheet 200S₁ will be slidably received in arcuate guide grooves 289a and 289b while the opposite side edges of sheet 200S₂ will be similarly slidably received in arcuate guide grooves 289'a and 289'b. The pair of arcuate guide members 288a and 288b and the pair of arcuate guide members 288'a and 288'b may be similar to the guide member 88a and the guide member 88b, 88'b or 88''b described above with reference to FIGS. 19–27 so as to ensure the precise location of each sheet in its operative position. Thus, as shown on FIG. 37 in respect to the arcuate guide members 288a and 288'a, each of the latter may be constituted by an arcuate member 229 of L-shaped cross-section similar to the previously described member 129 and which is adjustably mounted in respect to the side member 284a along a respective arcuate edge 228 of the latter which functionally corresponds to the previously described arcuate member 128. Further, as shown on FIG. 37, the adjacent upwardly opening ends of guide grooves 289a and 289'a which constitute the entry portions thereof are spaced apart and located in respect to sheet separator 204 so that, as sheets 200S₁ and 200S₂ are moved toward their operative positions by sheet driving device 267 and separated from each other by separator 204, the opposite side edges of sheets 200S₁ and 200S₂, at their downwardly directed leading ends, will respectively enter the entry portions of guide grooves 289a and 289b and of guide grooves 289'a and 289'b, respectively. In order to assist in leading the side edges of the sheets into the respective guide grooves, a rounded portion 230 on each of side members 284a and 284b may extend upwardly from between the entry portions of the respective guide grooves.

A sheet support member 294 corresponding to the previously described sheet support member 94 is fixedly located at a position corresponding to rotary transducer assemblies 268 and 268' and is formed with arcuate sheet support surfaces 295 and 295' corresponding to the sheet support surface 95 of member 94, and being respectively operative to obtain the desired contact of the transducers or heads of assemblies 268 and 268' with the respective sheets in the operative positions of the latter. Stops 297 and 297' are mounted on the forward and back end portions of sheet support member 294 for limiting engagement by the leading ends of the respective sheets in their operative positions 200S'₁ and 200S'₂.

The rotary signal transducer assemblies 268 and 268' may be generally similar to the previously described transducer assembly 68 and, as shown, may respectively include rotatable drums 290 and 290' having substantially diametrically opposed magnetic recording and/or reproducing heads 293 and 293' projecting therefrom. Since the record sheets, in their operative positions, extend in generally opposed directions along the respective guide members 288a and 288b and guide members 288'a and 288'b, transducer assembly 268 may be directly driven by an electric motor 292 in the clockwise direction, as viewed on FIG. 35, while the other transducer assembly 268' is driven in the counterclockwise direction by a suitable transmission (not shown) connecting an extension shaft projecting from motor 292 with the shaft 309 of transducer assembly 268'.

The translating means 270 for moving sheet separator 204, holder 266 and carriage 269, as a unit, relative to transducer assemblies 268 and 268' between the starting and terminal positions of carriage 269 may generally comprise a feed screw 306 which may be suitably rotated in response to operation of motor 292, and a nut assembly 307 which is mounted on side member 284b of the carriage and which is threadably engageable with feed screw 306. If recording or reproducing operations of apparatus 265 are to be conducted only during the movement of carriage 269 from its starting position to its terminal position, nut assembly 307 may be disengageable from feed screw 306, as hereinafter described in detail, when carriage 269 attains its terminal position, whereupon springs 310 suitably connected to the carriage are effective to cause the relatively rapid return movement of carriage 269 to its starting position illustrated on FIG. 35. However, if recording or reproducing operations are to be conducted during movement of carriage 269 from its starting position to the terminal position and also during return movement of the carriage from its terminal position to the starting position, then nut assembly 307 may remain engaged with screw 306 upon the arrival of carriage 269 at its terminal position, and the return movement of the carriage may be effected by suitably reversing the direction of rotation of feed screw 306.

Figure 41:
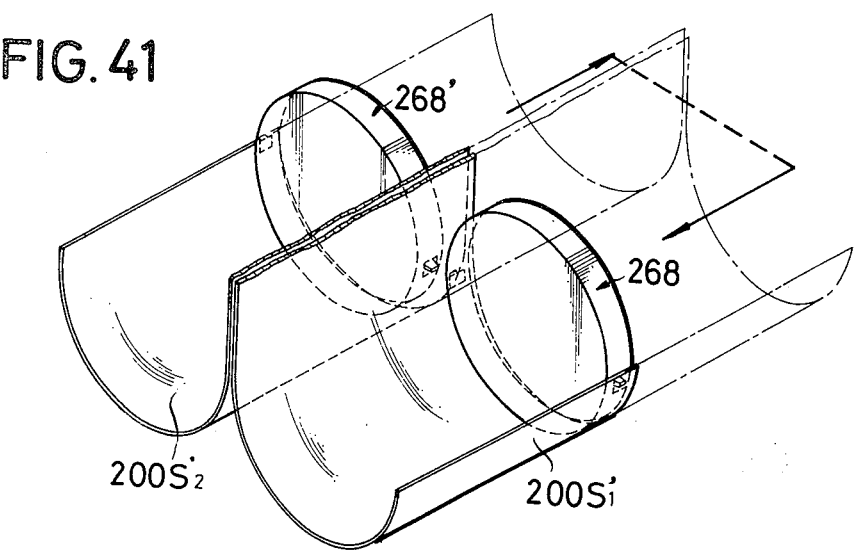
FIG. 41 is a schematic perspective view illustrating the manner in which video signal information may be recorded successively on the two record sheets of the record assemly illustrated on FIGS. 31-33 so as to provide an extended playing time of the apparatus.

As shown schematically on FIG. 41, recording or reproducing operations may be conducted during movement of carriage 269 in both directions in the case where both transducer assemblies 268 and 268° are adapted to record and/or reproduce video signal information on the respective record sheets in their operative positions 200S'₁ and 200S'₂. In the foregoing case, during a recording operation, transducer assembly 268 is made operative during the movement of carriage 269 from its starting position to its terminal position for recording video signal information on the respective record sheet and, when the carriage attains its terminal position, transducer assembly is rendered inoperative and transducer assembly 268' is thereafter operative, during the return movement of the carriage to its starting position, for continuing the recording of video signal information on the respective record sheet. The transducer assemblies 268 and 268' are similarly rendered operative alternately during movement of carriage 269 in the opposite directions, respectively, when a reproducing operation is being conducted. Thus, with the arrangement illustrated schematically on FIG. 41, a relatively long playing time may be obtained for recording or reproducing video signals on the two record sheets contained in a single record assembly.

In the case where recording or reproducing operations are conducted only during movement of carriage 269 in one direction, that is, from the starting position to the terminal position of the carriage, then transducer assembly 268 may be adapted to record or reproduce video signal information on the respective sheet in its operative position $200S'_1$, while the other transducer assembly 268' is adapted to simultaneously record or reproduce audio signal information on the respective record sheet in its operative position $200S'_2$. When the record assembly 200R contains two record sheets $200S_1$ and $200S_2$ which are intended to have video signal information and audio signal information, respectively, recorded and reproduced thereon, it is important that the record assembly be placed in holder 266 of apparatus 265 with sheet $200S_1$ above sheet $200S_2$. It will be apparent that if the position of record assembly 200R on holder 266 is inverted from the foregoing, that is, if the wider sheet $200S_2$ is above the relatively narrower sheet $200S_1$, the sheet separator 204 will not be able to properly separate the sheets during movement of the latter to their operative positions, and both sheets will be guided together about transducer assembly 268'. In order to ensure the correct orientation of record assembly 200R on holder 266, the notch in one side edge portion of base plate 200P, as indicated in broken lines at 203' on FIG. 31, may be substantially out of lateral alignment with the notch 203 in the other side edge portion of base plate 200P, and the latch elements 205a and 205b may be similarly out of lateral alignment on table 271 so that latch elements 205a and 205b can engage in notches 203 and 203', respectively, for locking the record assembly in its loaded position only when the record assembly is disposed in its correct orientation on table 271.

Figure 42:
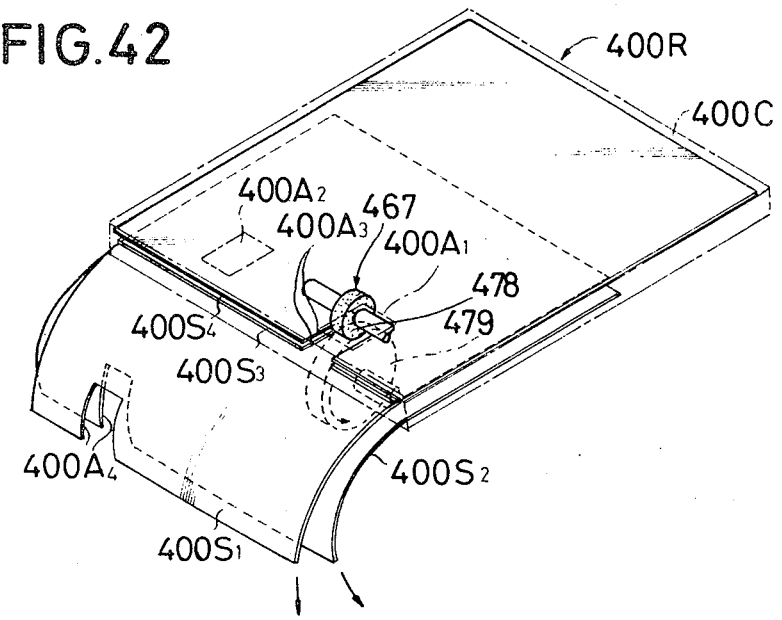
FIG. 42 is a schematic perspective view of a record assembly according to another embodiment of this invention which contain four record sheets arranged in pairs and associated with a modified sheet driving device so that the pairs of record sheets may be selectively moved from their stored positions to their operative positions for the recording or reproducing of signal information thereon.

The above described apparatus 265, with the hereinafter described modification thereof, may also be employed in connection with a record assembly 400R shown schematically on FIG. 42 to generally comprise a substantially rigid, rectangular cover or envelope 400C which is open at one end and which slidably contains a first pair of record sheets $400S_1$ and $400S_2$ generally similar to the previously described record sheets $200S_1$ and $200S_2$, and also a second pair of record sheets $400S_3$ and $400S_4$ which are also similar to the previously described record sheets $200S_1$ and $200S_2$. The top and bottom walls of cover or envelope 400C are provided with cutouts or apertures $400A_1$ and $400A_2$ spaced from the longitudinal median of cover 400C at opposite sides thereof, and the pinch roller 478 and driving roller 479 of the sheet driving device 467 to be used in association with record assembly 400R are suitably offset from the center of the holder 266 so as to extend through cutouts $400A_1$ when record assembly 400R is in the position shown on FIG. 42, and to extend through the other cutouts $400A_2$ when the record assembly is inverted relative to the position shown on FIG. 42. Finally, the leading end portions of sheets $400S_3$ and $400S_4$ have cutouts $400A_3$ which, when such sheets are in their stored positions, as on FIG. 42, are registered with cutouts or apertures $400A_1$. Similarly, sheets $400S_1$ and $400S_2$ have cutouts $400A_4$ in their leading end portions which, when sheets $400S_1$ and $400S_2$ are in their stored positions, are registered with cutouts or apertures $400A_2$.

It will be apparent that, by reason of the arrangement described above with reference to FIG. 42, when record assembly 400R is disposed in the position shown on FIG. 42, pinch roller 478 will extend through cutout or aperture $400A_1$ in the top wall of cover 400C and through the cutouts $400A_3$ in sheets $400S_3$ and $400S_4$ so as to engage sheet $400S_1$, while driving roller 479 will extend through cutout or aperture $400A_1$ in the bottom wall of cover 400C to engage sheet $400S_2$. Therefore, when sheet driving device 467 is operated, pinch roller 478 and driving roller 479 will cooperate to move sheets $400S_1$ and $400S_2$ relative to cover 400C. On the other hand, if record assembly 400R is inverted from the position shown on FIG. 42, it is apparent that pinch roller 478 and driving roller 479 will then respectively engage sheets $400S_3$ and $400S_4$ for moving the latter relative to cover 400C upon operation of sheet driving device 467. Thus, with the record assembly 400R and sheet driving device 467 as shown on FIG. 42, the previously described apparatus 265 may function to record or reproduce signal information on either the sheets $400S_1$ and $400S_2$ or on the sheets $400S_3$ and $400S_4$.

Figure 39:
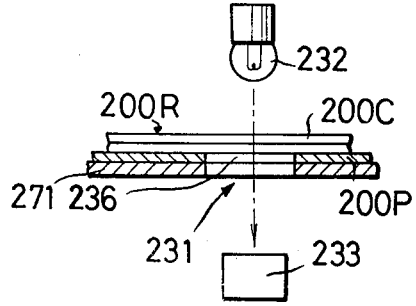
FIG. 39 is an enlarged detail sectional view taken along the line 39—39 on FIG. 34 and illustrating a detector included in the apparatus for preventing a recording operation thereof when the record sheets have signal information thereon which is not to be erased.

In the event that it is desired to prevent a recording operation of apparatus 265 when the record sheets of a record assembly 200R installed on holder 266 already have signal information recorded thereon which is not to be erased, then the cover or envelope 200C, and preferably at least one side edge portion of its base plate 200P, has a removable portion, for example, as indicated at $200P_1$ on FIG. 40A, which, by its absence, as on FIG. 40A' indicates the recording on the sheet or sheets of signal information which is not to be erased, and a detector 231 (FIGS. 34 and 39) is provided adjacent holder 266 for detecting the absence of such removable portion $200P_1$ from the record assembly 200R positioned on the holder and for preventing the recording operation of the apparatus in response to such detection.

The removable portion of the base plate 200P may have various configurations. For example, as shown on FIG. 40A, the removable portion $200P_1$ may be of oblong configuration and defined by two U-shaped, oppositely facing slots having their ends slightly spaced from each other to provide narrow necks 235 of plastic material which join the removable portion $200P_1$ to the remainder of base plate 200P and which may be easily broken for the removal of portion $200P_1$ so as to leave an opening 236 in base plate 200P (FIG. 40A'). Alternatively, as shown on FIG. 40B, a removable portion $200P'_1$ may be defined by two opposed L-shaped slots 234' having their ends slightly spaced from each other and from the adjacent side edge of base plate 200P so as to leave narrow necks 235' of material at which the removable portion may be broken away so as to leave a cutout 236' in the edge portion of plate 200P, as on FIG. 40B'. Still another configuration is illustrated on FIG. 40C, in which the removable portion $200P''_1$ is in the form of a tab projecting from the side edge of base plate 200P with a slot 234'' extending therebetween along substantially the length of the tab $200P''_1$ so that the latter is connected to the remainder of base plate 200P only at narrow necks of material 235'' which can be easily broken away for removing the tab, as shown on FIG. 40C'. The detector 231 for detecting the absence of any of the removable portions $200P_1$, $200P'_1$ or $200P''_1$ may include a light source 232 and a photocell 233 located above and below table 271 so that, when record assembly 200R is in its loaded position on table 271, the described removable portion of base plate 200P will be interposed in the path of light from source 232 to photocell 233 (FIG. 34). However, if the removable portion 200P$_1$ is absent so as to leave an opening 236, as on FIG. 39, then light from source 232 can activate photocell 233 and, as hereinafter described, such activation may prevent a recording operation of the apparatus.

In the event that recording and reproducing operations are to be performed during movement of carriage 269 in both directions, for example, as described above with reference to FIG. 41, then base plate 200P of record assembly 200R may have removable portions 200P$_1$ included in its opposite side edge portions for indicating by their absence that signal information is already recorded on the respective record sheets 200S$_1$ and 200S$_2$, and the apparatus 265 is provided with two detectors 231 which are located to respectively detect the absence of the removable portions 200P$_1$ in the opposite edge portions of base plate 200P. With the foregoing arrangement, the detection of the absence of a removable portion 200P$_1$ by one of the detectors 231 will prevent a recording operation during movement of carriage 269 in one direction, while the detection of the absence of a removable portion by the other detector 231 will prevent a recording operation during the movement of carriage 269 in the other direction.

In the above described record assemblies according to this invention having two or more record sheets, such record sheets have been shown as being of equal length. However, in feeding such sheets along different paths to respective operative positions at which signal information is to be recorded or reproduced on the sheets, the lengths of the paths may be different and, therefore, it will be necessary to provide the several record sheets with suitably different lengths for ensuring that the trailing end portions of the sheets will all remain within the cover or envelope when the sheets are in their operative positions. Thus, for example, as shown on FIGS. 44 and 45A, a record assembly 500R in accordance with this invention may include three record sheets 500S$_1$, 500S$_2$ and 500S$_3$ of progressively increasing lengths L$_1$, L$_2$ and L$_3$, respectively, which are loosely guided in a relatively rigid cover or envelope 500C which is open at one end, and which is shaped at its periphery so that, in the stored positions of the record sheets, the leading end edges of the several sheets will be aligned and extend across the middle of cutouts or apertures 500A provided in the upper and lower walls of cover 500C. When the record assembly 500R is employed in association with a recording and/or reproducing apparatus according to this invention, all three sheets will be gripped between the pinch roller 78 and driving roller 79 of the previously described sheet driving device 67 for moving the three sheets toward their respective operative positions until sheet 500S$_1$ attains its operative position and its trailing end edge moves out from under pinch roller 78, as shown on FIG. 45B. Thereafter, sheets 500S$_2$ and 500S$_3$ will be gripped between rollers 78 and 79 and, accordingly, will continue to move toward their operative positions until sheet 500S$_2$ attains its operative position and the trailing end edge thereof moves out from under pinch roller 78, as shown on FIG. 45C. Finally, only sheet 500S$_3$ will be engaged between rollers 78 and 79 for continuing its movement to its operative position at which the trailing end edge of sheet 500S$_3$ moves out from under pinch roller 78. Thus, when all of the sheets have attained their respective operative positions, the trailing end edges of the sheets are all aligned and extend across the middle of cutouts or apertures 500A. When pinch roller 78 is shifted, as previously described, for effecting the return movement of the sheets to their stored positions from their operative positions, the trailing end edge portions of all of the sheets are initially engaged between rollers 78 and 79, and the driving of the sheets 500S$_1$, 500S$_2$ and 500S$_3$ is discontinued, in order, as the sheets attain their respective stored positions.

Figure 37:
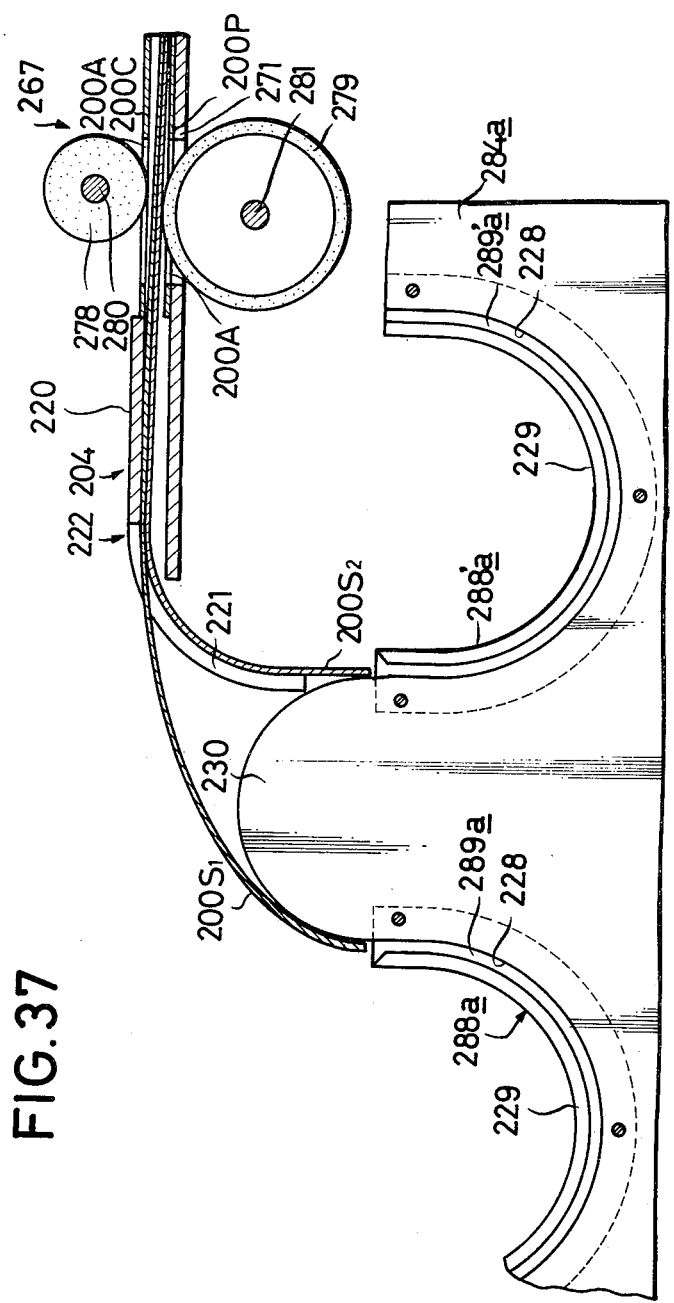
FIG. 37 is a diagrammatic sectional view illustrating the manner in which a separator device included in the apparatus of FIG. 34 is effective, during the movement of the record sheets to their operative positions, to separate such record sheets and direct the same to respective sheet guides.
Figure 46:
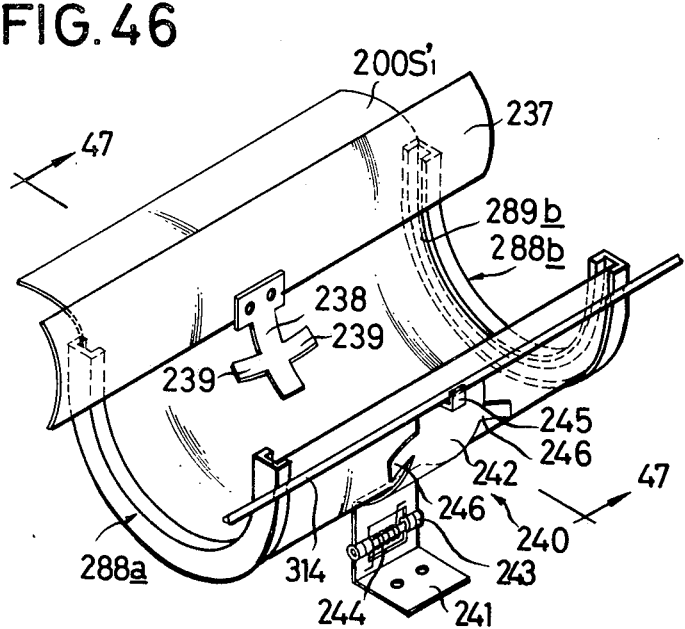
FIG. 46 is a schematic perspective view illustrating additional sheet guiding members that are preferably provided in association with the record sheet which undergoes a double or reverse curvature in moving to its operative position, as in the apparatus of FIGS. 34 and 35.
Figure 47:
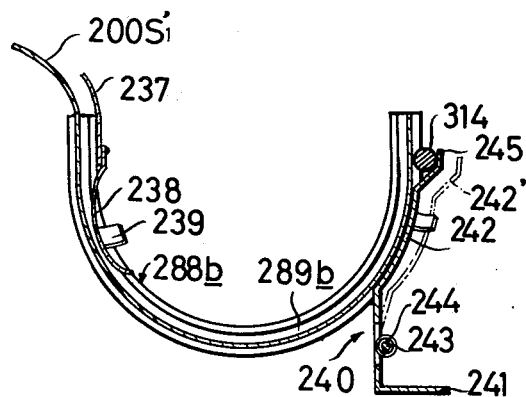
FIG. 47 is a transverse sectional view taken along the line 47—47 on FIG. 46.

When one of the record sheets has its curvature reversed during movement to its operative position, for example, as is the case with sheet 200S$_1$ on FIG. 37 which is curved in one direction in moving from sheet separator 204 to the respective sheet guide members 288a and 288b, and is curved in the opposite direction when moving along those guide members, the sheet has a tendency to bend or bow upwardly between the guide grooves 289a and 289b, particularly at the location where the curvature is reversed. The foregoing tendency is accentuated as the thickness of the record sheet is increased. As shown particularly on FIGS. 46 and 47, the foregoing tendency can be overcome by providing a fixed arcuate plate 237 extending laterally over the range of movements of arcuate guiding members 288a and 288b and being disposed near the entry portions of the respective sheet guiding grooves 289a and 289b. A spring or resilient member 238 depends from the midportion of arcuate plate 237 to bear against the inner surface of sheet 200S$_1$ at the location where the curvature of the latter is reversed, and spring member 238 has bent arms 239 which can ride onto the radially inward surface of each of the arcuate guide members 288a and 288b at the limits of the translatory movement of carriage 269 so that the structure shown on FIGS. 46 and 47 will not interfere with or limit the movement of the carriage between its starting and terminal positions. An additional sheet guiding device 240 may be provided (FIGS. 46 and 47) and is shown to include a fixed base 241 on which an arcuate sheet guide member 242 is pivotally mounted by means of a hinge 243 having a torsion spring 244 associated therewith for yieldably urging sheet guide member 242 to its operative position (shown in full lines on FIG. 47) in which a finger 245 extending from the upper end of the guide member 242 bears against the adjacent sheet guiding rod 314. Bent arms 246 extend from the opposite sides of sheet guiding member 242 so as to ride over one or the other of the arcuate guide members 288a and 288b at the limits of the travel of carriage 269, whereby guide member 242 is deflected to the position shown in broken lines at 242' on FIG. 47 so as to avoid interference with the full travel of carriage 269.

A preferred mode of operation of the apparatus 265 according to this invention for recording and reproducing video and audio signals on the record sheets 200S$_1$ and 200S$_2$ will now be described with reference to FIGS. 57A–57D.

Figure 57:
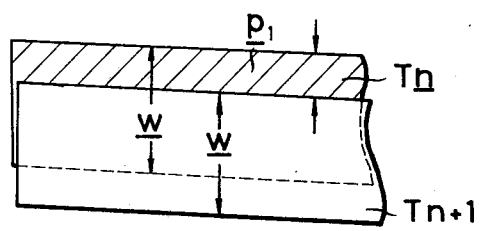
FIG. 57A is an enlarged diagrammatic view illustrating the record tracks in which video signal information is recorded on the respective record sheet in accordance with a preferred embodiment of this invention.
FIG. 57B is a diagrammatic view to which reference will be made in explaining the method by which video signal information is recorded in the record tracks shown on FIG. 57A.
FIG. 57C is an enlarged diagrammatic view to which reference will be made in explaining the reproducing of the video signal information from the record tracks shown on FIG. 57A.
FIG. 57D is a diagrammatic view similar to that of FIG. 57A, but showing the record tracks in which audio signal information is recorded on the respective record sheet in a preferred embodiment of the invention.
Figure 57A:
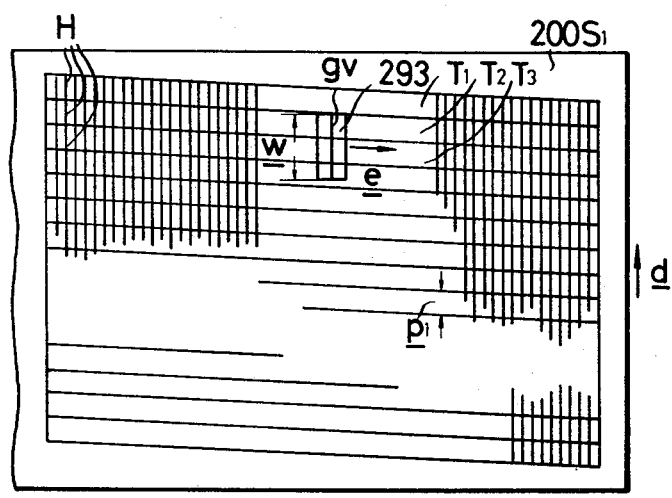
Figure 57D:
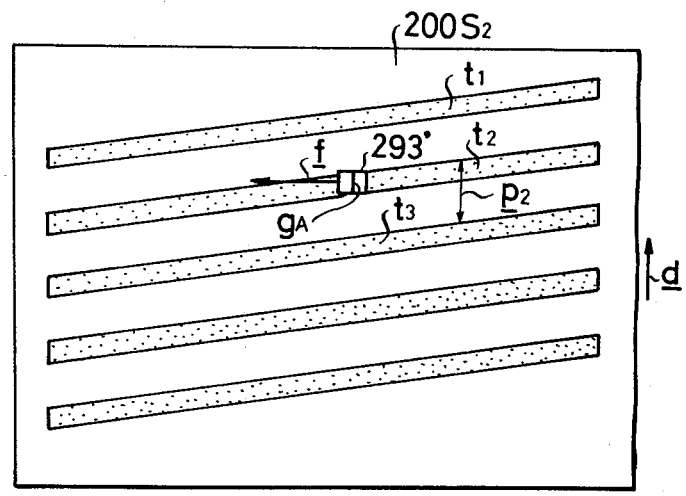

It will be seen from FIGS. 57A and 57D that, with sheets 200S$_1$ and 200S$_2$ extending about the circumferences of drums 290 and 290', respectively, over an angular extent of at least 180°, and with the video recording heads 293 moving at a predetermined speed in the plane of their rotation as indicated by the arrow $e$ (FIG. 57A) and the audio recording heads 293' moving at a predetermined speed in their plane of rotation as indicated by the arrow $f$ (FIG. 57D), while both sheets $200S_1$ and $200S_2$ are simultaneously moved, at the same speed, transversely to the planes of rotation of the respective heads, as indicated by the arrows $d$, then heads 293 will alternately scan sheet $200S_1$ along parallel, successive tracks arranged in a series across the width of that sheet, as at $T_1$, $T_2$ and $T_3$. Such record tracks will be inclined relative to the opposed side edges of sheet $200S_1$, with the inclination of the tracks and the pitch $p_1$ thereof being determined by the relationship of the speed of movement of heads 293, indicated by the arrow $e$, and the speed of movement of the sheet transverse to the plane of rotation of the heads, as indicated by the arrow $d$. Similarly, the audio recording heads 293' will alternately scan the respective sheet $200S_2$ along successive, parallel record tracks which are arranged in a series across the width of that sheet, as indicated at $t_1, t_2$ and $t_3$, which tracks are inclined relative to the opposite side edges of sheet $200S_2$ with the inclination of the tracks and their pitch $p_2$ being determined by the relation of the speed of rotational movement of heads 293', as indicated by the arrow $f$, and the speed of movement of sheet $200S_2$ transverse to the plane of rotation of those heads, as indicated by the arrow $d$.

It will be apparent that, if video signals are applied to heads 293 and audio signals are applied to heads 293' during the described scanning of sheets $200S_1$ and $200S_2$ by such heads, video and audio signal information will be recorded in the tracks $T_1, T_2, T_3$ - - etc. on sheet $200S_1$ and in the tracks $t_1, t_2, t_3$ - - - etc. on sheet $200S_2$, respectively.

Preferably, in the apparatus according to this invention, the heads 293 for recording and reproducing video signal information are each provided with an air gap $g_V$ having a width $w$ (FIG. 57A) which is substantially larger than the pitch $p_1$, that is, the distance through which the sheet $200S_1$ is moved in the direction of the arrow $d$ during the rotation of each of heads 293 through 180°. As a result of the foregoing, and as shown particularly on FIG. 57B, after one of the heads 293 has recorded video signal information in a track $T_n$ having a width $w$, the other head 293 records video signal information in the next track $T_{n+1}$ which also has the width $w$, but which overlaps and erases a portion of the previous track $T_n$ so as to effect so-called overlap writing. Accordingly, the successive tracks $T_1, T_2$ and $T_3$ in which video signals are recorded each have an effective width equal to the pitch $p_1$ which is substantially less than the gap width $w$ of the heads 293. Since there are no gaps or guard bands between the successive record tracks $T_1, T_2, T_3$ - - - etc. for the recording of the video signal information, it will be apparent that the utilization of the area of record sheet $200S_1$ for the recording of the video signal information is enhanced.

Further, the preferred apparatus according to this invention rotates the audio recording and reproducing heads 293' at a slower speed that the video recording and reproducing heads 293, so that the inclination of the audio record tracks $t_1, t_2, t_3$ - - - etc. and the pitch $p_2$ between adjacent sudio record tracks will be greater than the inclination and pitch, respectively, of the video record tracks. In any case, the width of the air gap $g_A$ of each of the heads 293' for recording and/or reproducing the audio signal information is selected to be substantially smaller than the pitch $p_2$ so that the audio record tracks will be formed on record sheet $200S_2$ with substantial spaces therebetween, as shown on FIG. 57D.

When the video signal information being recorded and reproduced corresponds to that of a standard television picture signal having sixty fields, or thirty frames, per second, the drum 290 and associated heads 293 are preferably rotated at a speed of 30 revolutions per second, so that each of the record tracks $T_1, T_2, T_3$ - - - etc. will contain video signal information corresponding to a single television picture field. The heads 293 are substantially diametrically opposed on drum 290, but with the angular distance therebetween deviating from 180° by an angle corresponding to 0.5H (in which H represents one horizontal period of the standard video signal). By reason of the foregoing, and as shown on FIG. 57A, the recording positions H of the horizontal synchronizing signals in the successive record tracks are arranged on straight lines extending parallel to the direction of the air gaps $g_V$ of heads 293. The heads 293' for recording and reproducing the audio signal information may be angularly spaced apart on drum 290' by precisely 180°, and may be rotated at a relatively slow speed, for example, at a speed of five revolutions per second in the case where heads 293 are being rotated at a speed of 30 revolutions per second.

In a preferred recording and/or reproducing apparatus according to this invention, the signal actually recorded by heads 293 is obtained by employing the video signal to phase modulate a suitable carrier, for example, as disclosed in detail in U.S. patent application Ser. No. 425,845, filed Dec. 18, 1973, and having a common assignee herewith, while the signal recorded by the heads 293' is obtained by conventionally superposing a biasing signal on the audio signal. Thus, as shown on FIG. 56, in such apparatus according to this invention, a video signal supplied to an input terminal 601 is applied from the latter to a phase modulator 602 in which the video signal phase-modulates a carrier which is supplied from an oscillator 603. The resulting phasemodulated signal is adapted to be supplied through a recording contact R of a recording-reproducing switch 604 to heads 293.

Figure 57C:
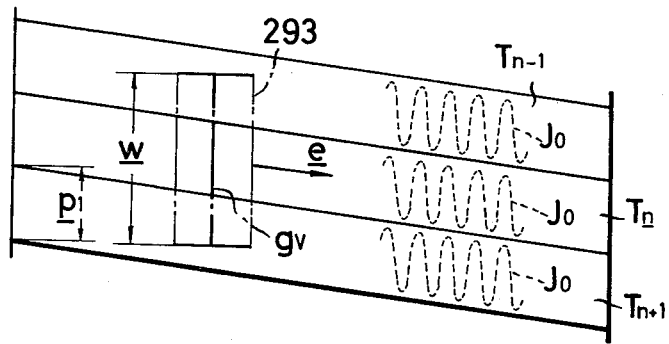

In the foregoing arrangement, the oscillator 603 for providing the carrier to be phase-modulated by the video signal is suitably synchronized with the rotation of heads 293 so that the phases of the carriers $J_0$ to be modulated, indicated in broken lines on FIG. 57C, in the successive tracks $T_{n-1}, T_n, T_{n+1}$, - - - are aligned in the directions parallel to the direction of the air gaps $g_V$ of heads 293. Further, the modulation index of the phase modulation, which is expressed as a radian corresponding to the phase deviation of the modulated carrier relative to the unmodulated carrier, is selected to be relatively small, for example, less than about 1.0 so that the side band components of the second and higher order signals become sufficiently small and can be neglected.

Returning to FIG. 56, it will be seen that the audio signal is applied to an input terminal 605 from which it is adapted to be supplied through an amplifier 606 and equalizer 607 to a recording contact R of a recording-reproducing switch 608. The output of equalizer 607 has superposed thereon a bias signal from an oscillator 609 and, during recording, the resulting signal is supplied from switch 608 to heads 293'.

Figure 56:
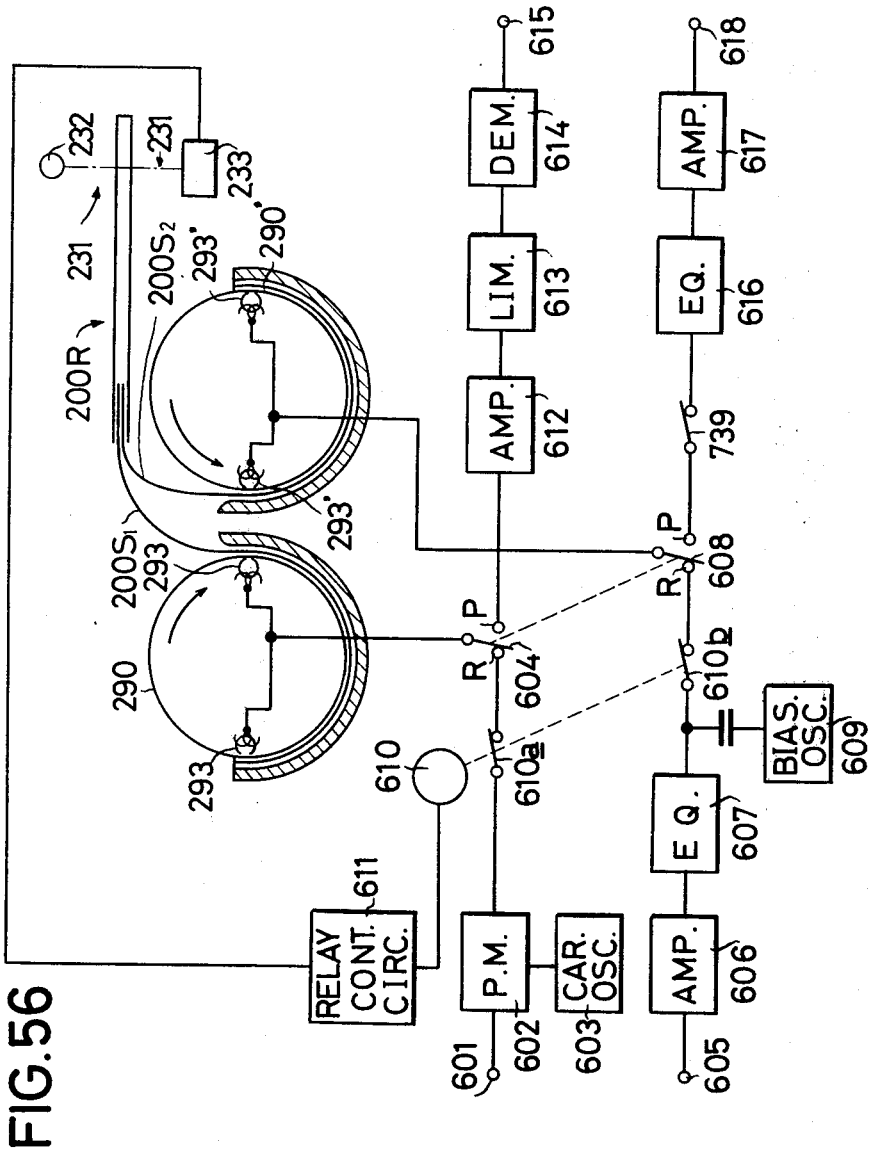
FIG. 56 is a circuit diagram of recording and reproducing circuits of an apparatus according to this invention for recording and reproducing video and audio signal information in a manner to enhance the playing time obtainable from each record sheet.

In order to prevent a recording operation of the apparatus when sheets $200S_1$ and $200S_2$ already have video and audio signal information recorded thereon which is not to be erased, the circuit arrangement of FIG. 56 is shown to include a relay 610 having normally closed contacts 610a and 610b interposed between phase modulator 602 and switch 604 and between equalizer 607 and switch 608, respectively, so that, with switches 604 and 608 engaging their R contacts for selecting a recording operation, signals are passed to heads 293 and 293' for recording on sheets 200S$_1$ and 200S$_2$ only so long as relay 610 is deenergized for maintaining its contacts 610a and 610b in their normal closed condition. Further, as shown, a circuit 611 for energizing relay 610 is controlled by photocell 233 of detector 231 so that relay 610 is energized only when photocell 233 receives light from the associated source 232 in response to the absence from record assembly 200R of the previously described removable portion 200P$_1$ (FIG. 40A). When relay 610 is thus energized for opening its contacts 610a and 610b, the recording circuits for the video and audio signals are interrupted.

For reproducing or playback operation of the apparatus, switches 604 and 608, which are indicated to be ganged, are changed over to engage the respective reproducing or playback contacts P while heads 293 and 293' are rotated in the same manner as described above for recording operation and sheets 200S$_1$ and 200S$_2$ are moved in the direction parallel to the axes of the rotary heads also in the same manner as for recording operation. The reproduced output from heads 293 is supplied through contact P of switch 604, a reproducing or playback amplifier 612 and a limiter 613 to a demodulator 614 which supplies its demodulated output or video signal to an output terminal 615. The reproduced output from heads 293' is supplied through contact P of switch 608, an equalizer 616 and a reproducing or playback amplifier 617 having its output connected to terminal 618 for providing a reproduced audio signal at such output terminal.

Since heads 293 for reproducing the recorded video signals each have an air gap $g_V$ with the width $w$ thereof being substantially larger than the pitch $p_1$ or effective width of the successive record tracks on sheet 200S$_1$, each of the heads 293 is effective, during reproducing or playback operation, to scan more than one of the record tracks, for example, the record track $T_n$ and portions of the adjacent record tracks $T_{n-1}$ and $T_{n+1}$, as shown on FIG. 57C. However, by reason of the use of phase modulation in recording the video signal, the demodulated reproduced signal obtained at output terminal 615 is substantially equivalent to the composite signal that would result from combining the original video signals corresponding to the respective tracks $T_n, T_{n-1}$ and $T_{n+1}$ with a predetermined level ratio therebetween corresponding to the position of the reproducing head relative to the record tracks in the direction across the latter, with the result that no beat interference is produced. Even if the scanning head 293 is shifted relative to the track $T_n$, for example, in the direction toward the adjacent track $T_{n-1}$ or in the direction toward the other adjacent track $T_{n+1}$, no beat interference due to cross-talk between adjacent tracks is generated, and hence a so-called tracking servo system is not required for the reproducing or playback operation of the apparatus.

Figure 48A:
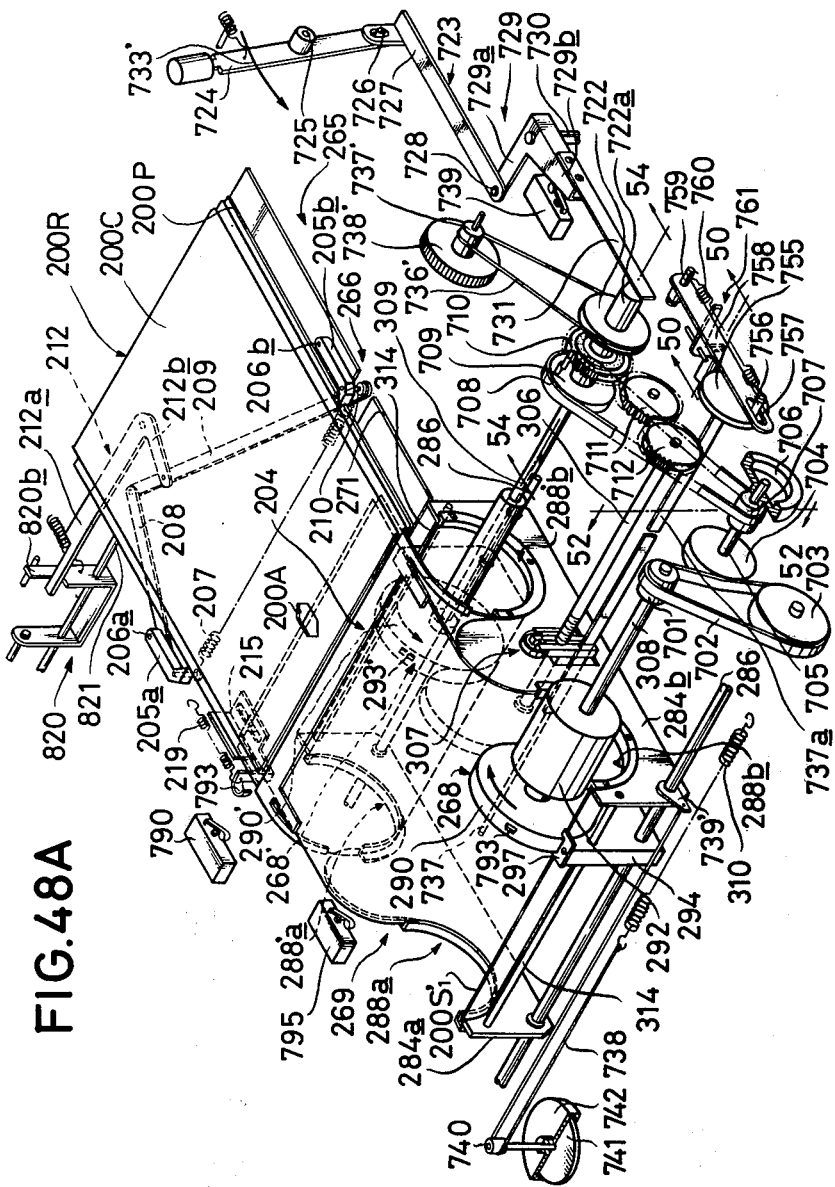
FIGS. 48A and 48B are schematic perspective views illustrating control mechanisms of a recording and/or reproducing apparatus according to a preferred embodiment of this invention.

Referring now to FIG. 48A, it will be seen that, in the apparatus 265 adapted for recording or reproducing video signal information by its heads 293 and for simultaneously recording or reproducing audio signal information by its heads 293', the rotation of heads 293' at a relatively slower speed than heads 293 may be achieved by providing a driving pulley 701 on extension shaft 308 of motor 292 for driving a belt 702 which runs around an idler pulley 703 and which further engages a relatively large diameter pulley 704. Pulley 704 is shown to be mounted on an idler shaft 705 which further carries a flywheel 706 and a relatively small diameter pulley 707 Pulley 707 drives a belt 708 which runs about a relatively large diameter pulley 709 secured, as by a set screw 709a (FIG. 54) on an end portion of shaft 309 of transducer assembly 268'. By reason of the foregoing transmission arrangement, high speed rotation of transducer assembly 268 in the clockwise direction, as viewed on FIG. 48A, results in relatively low speed rotation of transducer assembly 268' in the counterclockwise direction.

Figure 54:
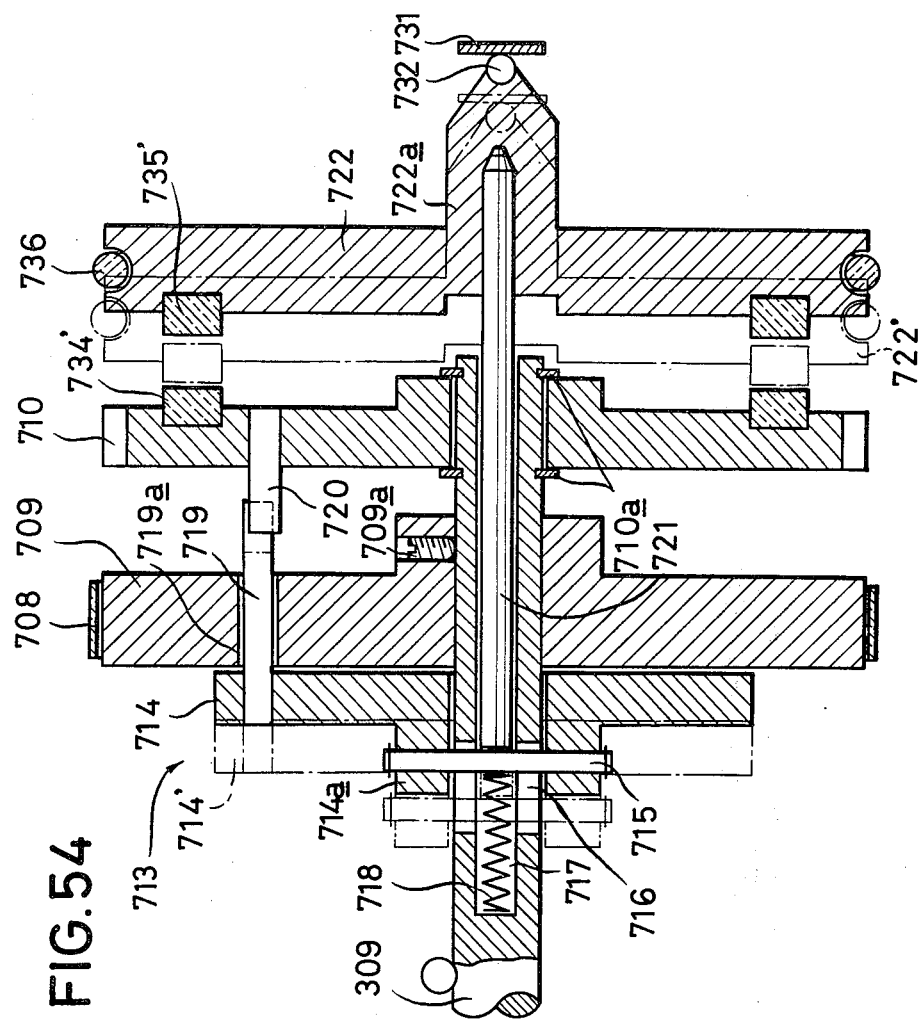
FIG. 54 is an enlarged sectional view taken along the line 54—54 on FIG. 48A, and showing a clutch assembly included in the apparatus for permitting slow motion and still motion reproduction of recorded video signal information.

In order to effect rotation of feed screw 306 for moving carriage 269 toward the right as viewed on FIG. 48A, that is, in the direction from its starting position to its terminal position, a gear 710 is mounted on an end portion of shaft 309 adjacent pulley 709 so as to be free to rotate relative to shaft 709 while being held against axial displacement in respect to shaft 309, for example, by retaining rings 710a (FIG. 54). Gear 710 continuously meshes with an idler gear 711 which, in turn, meshes with a gear 712 secured on an adjacent end of feed screw 306. Gear 710 is normally rotatably coupled with shaft 309 by a clutch mechanism 713 (FIG. 54) which is shown to include a driving disc 714 disposed at the side of pulley 709 remote from gear 710 and having a hub 714a slidable axially on shaft 309 and being rotatably coupled with the latter, as by a pin 715 which extends through an axially elongated slot 716 passing diametrically through shaft 309. Shaft 309 further has an axial bore 717 opening at the end of the shaft and receiving a compression spring 718 which is interposed between the closed end of bore 717 and pin 715 for urging disc 714 to its engaged position against pulley 709, as shown in full lines. A driving pin 719 extends axially from disc 714 through a correspondingly located axial bore 719a in pulley 709 and is axially dimensioned so that, when disc 714 is in its engaged position, the circular path of travel of the free end portion of driving pin 719 will extend into the circular path of travel of the free end portion of a driven pin 720 which extends axially from gear 710 in the direction toward pulley 709 and which is spaced radially from the axis of shaft 309 by a distance substantially equal to the radial spacing of driving pin 719 from the shaft axis. Thus, when disc 714 is in its engaged position shown in full lines on FIG. 54, driving pin 719 will engage against driven pin 720 for transmitting the rotation of shaft 309 to gear 710 with shaft 309 and gear 710 in a predetermined rotational position relative to each other. However, when driving disc 714 is moved axially to its disengaged position indicated in broken lines at 714' on FIG. 54, the free end of driving pin 719 is retracted axially relative to the free end of driven pin 720 so that shaft 309 can continue to rotate without the transmission of the rotational movement of shaft 309 to gear 710, and hence without rotation of feed screw 306, for example, when it is desired to continue the rotation of transducer assembly 268 while carriage 269 remains at rest, as during the still-motion reproduction of recorded video signals.

In order to effect the above described disengagement of clutch mechanism 713, the illustrated apparatus is further shown to include a shaft 721 (FIG. 54) which is rotatable and axially slidable in bore 717 so as to act, at its inner end, against pin 715, while the opposite end portion of shaft 721 projects axially from the open end of bore 717 for the mounting thereon of the hub 722a of a pulley 722. A control mechanism 723 (FIG. 48A) for selecting the still-motion mode of video signal reproduction is shown to include a manually actuable lever 724 which is pivotally mounted intermediate its ends, as at 725, and which has its lower end pivotally connected, as at 726, to a link 727 which is, in turn, pivotally connected at 728 to one arm 729a of a bell-crank 729. Bellcrank 729 is mounted on a shaft 730 for swinging in a horizontal plane and has a leaf spring or resilient extension 731 extending from its other arm 729b so as to be engageable against a ball bearing 732 (FIG. 54) carried by hub 722a. It will be apparent that, when lever 724 is manually displaced in the direction of the arrow 733' on FIG. 48A, the resultant turning of bell crank 729 moves leaf spring 731 toward the left, as viewed on FIG. 54, so as to cause similar axial displacement of pulley 722 and shaft 71, and such axial displacement of shaft 721 is transmitted through pin 715 to disc 714 for moving the latter to its disengaged position 714'. Thus, the rotation of feed screw 306 is interrupted, while transducer assembly 268 continues to rotate for the repeated scanning by its heads 293 of a selected record track on the respective sheet, whereby to cause the still-motion reproduction of the video signals recorded in the selected record track.

It is further to be noted on FIG. 54 that the confronting surfaces of gear 710 and pulley 722 carrying respective circular bands 734' and 735' of frictional material which are normally spaced apart, as shown in full lines. However, when lever 724 is actuated to select the still-motion mode of video signal reproduction, as described above, the resulting axial displacement of pulley 722, for example, to the position indicated in broken lines at 722' on FIG. 54, causes frictional engagement of circular band 735' with circular band 734' so that gear 710 and pulley 722 are then rotatably coupled to each other. Further, a belt 736' runs around pulley 722 and around a sheave or pulley 737' which is rotatable by a manually operable wheel 738'. Thus, with clutch mechanism 713 disengaged, as described above, wheel 738' may be manually rotated to turn pulley 722 and, by reason of the frictional engagement of bands 734' and 735', to also turn gear 710, with the result that feed screw 306 is rotated at will for selecting the record track which is to be repeatedly scanned by the heads or transducers of assembly 268, or for effecting the slow-motion reproduction of the video signals recorded in the successive tracks.

During the still- or slow-motion reproduction of video signals, it is desirable that the apparatus 265 be made inoperative to reproduce the recorded audio signals, even though shaft 309 of transducer assembly 268' continues to be rotated. Accordingly, a switch 739 having normally closed contacts may be interposed in the audio signal reproducing circuit, for example, between the playback contact P of switch 608 and equalizer 616 (FIG. 56) so that reproduced audio signals are obtained at the output terminal 618 only so long as switch 739 is closed, with switch 739 being located (FIG. 48A) adjacent bellcrank 729 so as to be actuated by the bellcrank arm 729b for opening the contacts of switch 739 when lever 724 is manually displaced to select the still- or slow-motion mode of reproduction.

As shown particularly on FIGS. 48A, 52 and 53, the nut or threaded member 307 carried by side member 284b of carriage 269, and which is threadably engageable with feed screw 306, may be of the split type, that is, may include a pair of arms 733A and 733B which are mounted, at their upper ends, on a pivot 34 carried by the side member 284b at a location above feed screw 306, with the confronting surfaces of arms 733A and 733B having mating arcuate recesses 735A and 735B intermediate their ends, which arcuate recesses are suitably threaded, as shown on FIG. 53, for meshing engagement with the threads of feed screw 306 when arms 733A and 733B are in their operative positions shown in full lines on FIG. 52. A split spring ring 736 engages, at its opposite ends, against arms 733A and 733B for yieldably urging the latter to their operative positions at which the rotation of feed screw 36 is effective to cause movement of carriage 269 in the direction from its starting position toward its terminal position.

In order to disengage split nut 307 from feed screw 306 and thereby halt the movement of carriage 269 in the direction from its starting position to its terminal position, the apparatus 265 is shown on FIG. 48A to include a control rod 737 which extends parallel to the directions of movement of carriage 269 and which is suitably mounted for turning about its longitudinal axis. Over a substantial portion of its length which corresponds at least to the range of movement of slide member 284b between the starting and terminal positions of carriage 269, control rod 737 is made up of a portion 737a of substantially flat or rectangular configuration which extends between the lower end portions of arms 733A and 733B of split nut 307 (FIG. 52). It will be apparent that, when control rod 737 is rotationally positioned so that its portion 737a has the major axis of the rectangular cross-section thereof extending vertically, as shown in full lines on FIG. 52, arms 733A and 733B are free to be urged by spring 736 to their operative positions in meshing or threaded engagement with feed screw 306. However, when control rod 737 is turned through 90°, for example, so as to position its portion 737a as shown in broken lines at 737'a on FIG. 52, arms 733A and 733B are spread apart by the control rod, for example, to the inoperative or disengaged positions indicated in broken lines at 733'A and 733'B, so as to be disengaged from feed screw 306. Such disengagement of split nut 307 from feed screw 306 obviously halts the movement of carriage 269 in the direction toward its terminal position, and further frees the carriage for relatively rapid return movement to its starting position, for example, by one or more springs 310 (FIG. 48A) connected at one end to the base of the apparatus and having its other end connected to a cable 738 which, in turn, is connected to carriage 269, as at 739'. Intermediate its ends, the cable 738 runs about a pulley 740 which is secured on the shaft of a damping disc 741 rotatable in a body of viscous fluid within a housing 742 for damping or controlling the rate of return movement of carriage 269 to its starting position when split nut 307 is disengaged from feed screw 306 as described above.

Figure 48B:
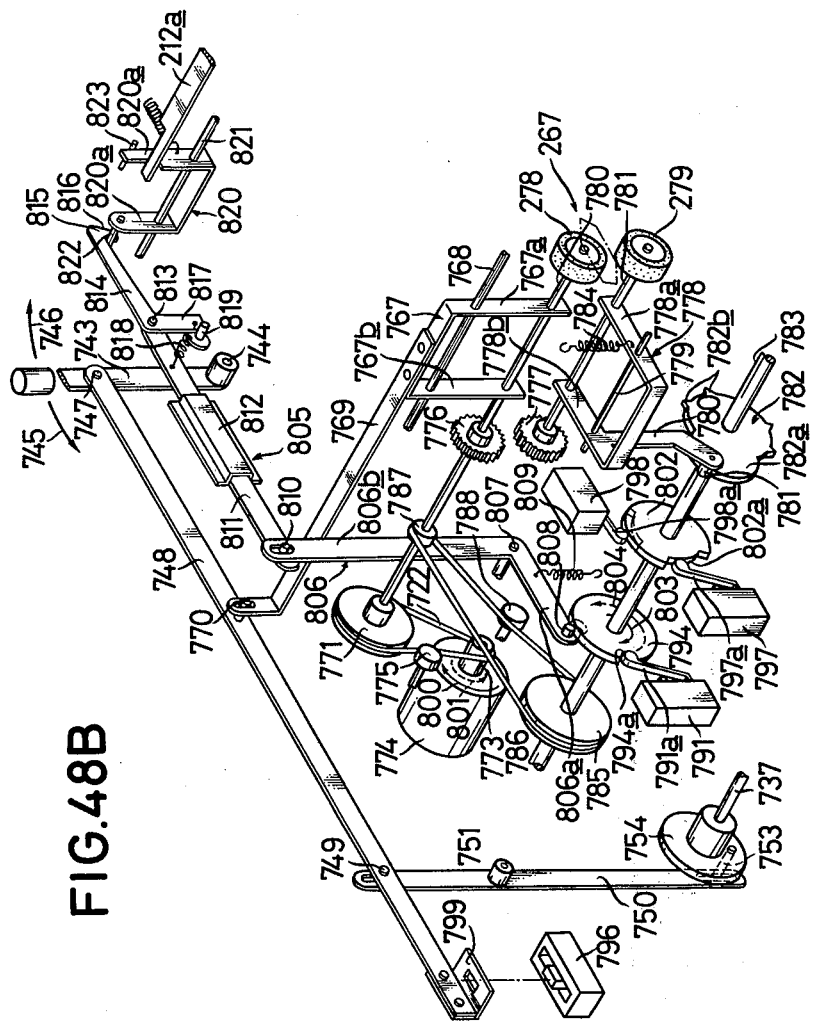

In order to permit manual control of the rotational position of control rod 737, and hence of the direction of movement of carriage 269, the control mechanisms for apparatus 265 are further shown in FIG. 48B to include a manually actuable lever 743 which is pivotally mounted at its lower end, as at 744, and which is swingable in the direction of the arrow 745 for initiating a recording or reproducing operation of the apparatus, or in the opposed direction indicated by the arrow 746 for terminating a recording or reproducing operation and, as hereinafter described in detail, for initiating the ejection of a record assembly 200R from its loaded position on the holder 266. The lever 743 is shown to be pivotally connected at 747 to one end of a longitudinally movable link 748 which is, in turn, pivotally connected at 749 to the upper end of a lever 750 which is swingable about a pivot 751 located intermediate the ends of lever 750. The lower end portion of lever 750 is shown to have a longitudinal slot 752 therein which slidably receives a crank pin 753 projecting eccentrically from a disc 754 secured on one end of control rod 737. When lever 743 is manually moved in the direction of the arrow 745, the resulting movements of link 748 and lever 750 dispose crank pin 753 at a position substantially lying in a vertical plane passing through the rotational axis of control rod 737 so that the portion 737a of the control rod is then disposed in the position shown in full lines on FIG. 52 for permitting engagement of split nut 307 with feed screw 306, with the result that rotation of feed screw 306 causes movement of carriage 269 in the direction from its starting position toward its terminal position. On the other hand, when control lever 743 is manually displaced in the direction of the arrow 746 on FIG. 48B, the resulting movements of link 748 and lever 750 displace crank pin 753 to a position lying substantially in a horizontal plane passing through the axis of control rod 737, whereby disc 754 and control rod 737 are turned through approximately 90° so as to dispose the portion 737a of the control rod in the position shown in broken lines at 737'a on FIG. 52 for disengaging split-nut 307 from feed screw 306 and thereby permitting the return movement of carriage 269 toward its starting position by the force of spring 310.

In accordance with the present invention, the splitnut 307 is also disengaged automatically from feed screw 306 when carriage 269 attains its terminal position, whereby to permit the automatic return of the carriage from such terminal position to its starting position. In order to perform the foregoing function, the end of control rod 737 remote from disc 754 is shown to have a disc 755 secured thereon (FIGS. 48A and 51) with an eccentric crank pin 756 projecting axially from such disc. The crank pin 756 is slidably received in a slot 757 formed in one end portion of a lever 758 which has its other end pivotally mounted on a pin 759. A tension spring 760 extends between pivot pin 759 and crank pin 756 so as to urge the latter toward the inner end of the associated slot 757. As shown on FIG. 51, crank pin 756 is engageable against the inner end of slot 757 in two rotational positions of disc 755 which respectively correspond to downwardly and upwardly inclined positions of lever 758 and to vertically and horizontally disposed positions of the major axis of the rectangular cross-section of control rod portion 737a. Therefore, when lever 743 is manually displaced in the direction for selecting a recording or reproducing operation of apparatus 265, disc 755 and lever 758 are disposed in the position shown in full lines on FIG. 751, whereas the angular displacement of lever 758 to the upwardly inclined position indicated in broken lines at 758' on FIG. 51, for example, when carriage 269 attains its terminal position, is effective to turn disc 755 so as to dispose the rectangular control rod portion in the position shown in broken lines at 737'a and thereby disengage split nut 307 from feed screw 306. Following displacement of lever 758 to its upwardly inclined position 758', spring 760 is effective to retain the lever in such upwardly inclined position until control rod 737 is turned by manual actuation of lever 743.

Figure 50:
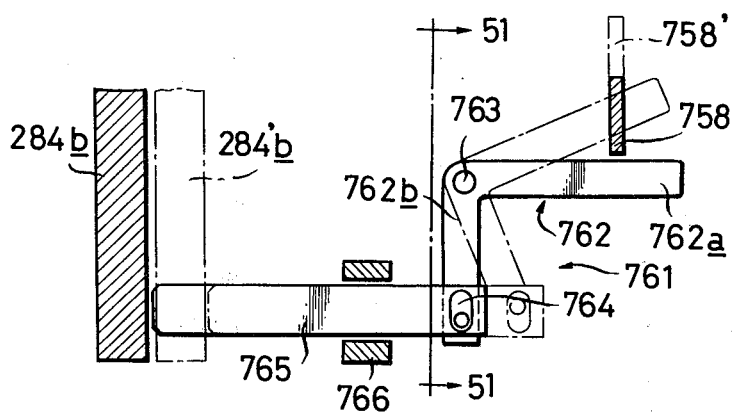
FIG. 50 is an enlarged sectional view taken along the line 50—50 on FIG. 48A, and illustrating a device by which the carriage is automatically returned to its starting position upon the completion of a recording or reproducing operation.

In order to angularly diplace lever 758 from its downwardly inclined position to its upwardly inclined position 758' in response to the movement of carriage 269 to its terminal position, a device 761 for actuating lever 758 is particularly shown on FIG. 50 to include a bellcrank 762 which is rockable on a pivot 763 and includes an arm 762a extending laterally under lever 758 and a depending arm 762b which is connected, as by a pin and slot connection 764, to a push rod 765 which is longitudinally slidable in a guide 766. When lever 758 is in its downwardly inclined position shown in full lines on FIG. 51, the free end of push rod 765 projects into the path of side member 284b of carriage 269 during the final increment of movement of the carriage to its terminal position. Thus, the movement of side member 284b to the position indicated in broken lines at 284'b on FIG. 50, and which corresponds to the terminal position of carriage 269, causes longitudinal displacement of push rod 765 and corresponding rocking of bellcrank 762 to the position shown in broken lines on FIG. 50, with the result that arm 762a elevates or upwardly inclines lever 758 to the position shown in broken lines at 758' on FIG. 51. By reason of the foregoing, split-nut 307 is disengaged from feed screw 306, and carriage 269 is automatically returned to its starting position, as previously described.

It will be apparent that, whenever split nut 307 is disengaged from feed screw 306, as described above, the position of carriage 269, and hence of sheets 200S$_1$ and 200S$_2$ relative to heads 293 and 293', in the directions of movement of carriage 269 becomes independent of the rotational positions of such heads. Thus, there is the danger that, when nut 307 is reengaged with feed screw 306, the heads 293 and 293' will not be in proper tracking positions in respect to the record tracks in which video and audio signals are respectively recorded on sheets 200S$_1$ and 200S$_2$. Although the use of heads 293 having gap widths w substantially greater than the widths of the tracks in which the video signals are recorded, and further the use of phase modulation for the recording of the video signals substantially avoids the foregoing problem in respect to the reproduction of the recorded video signals, it is nevertheless necessary that, upon each reengagement of split nut 307 with feed screw 306, carriage 269 should be positioned so as to achieve proper scanning by heads 293' of the record tracks in which audio signals have been recorded on sheet 200S$_2$. In accordance with this invention, the foregoing proper scanning of the audio signal tracks can be attained by relatively dimensioning the gears 710, 711 and 712 and by providing the thread of feed screw 306 with a pitch P$_S$ such that P$_2$ = mP$_A$ is the pitch p$_2$ of the successive parallel record tracks on the audio record sheet 200S$_2$ and m is an integral or whole number.

Referring now to FIG. 48B, it will be seen that the shaft 280 carrying the upper roller 278 of sheet driving device 267 may be journalled in the lower end portions of the depending arms 767a and 767b of an inverted U-shaped mounting bracket 767 which is pivoted on a horizontal support rod 768 so that the upper roller 278 may move similarly to the pinch roller 78 of the previously described sheet driving device 67, for example, between the positions shown in full lines and in broken lines at 278 and 278', respectively, on FIG. 49. An arm 769 extends laterally from bracket 767 above the pivoting axis of the latter and is pivotally connected at its free end, as by a pin and slot connection 770, to link 748. By reason of the foregoing connection between link 748 and bracket 767, the manual displacement of lever 743 in the direction of the arrow 745 for initiating a recording or reproducing operation of apparatus 265 is effective to swing bracket 767 in the direction moving roller 278 to the position shown in full lines on FIG. 49, that is, to the position in which sheets 200S₁ and 200S₂ of a record assembly 200R at the loaded position on holder 266 can be engaged between rollers 278 and 279 at the commencement of the movement of such sheets from their stored positions within cover 200C of the record assembly. On the other hand, when lever 743 is manually displaced in the direction of the arrow 746 for halting the movement of carriage 269 in the direction toward its terminal position and permitting the return of the carriage to its starting position, the connection between link 748 and bracket 767 is effective to move roller 278 to the position indicated in broken lines at 278' on FIG. 49 so that, with the record sheets 200S₁ and 200S₂ being then disposed in their operative positions, the trailing end edge portions of such sheets can be engaged between the upper and lower rollers of sheet driving device 267. The movement of roller 278 to the position indicated in broken lines at 278' on FIG. 49 will similarly occur when the movement of carriage 269 toward its terminal position is halted automatically upon attaining such position, for example, by disengaging split nut 307 from feed screw 306, as described above, whereupon carriage 269 is free to be returned by spring 310 to its starting position. More specifically, the turning of control rod 737 for automatically disengaging split nut 307 from feed screw 306 when carriage 269 attains its terminal position, as described above, causes similar turning of disc 754 (FIG. 48B) and the corresponding movement of crank pin 753 pivots lever 750 in the clockwise direction, as viewed, with the result that link 748 is displaced longitudinally in the same direction as it would be displaced by manual movement of lever 743 in the direction of the arrow 746.

In the sheet driving device 267 of apparatus 265, both the upper and lower rollers 278 and 279 are rotatably driven during the movements of the record sheets between their stored and operative positions. In order to rotatably drive rollers 278 and 279, the shaft 280 07 roller 278 has a pulley 771 secured thereon and being engaged by an elastic belt 772 which runs around a drive pulley 773 fixed to the shaft of a reversible electric motor 774, with a tensioning pulley 775 being suitably urged against belt 772 to maintain the tension in the latter as the axis of shaft 280 is shifted relative to the fixed motor 774. A gear 776 is fixed on shaft 280 and is adapted to mesh with, and drive a gear 777 secured on the shaft 281 of lower roller 279.

In order to provide for the intermittent engagement of rollers 278 and 279 with the record sheets during the movement thereof by sheet driving device 267 in a manner similar to that described above with reference to the showing of sheet driving device 67 on FIGS. 11A and 11B, shaft 281 of roller 279 is journalled in the free end portions of arms 778a and 778b of a substantially horizontally extending U-shaped mounting bracket 778 which is rockable on a suitably fixed pivot shaft 779. Thus, rocking of mounting bracket 778 in the direction for raising roller 279 is effective to engage the record sheets between rollers 278 and 279 and to cause meshing engagement of gear 777 with gear 776 for rotating roller 279. Rocking of mounting bracket 778 in the direction lowering roller 279 is effective to move the latter away from the record sheets, and hence to interrupt the movement of the latter by sheet driving device 267. The rocking of mounting bracket 778 is controlled by an arm 780 depending therefrom and carrying a cam follower roller 781 at its lower end which is urged into engagement with the periphery of a radial cam 782 fixed on a suitably mounted, rotatable cam shaft 783. A spring 784 is connected to mounting bracket 778 for urging the latter to rock in the direction for raising roller 279 and for moving cam follower roller 781 against cam 782. The radial cam 782 is shown to be formed with a radially raised portion 782a of substantial angular extent which is engaged by cam follower roller 781 in the inoperative condition of sheet driving device 267 for holding driving roller 279 in its lowered position spaced from roller 278. Further, radial cam 782 is formed with a series of radially raised nodes 782b which are spaced apart along at least a substantial portion of the remaining circumference of the cam so that, when cam 782 is turned to move that portion of the circumference of the cam past cam follower roller 781, driving roller 279 is intermittently raised and lowered in respect to roller 278 for intermittently driving the sheets therebetween, as previously described with reference to the sheet driving device 67. In order to turn cam shaft 783 relatively slowly in one direction or the other in response to operation of the reversible electric motor 774, a relatively large diameter pulley 785 fixed on cam shaft 783 is engaged by an elastic belt 786 which runs around, and is driven by a relatively small diameter pulley 787 fixed on shaft 280, and a tensioning pulley 788 is yieldably urged against belt 786 so as to maintain adequate tension in the latter as shaft 280 is displaced relative to cam shaft 783.

In accordance with this invention, the apparatus 265 is automatically controlled so that, with lever 743 manually displaced in the direction of the arrow 745 for selecting a recording or reproducing operation and with carriage 269 in its starting position, the installation of a record assembly 200R in the loaded position on holder 266 will cause operation of motor 292 for rotating transducer assemblies 268 and 268' and for initiating the movement of carriage 269 away from its starting position, and further will cause an operation of sheet driving device 267 for moving the record sheets from their stored positions to their operative positions 200S'₁ and 200S'₂. Further, upon the return of carriage 269 to its starting position, either in response to manual displacement of lever 743 in the direction of arrow 746 for releasing split nut 307 from feed screw 306 or in response to the automatic release or disengagement of split nut 307 upon the movement of carriage 269 to its terminal position, as described above, the control mechanisms for apparatus 265 are effective to automatically cause operation of sheet driving device 267 for returning the record sheets from their operative positions to their stored positions within cover 200C and then to automatically eject record assembly 200R from holder 266.

Figure 55:
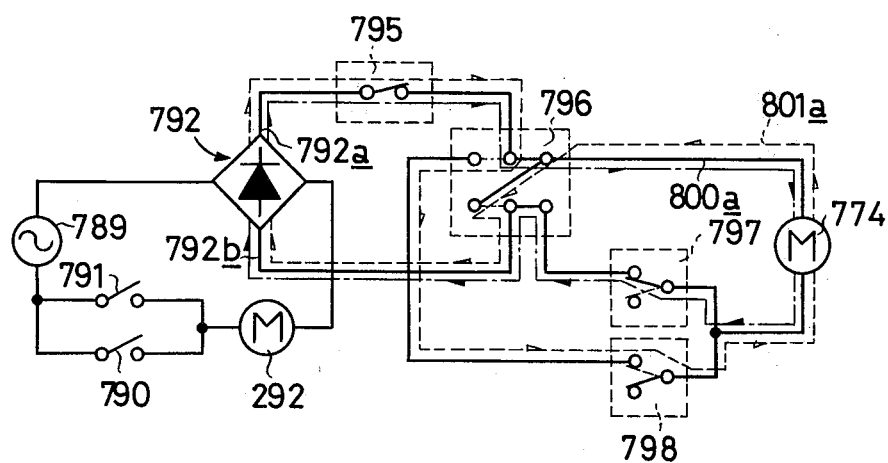
FIG. 55 is a circuit diagram of an electrical control system for the apparatus of FIGS. 48A and 48B.

More particularly, as shown on FIG. 55, the circuits for controlling motors 292 and 774 may include an alternating current source 789 which is connected through switches 790 and 791, in parallel, to motor 292 and to the input terminals of a rectifier bridge 792 so that motor 292 is operated and rectifier bridge 792 provides DC voltage at its output terminals when either one of switches 790 and 791 is in its closed condition. Switch 790 is of the normally-open type and, as shown on FIGS. 34 and 36 is fixedly mounted adjacent the position of holder 266 which corresponds to the starting position of carriage 269 so that, when a record assembly 200R is placed on holder 266 and slidably displaced in the forward direction to its loaded position, the previously described resulting forward movement of slide 215 will cause a switch actuator 793 projecting from slide 215 to engage switch 790 for changing-over the latter to its closed condition. Of course, as holder 266 moves with carriage 269 in response to movement of the latter away from its starting position, switch actuator 793 will move away from switch 790 (FIG. 48A) and thus will permit the return of switch 790 to its normal open condition.

As shown on FIG. 48B, switch 791 is controlled by a cam 794 fixed on cam shaft 783 and having a recess 794a in its periphery. Switch 791 is arranged to be in its closed condition only when the actuator 791a of switch 791 is engaged in the recess 794a, as shown in FIG. 48B. Thus, in all other rotational positions of cam 794, switch 791 is in its open condition.

Referring again to FIG. 55, it will be seen that the circuit for energizing motor 774 from the output terminals of rectifier bridge 792 includes a switch 795 for permitting operation of motor 774 only when carriage 269 is adjacent its starting position, a reversing switch 796 for determining the direction of operation of the reversible electric motor 774, and switches 797 and 798 for respectively limiting the operation of motor 774 in the direction causing sheet driving device 267 to move the record sheets from their storage positions to their operative positions, and in the direction causing device 267 to return the record sheets from their operative positions to their stored positions. Switch 795 is of the normally-open type and, as shown on FIG. 48A, is suitably mounted at a fixed location adjacent side member 284a of carriage 269 in the starting position of the latter so that switch 795 is actuated to its closed condition by side member 284a only when carriage 269 is adjacent its starting position and returns to its normally open condition when carriage 269 has moved a predetermined distance away from its starting position, as on FIG. 48A. As shown on FIG. 48B, reversing switch 796 is actuable by a switch actuator 799 on link 748 so as to be conditioned for causing operation of motor 774 in the direction indicated by the arrow 800 thereon when link 748 is longitudinally displaced in the direction corresponding to pivoting of lever 743 in the direction of the arrow 745, and further to condition reversing switch 796 for causing operation of motor 774 in the direction of the arrow 801 when link 748 is longitudinally displaced in the opposite direction corresponding to movement of lever 743 in the direction of the arrow 746. Switches 797 and 798 are shown to be both controllable by a radial cam 802 secured on cam shaft 783. The actuators 797a and 798a of switches 797 and 798 are shown to engage the periphery of cam 802 at locations spaced apart about the latter by approximately 270°, and each of switches 797 and 798 is in its open condition when the respective actuator 797a or 798a engages in a recess 802a formed in the periphery of cam 802. Thus, with cam 802 in the rotational position shown on FIG. 48B, switch 797 is in its open condition, while switch 798 is in its closed condition by reason of the engagement of its actuator 798a with the circular periphery of cam 802. The pulleys 785 and 787 which cooperate with belt 786 for driving cam shaft 783 from shaft 280 are relatively dimensioned so that a plurality of revolutions of shaft 280 sufficient for causing sheet driving device 267 to move the record sheets from their stored positions to their operative positions or from their operative positions back to their stored positions, will result in the turning of cam shaft 783 through approximately 270°. Thus, during an operation of sheet driving device 267 for moving the record sheets from their stored positions to their operative positions, cam shaft 783 will be turned in the direction of the arrow 803 on FIG. 48B from the position shown on FIG. 58A in which recesses 794a and 802a are located at the top of cams 794 and 802, respectively, to the position shown in full lines on FIG. 48B and on FIG. 58C, and in which recesses 794a and 802a of cams 794 and 802 are disposed at one side of such cams. Conversely, during an operation of sheet driving device 267 for returning the record sheets from their operative positions to their stored positions, cam shaft 783 is turned in the direction of the arrow 804 on FIG. 48B so as to turn cams 794 and 802 from the position shown in full lines on FIG. 48B and on FIG. 58C to the positions indicated in broken lines on FIG. 58A. It will be apparent that, with cams 794 and 802 in the positions indicated in broken lines on FIG. 48B, switch 791 is in its open or OFF condition, while switch 797 is in its closed or ON condition and switch 798 is in its opened or OFF condition. Further, when cams 794 and 802 are turned to the position shown in full lines on FIG. 48B, switch 791 is turned ON, while switch 797 is turned OFF and switch 798 is ON.

OPERATION OF THE AUTOMATIC CONTROL CIRCUITS FOR THE SHEET DRIVING DEVICE

Assuming that cam shaft 783 is initially disposed to locate cams 794 and 802 in the position shown in broken lines on FIG. 48B and carriage 269 is in its starting position to turn ON switch 795, and further that lever 743 has been manually positioned for a recording or reproducing operation of apparatus 265, the forward movement of a record assembly 200R on table 271 of holder 266 will, when it reaches the loaded position, cause switch actuator 793 to turn ON switch 790. Thus, motor 292 and rectifier bridge 792 will be initially energized from source 789 by way of switch 790. Due to the energizing of rectifier bridge 792 and the positioning of reversing switch 796 by actuator 799 on link 748, current flows from output terminal 792a of rectifier bridge 792 through closed switch 795, reversing switch 796, motor 774, closed switch 797 and reversing switch 796 to the terminal 792b of the rectifying circuit in the direction of the arrows 800a on FIG. 55, whereby to operate motor 774 in the direction of the arrow 800 on FIG. 48B. As a result of such operation of motor 774, rollers 278 and 279 of sheet driving device are rotated in the directions for moving the record sheets from their stored positions to their operative positions and, simultaneously, cam shaft 783 is turned in the direction of the arrow 803 so that cam 782 causes intermittent driving of the sheets by rollers 278 and 279 for the purpose previously indicated. Although feed screw 306 is being rotated in response to the operation of motor 292 during the described operation of sheet driving device 267, the rate at which carriage 269 is being thus moved away from its starting position is sufficiently slow in relation to the time required for the movement of the record sheets from their stored positions to their operative positions by device 267 that switch 795 remains in its ON condition during the operation of device 267.

The operation of sheet driving device 267 is terminated, with the record sheets in their operative positions, when cams 794 and 802 attain the position shown in full lines on FIG. 48B, that is, when actuator 797a of switch 797 is received in recess 802a of cam 802 so that switch 797 is turned OFF for interrupting the energizing circuit for motor 774.

With cam 794 in the position shown in full lines on FIG. 48B at the conclusion of the operation of device 267 for moving the record sheets to their operative positions, actuator 791a of switch 791 is received in recess 794a of cam 794 so that switch 791 is turned ON for maintaining the energizing of motor 292 even though switch 790 is eventually turned OFF in response to the movement of actuator 793 away from switch 790 as holder 266 moves with carriage 269 during the movement of the latter from its starting position toward its terminal position. Thus, motor 292 continues to operate for rotating transducer assemblies 268 and 268' during the recording or reproducing operation of apparatus 265 and for driving feed screw 306.

Upon the arrival of carriage 269 at its terminal position, or when the movement of carriage 269 toward its terminal position is interrupted by the manual actuation of lever 743 in the direction of the arrow 746, the turning of control rod 737 for disengaging split nut 307 from feed screw 306, and thereby permitting the return of carriage 269 to its starting position, is, as previously described, accompanied by the actuation of reversing switch 796 to its reversed position. Therefore, when carriage 269 returns to its starting position to turn ON switches 790 and 795 by the engagement therewith of actuator 793 and side member 284a, respectively, current is made to flow through motor 774 in the direction of the path 801a on FIG. 55, that is, from output terminal 792a of rectifier bridge 792 through switch 795, switch 796 in its reversing position, closed switch 798, motor 774, and reversing switch 796 back to terminal 792b. Thus, upon the return of carriage 269 to its starting position, motor 774 is automatically operated in the direction of the arrow 801 on FIG. 48B so as to operate sheet driving device 267 in the direction for returning the record sheets from their operative positions to their stored positions within the cover 200C of the record assembly on holder 266. During such operation of device 267, cam shaft 783 is turned in the direction of the arrow 804 on FIG. 48B and the operation of motor 774 continues until cam 802 returns to the position shown in broken lines in which actuator 798a of switch 798 is received in recess 802a for turning OFF switch 798 and thereby halting the operation of motor 774 with the record sheets in their stored positions.

As previously noted, the apparatus 265 according to this invention is further preferably provided with an automatic ejecting device 805 by which a record assembly 200R on holder 266 is automatically removed from its loaded position upon the return of its record sheets to their stored positions at the completion of a recording or reproducing operation, as described above. As shown particularly on FIG. 48B, the automatic ejecting device 805 is shown to include a bellcrank 806 rockable intermediate its ends on a pivot 807 and having a substantially horizontal arm 806a carrying a cam follower roller 808 engageable with cam 794 at the top of the latter, and a substantially vertical arm 806b. A spring 809 acts on bellcrank 806 for urging the latter in the direction engaging cam follower roller 808 against cam 794, and the end of upstanding arm 806b is connected, as by the pin and slot connection 810, to one end of a link 811 which is horizontally slidable in a guide 812. The other end of link 811 is pivotally connected, as at 813, to a link extension 814 which terminates in a hook 815 having a sloping outer surface 816. An arm 817 depends from link extension 814 and is connected to link 811 by a tension spring 818 so as to urge link extension 814 to pivot downwardly relative to link 811. A fixed stop pin 819 is engageable by arm 817 for controlling the pivoting of link extension 814 under the influence of spring 818. An actuator 820 for effecting the release of latch elements 205a and 205b is pivoted on a fixed shaft 821 and includes upstanding spaced apart arms 820a and 820b. The arm 820a has a pin 822 extending therefrom for engagement by hook 815 on link extension 814, while arm 820b projects upwardly in back of arm 212a of bellcrank 212 so as to be movable forwardly against arm 212a for swinging bellcrank 212 in the direction effecting release of latch elements 205a and 205b. A stop 823 is provided for limiting the rearward swinging of actuator 820.

Figure 58A:
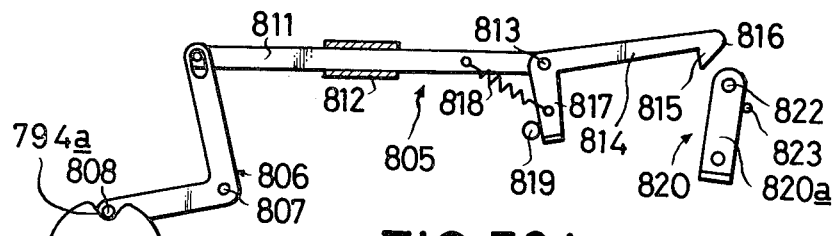
FIGS. 58A–58D are diagrammatic views illustrating various phases in the operation of an automatic eject mechanism included in the apparatus of FIGS. 48A and 48B.
Figure 58B:
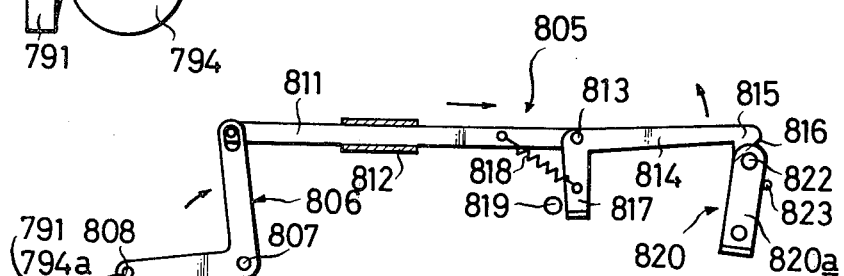
Figure 58C:
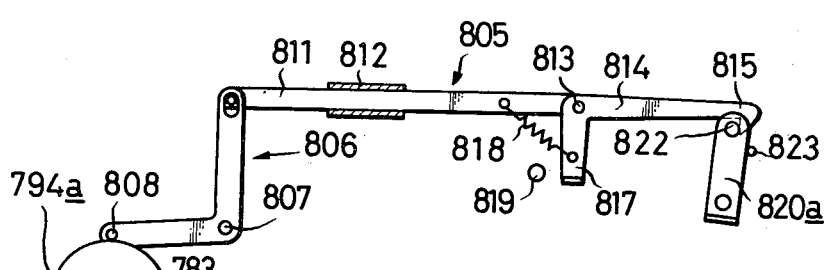
Figure 58D:
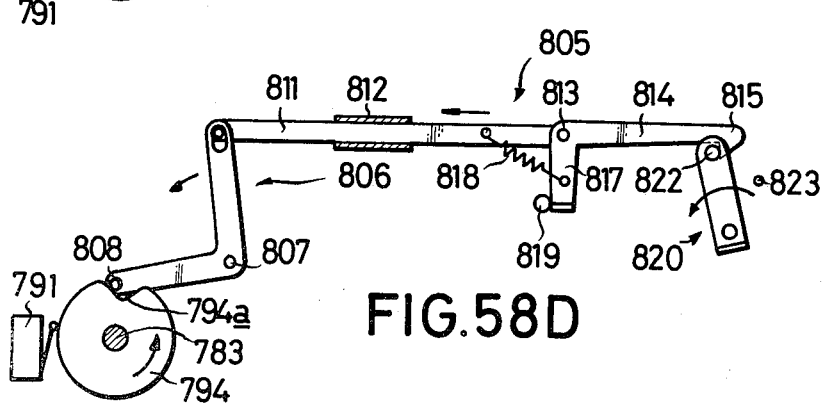

Referring now to FIG. 58A, it will be seen that, in the initial condition of automatic ejecting device 805, that is, prior to the operation of sheet driving device 267 for moving record sheets from their stored positions to their operative positions, cam follower roller 808 engages in recess 794a of cam 794 to pivot bellcrank 806 in the counterclockwise direction and thereby displace link 811 forwardly so that arm 817 bears against stop 819 and link extension 814 is tilted upwardly for raising nose 815 above pin 822. During the initial operation of sheet driving device 267 for moving record sheets from their stored positions to their operative positions, as previously described, the turning of cam 794 effects the relative movement of cam follower roller 808 out of cam recess 794a, as shown on FIG. 58B, and the resultant clockwise swinging of bellcrank 806 causes rearward movement of link 811 and link extension 814. As arm 817 moves rearwardly away from stop 819, spring 818 tends to pivot link extension 814 in a downward direction, but the sloping surface 816 of hook 815 rides over pin 822 as actuator 820 rests against stop 823. Thus, at the completion of the operation of sheet driving device 267 for moving the record sheets to their operative positions, cam follower roller 808 rides on the periphery of cam 794 and link 811 and link extension 814 are rearwardly displaced with nose 815 engaging pin 822, as shown on FIG. 58C. The automatic ejecting device 805 remains in the condition shown on FIG. 58C throughout the recording or reproducing operation of apparatus 265, and during the return of carriage 269 to its starting position upon the completion of a recording or reproducing operation. The elements of automatic ejecting device 805 continue to remain in the relative positions shown on FIG. 58C during the previously described operation of sheet driving device 267 for returning the record sheets from their operative positions to their stored positions in the cover or envelope of the respective record assembly 200R. However, near the conclusion of such operation of sheet driving device 267, the turning of cam 794 again permits cam follower roller 808 to enter cam recess 794a. During such entry of cam follower roller 808 into cam recess 794a, bellcrank 806 is rocked in the counter-clockwise direction, as viewed on FIG. 58D, with the result that link 811 and link extension 814 are displaced forwardly and, due to the engagement of hook 815 with pin 822, actuator 820 is rocked forwardly. Such forward rocking of actuator 820 causes its arm 820b to act against bellcrank arm 212a for pivoting bellcrank 212 in the direction releasing latch elements 205a from notches 103, whereupon spring 219 can be effective to eject record assembly 200R, that is, to rearwardly displace the cover 200C of the record assembly from its loaded position on table 271. Following such ejection of the record assembly, cam follower roller 808 again rests in the bottom of cam recess 794a as on FIG. 58A, with the result that link 811 and link extension 814 are further displaced in the forward direction and, during such further displacement, stop 819 acts on arm 817 for upwardly tilting link extension 814 and thereby disengaging hook 815 from pin 822. Upon such disengagement, spring 207 (FIG. 48A) can again urge latch elements 205a and 205b toward each other with the result that bellcrank 212 swings in the direction moving its arm 212a rearwardly so as to return actuator 820 to its position against stop 823, as shown on FIG. 58A.

In the foregoing description of illustrative embodiments of this invention, reference has been made repeatedly to the recording and reproducing of "video" signals, which term, of course, includes monochrome as well as color television signals, but is further intended to include any other types of signals which, when applied to a cathode ray tube or the like, are effective to produce a visual image or picture.

Figure 59:
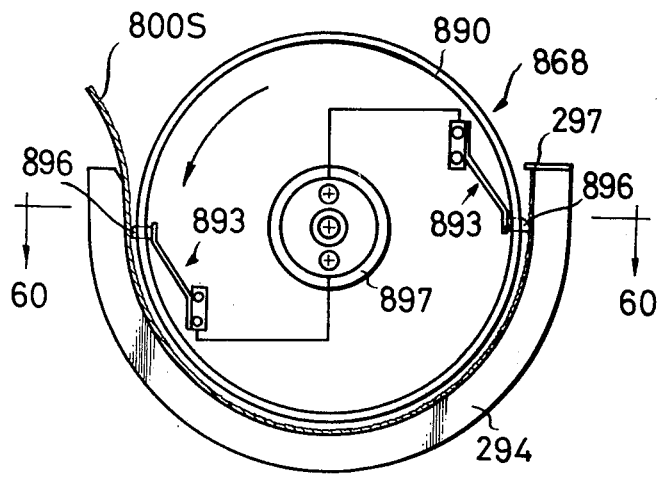
FIG. 59 is a schematic view illustrating another form of rotary transducer assembly that may be employed in a recording and/or reproducing apparatus according to this invention.
Figure 60:
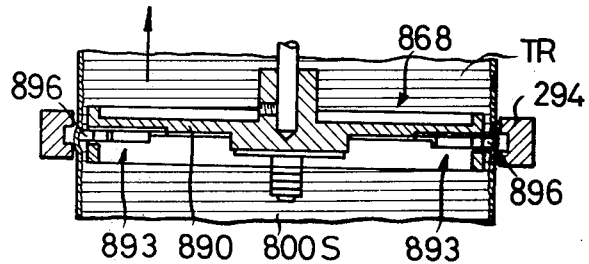
FIG. 60 is a sectional view taken along the line 60—60 on FIG. 59.
Figure 61:
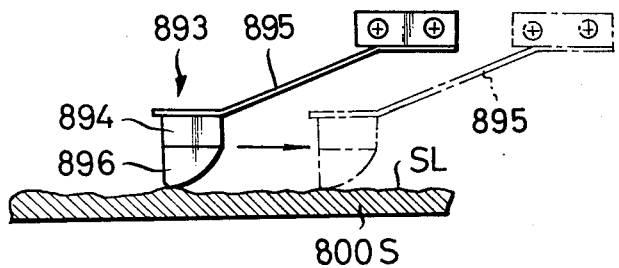
FIG. 61 is a greatly enlarged detail view illustrating the manner in which each transducer included in the assembly of FIGS. 59 and 60 may be effective to reproduce signals recorded on a record sheet.

It is further to be noted that while magnetic recording and reproducing of the signals is preferred, as in the illustrative embodiments of the invention described above, other recording and reproducing methods may be employed. For example, in place of each of the magnetic record sheets 200S$_1$ and 200S$_2$, there may be employed a record sheet 800S (FIGS. 59, 60 and 61) of plastic sheet material, such as, polyvinylchloride or polyethylene, having a thickness of about 0.5 to 1.0 microns, and which is similarly guided in an arcuate path about a portion of the circular path of travel of a rotary transducer assembly 868 having a sheet support member 294 associated therewith, as in the apparatus 265. Video or audio signals are recorded on sheet 800S in a series of parallel record tracks TR which extend across the width of the sheet at a slight angle to the opposite side edges of the latter, with the recorded signal information begin in the form of surface undulations SL (FIG. 61). The transducer assembly 868 is shown to include a rotatable drum 890 and a pair of pickups 893 which are angularly spaced apart on drum 890 by an angle of 180°± 0.5H (in which H is the horizontal period of the recorded video signal). In this embodiment, each pickup 893 may be constituted by a piezo-electric 894 mounted on a resilient support 895 and having a diamond stylus 896 which projects beyond the periphery of drum 890 for engagement in record tracks TR. The pickups 893 may be connected to a recording or reproducing circuit by way of a slipring 897 on drum 890 (FIG. 59). During a recording or reproducing operation, transducer assembly 868 is rotated at a relatively high speed, while sheet 800S and transducer assembly 868 are moved slowly relative to each other in the direction of the axis of rotation, so that pickups 893 alternately scan record tracks TR for electro-mechanically recording or reproducing the signal information SL therein. Due to the presence of the sheet support member 294, the air flow between the latter and drum 890, and the pressing of each stylus 896 against the record sheet 800S by the respective resilient support, for example, with a pressure of about 0.2 to 0.5 g. during a reproducing operation, a very stable contact of each stylus with the record sheet is obtained for high fidelity reproduction of the recorded signal information.

The apparatus 265 according to this invention can also be applied to the electro-optical recording and reproducing of video and audio signals, for example, in which the successive record tracks on the record medium have variations in either light reflectivity or transmission in correspondence to the signals recorded therein. The invention can be further applied to the electrostatic capacitive recording and reproducing of video and audio signals, for example, to an apparatus in which each record sheet is constituted by a vinyl base sheet having a coating of aluminum or copper thereon and a dielectric coating, for example, of polystyrene, superposed on the aluminum or copper coating, in which case the video or audio signals are recorded as variations in the capacitance along the successive record tracks. When reproducing such video or audio signals, the variations in capacitance between the electrode of a pickup head moving along the record tracks in succession and the aluminum or copper coating of the record medium are employed to produce an output signal corresponding to the original video or audio signals which were recorded. Finally, while it is preferred, as described above with reference to FIGS. 57A–57D, to record the video signal as a phase-modulated signal without guard bands between adjacent record tracks, so as to enhance the utilization of the record medium without encountering beat interference between signals reproduced from adjacent racks and without requiring the use of a tracking servo system during reproducing or playback operation, the invention can also be applied to an apparatus in which the video signal is recorded as a frequency-modulated signal.

Although specific embodiments of the invention have been described above with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for recording and/or reproducing at least video signal information comprising: a record assembly including cover means and at least one flexible sheet adapted to have at least video signal information recorded thereon and being movable in respect to said cover means between a stored position, in which said sheet is substantially enveloped and protected by said cover means, and an operative position in which a major portion of said sheet is withdrawn from said cover means and a minor portion of said sheet remains within said cover means; sheet driving means operative selectively for moving each said sheet relative to said cover means from said position to said operative position and for returning said sheet to said stored position from said operative position; rotary signal transducer means movable in at least one circular path about an axis substantially at right angles to the direction of movement of said sheet between said stored and operative positions; sheet guide means receiving each said sheet during the movement of the latter to said operative position and guiding said major portion of the sheet in an arcuate path substantially coinciding with at least a portion of said circular path of travel of said rotary signal transducer means; and translating means for moving said record assembly and said rotary signal transducer means relative to each other in directions parallel to said axis of rotation of the rotary signal transducer means to that the latter scan successive parallel record tracks on said major portion of said sheet in said arcuate path.

2. An apparatus according to claim 1; in which each said sheet is substantially rectangular, and said cover means is constituted by a relatively rigid, substantially rectangular envelope having an open end through which said sheet is slidable with the opposite side edges of said sheet being loosely guided by the corresponding sides of said envelope.

3. An apparatus according to claim 1; in which said sheet driving means includes means for intermittently interrupting the movement of said sheet relative to said cover means during the operation of said sheet driving means.

4. An apparatus according to claim 3; in which said sheet driving means includes a rotary sheet driving roller and a pinch roller engageable with said sheet during movement of the sheet between said stored and operative positions of the latter, and said means for intermittently interrupting the movement of said sheet includes means for moving one of said driving and pinch rollers repeatedly into and out of engagement with said sheet during said operation of the sheet driving means.

5. An apparatus according to claim 3; in which said sheet driving means includes a rotary sheet driving roller and a pinch roller engageable with said sheet during movement of the sheet between said stored and operative positions of the latter, and said means for intermittently interrupting the movement of said sheet includes a mounting shaft for said sheet driving roller which is eccentric relative to the periphery of the sheet driving roller so that the latter and said pinch roller engage the sheet intermittently.

6. An apparatus according to claim 3; in which said sheet driving means includes a rotary sheet driving roller and a pinch roller, and said means for intermittently interrupting the movement of the sheet is constituted by a flat surface portion on the periphery of said sheet driving roller.

7. An apparatus according to claim 1; in which each said sheet is substantially rectangular, said cover means is constituted by a relatively rigid, substantially rectangular envelope having an open end through which said sheet is slidable longitudinally with the opposite side edges of said sheet being loosely guided by the corresponding sides of said envelope, and a limited area of said sheet is exposed even when the sheet is in said stored position for engagement by said sheet driving means.

8. An apparatus according to claim 7; in which said envelope has at least one cutout therein adjacent said open end and through which said limited area of the sheet is exposed in said stored position of the sheet.

9. An apparatus according to claim 8; in which each said cutout is positioned so that, in said stored and operative positions of the sheet, the opposite end edges, respectively, of the sheet extend across said cutout intermediate the ends of the latter.

10. An apparatus according to claim 9; in which said ends of the cutout extend at substantial angles to the transverse direction of the sheet for avoiding interference with movement of the sheet by engagement of the end edges of the latter with said ends of the cutout.

11. An apparatus according to claim 9; in which said sheet driving means includes rotary first and second rollers disposed for engagement with said sheet therebetween through said cutout, means mounting said first roller for movement in the longitudinal direction of said sheet between a first position in which, with said sheet in said stored position, said first roller is in advance of the adjacent end edge of the sheet then extending across said cutout, and a second position in which, with said sheet in said operative position, said first driving roller is in trailing relation to the adjacent end edge of said sheet then extending across said cutout, and means for moving said first roller from said first position to said second position for moving said sheet from said stored position to said operative position, and for moving said first roller from said second position to said first position for returning said sheet to said stored position from said operative position.

12. An apparatus according to claim 1; in which said record assembly further includes another flexible sheet adapted to have signal information recorded thereon and being movable independently of said one sheet in respect to said cover means between said stored and operative positions; and further comprising means for selecting which of said one and other sheets is to be moved by said sheet driving means.

13. An apparatus according to claim 12; in which said one and other sheets are substantially rectangular, said cover means is constituted by a relatively rigid, substantially rectangular envelope having an open end through which each of said sheets is slidable longitudinally with the opposite side edges of each sheet being loosely guided by the corresponding sides of said envelope, said envelope has opposed first and second walls with first and second openings therein adjacent said open end and being spaced from the longitudinal median of said envelope at opposite sides of said median, and said one and other sheets have first and second cutouts, respectively, therein which, in said stored positions of the respective sheets, register with said first and second openings of the envelope; and in which said sheet driving means includes a rotary sheet driving roller and a pinch roller located to extend through said first openings of the envelope in one position of the latter for engaging said other sheet between said sheet driving and pinch rollers, and to extend through said second openings of the envelope in an inverted position of the envelope for engaging said one sheet between said sheet driving and pinch rollers.

14. An apparatus according to claim 12; in which said one end and other sheets are substantially rectangular, said cover means is constituted by a relatively rigid, substantially rectangular envelope having an open end through which each of said sheets is slidable longitudinally with the opposite side edges of each sheet being loosely guided by the corresponding sides of said envelope, and said one and other sheets have respective laterally spaced end tabs which are exposed adjacent said open end of the envelope when said sheets are in the stored positions thereof; and said sheet driving means includes a rotary sheet driving roller and a pinch roller for selectively engaging said tabs of the sheets therebetween with said sheets in said stored positions, and means for displacing at least one of said sheet driving and pinch rollers in the lateral direction of said sheets so as to determine which of said tabs is engaged between said rollers.

15. An apparatus according to claim 1; in which said rotary signal transducer means includes first transducer means for recording and/or reproducing video signal information in said record tracks extending over a first section of said major portion of said sheet in said arcuate path, and second transducer means spaced in the direction of said axis of rotation from said first transducer means for recording and/or reproducing audio signal information in said record tracks extending over a second section of said major portion of said sheet in said arcuate path.

16. An apparatus according to claim 1; in which said record assembly further includes another flexible sheet adapted to have signal information recorded thereon and being movable in respect to said cover means between said stored and operative positions with said one sheet and said other sheet being in closely adjacent, superposed relation when in said stored positions thereof, said sheet driving means is operative to move said one sheet and said other sheet, simultaneously, between said stored and operative positions, and said rotary signal transducer means includes first transducer means movable in said one circular path and second transducer means movable in a second circular path about an axis parallel to, and spaced from said axis of said one circular path; and further comprising sheet separator means operative, upon the movement of said one and other sheets from said stored positions thereof, to separate said major portions of the sheets from each other and to direct said one sheet into said sheet guide means, and second sheet guide means receiving said other sheet from said sheet separator means during the movement of said other sheet to its operative position and guiding said major portion of the other sheet in an arcuate path substantially coinciding with at least a portion of said second circular path of the second transducer means.

17. An apparatus according to claim 16; in which said first and second transducer means are operative simultaneously for recording and/or reproducing video signal information and audio signal information, respectively, in record tracks scanned by said first and second transducer means on said major portions of said one and other sheets, respectively, during the movement of said record assembly and said rotary signal transducer means relative to each other in at least one of said directions parallel to said axis of rotation.

18. An apparatus according to claim 16; in which said fist transducer means is operative for recording and/or reproducing video signal information in record tracks scanned thereby on said major portions of said one sheet during said movement of said record assembly and said rotary signal transducer means relative to each other in one of said directions, and said second transducer means is operative for recording and/or reproducing video signal information in record tracks scanned thereby on said other sheet during said movement of said record assembly and said rotary signal transducer means relative to each other in the other of said directions.

19. An apparatus according to claim 1; in which said rotary signal transducer means are fixed in the direction of said axis of rotation; and said translating means includes a carriage supporting said sheet guide means and being movable parallel to said axis of rotation between spaced apart starting and terminal positions, a holder fixed relative to said carriage for receiving and positioning said cover means of the record assembly in respect to said sheet guide means, means for driving said carriage from said starting position to said terminal position, and means for returning said carriage from said terminal position to said starting position.

20. An apparatus according to claim 19, in which said translating means further includes means responsive to the arrival of said carriage at said terminal position for deactivating said means for driving the carriage and activating said means for returning the carriage to said starting position.

21. An apparatus according to claim 20; in which said means for driving the carriage from said starting position to said terminal position includes a rotated feed screw and threaded means on said carriage normally engaged with said feed screw and being disengageable from the latter, said means reponsive to the arrival of said carriage at said terminal position is operative to disengage said threaded means from said feed screw, and said means for returning the carriage includes spring means yieldably urging the carriage in the direction from said terminal position toward said starting position.

22. An apparatus according to claim 20; further comprising manually operable control means for deactivating said means for driving the carriage at any position of the latter between said starting and terminal positions and for activating said means for returning the carriage to said starting position.

23. An apparatus according to claim 19; further comprising manually operable control means for selecting the direction of operation of said sheet driving means, and means for permitting operation of said sheet driving means in response to the positioning of said cover means in said holder with said carriage in said starting position.

24. An apparatus according to claim 23; further comprising means responsive to the arrival of said carriage at said terminal position for deactivating said means for driving the carriage and for activating siad means for returning the carriage to said starting position; and means operative upon said deactivating of said means for driving the carriage for causing said manually operable control means to select operation of said sheet driving means in the direction for returning said sheet from said operative position to said stored position, whereby the sheet is automatically returned to said stored position in said cover means on the holder when said carriage returns to said starting position.

25. An apparatus according to claim 24; further comprising means for ejecting said cover means from said holder upon said returning of the sheet from said operative position to said stored position in said cover means.

26. An apparatus according to claim 1; further comprising a holder fixed relative to said sheet guide means for receiving and positioning said cover means; and in which said translating means includes feed means for effecting relative movement of said sheet guide means and holder and said signal transducer means from a starting position to a terminal position in one of said directions parallel to said axis of rotation, and return means for effecting relative movement of said sheet guide means and holder and said signal transducer means in the other of said directions from said terminal position to said starting position.

27. An apparatus according to claim 26; in which said translating means further includes means responsive to the relative disposition of said sheet guide means and holder and said signal transducer means at said terminal position for deactivating said feed means and activating said return means so as to restore said sheet guide means and holder and said signal transducer means to relative disposition at said starting position.

28. An apparatus according to claim 26; further comprising manually operable control means shiftable, at will, between a first position for activating said feed means and a second position for deactivating said feed means and activating said return means.

29. An apparatus according to claim 28; further comprising means responsive to the relative disposition of said sheet guide means and holder and said signal transducer means at said terminal position for shifting said control means to said second position of the latter.

30. An apparatus according to claim 29; further comprising means responsive to the shifting of said control means to said first position and to said second position for operating said sheet driving means in the direction moving said sheet from said stored position to said operative position and in the direction moving sheet from said operative position to said stored position, respectively, when said cover means is positioned in said holder and said sheet guide means and holder and said signal transducer means are relatively disposed in said starting position.

31. An apparatus according to claim 30; further comprising means for ejecting said cover means from said holder upon the returning of said sheet from said operative position to said stored position in said cover means.

32. An apparatus according to claim 31; in which each said sheet is substantially rectangular, and said cover means is constituted by a relatively rigid, substantially rectangular envelope having an open end through which said sheet is slidable longitudinally; said holder includes a table on which said envelope is longitudinally slidable to and from a loaded position, spring means yieldably resisting the sliding of said envelope to said loaded position, and latching means normally engageable with said envelope to retain the latter in said loaded position against said spring means; and said means for ejecting are effective to release said latching means from said envelope upon the return of said sheet to said stored position so that said spring means can then move the envelope away from said loaded position.

33. An apparatus according to claim 1; in which said rotary signal transducer means are axially fixed; and said translating means includes a carriage supporting said sheet guide means and being movable parallel to said axis of rotation, a holder fixed relative to said carriage for receiving and postioning said cover means in respect to said sheet guide means a rotatable feed screw which is axially fixed and extends parallel to said axis of rotation, threaded means on said carriage engageable with said feed screw for moving the carriage in response to rotation of said feed screw, transmission means extending between said rotary signal transducer means and said feed screw for rotating the latter in response to rotation of said transducer means, said transmission means including disengageable clutch means so that said transducer means may continue to rotate while said carriage is at rest to cause said transducer means to repeatedly scan a selected one of said record tracks, and manually operable means for rotating said feed screw when said clutch means is disengaged so as to select the record track to be repeatedly scanned.

34. An apparatus according to claim 33; in which said feed screw has a thread thereon, and said transmission means establishes a transmission ratio between said rotary transducer means and said feed screw with said clutch means engaged such that $P_S = mP_A$ in which $P_S$ is the pitch of said thread on the feed screw, $P_A$ is the pitch of said successive parallel record tracks, and *m is an integral number.*

35. An apparatus according to claim 1; in which said record assembly further includes another flexible sheet adapted to have audio signal information recorded thereon and being movable by said sheet driving means in respect to said cover means between said stored and operative positions; said rotary signal transducer means includes video signal transducer means and audio signal transducer means for scanning successive parallel record tracks on said one sheet and said other sheet, respectively; and said audio signal transducer means is rotated at a slower speed than said video signal transducer means so that said record tracks on said other sheet have a larger pitch than the record tracks on said one sheet.

36. An apparatus according to claim 35; in which said translating means includes an axially fixed, rotatable feed screw, threaded means engageable with said feed screw for moving said record assembly and said video and audio signal transducer means relative to each other in at least one of said directions parallel to said axis of rotation in response to rotation of said feed screw, transmission means extending between said audio signal transducer means and said feed screw for rotating the latter in response to rotation of said audio signal transducer means, disengageable clutch means interposed in said transmission means so that said transducer means may continue to rotate independently of said feed screw, and manually operable means for rotating said feed screw when said clutch means is disengaged so as to locate said video and audio transducer means relative to said one and other sheets, respectively; and in which, with said clutch means engaged, said transmission means establishes a transmission ratio between said audio transducer means and said feed screw such that $P_S = mP_A$ in which $P_S$ is the pitch of the thread on said feed screw, $P_A$ is the pitch of said successive parallel record tracks scanned by said audio transducer means on said other sheet, and *m* is an integral number.

37. An apparatus according to claim 1; in which said record assembly includes another flexible sheet adapted to have signal information recorded thereon and being movable with said one sheet by said sheet driving means between said stored and operative positions in respect to said cover means, said one sheet and said other sheet are substantially rectangular and have different widths, and said cover means is in the form of an envelope having an open end through which said one and other sheets are slidable with the side edges of said sheets being loosely guided by the adjacent sides of said envelope; and said rotary signal transducer means includes first transducer means movable in said one circular path and second transducer means movable in a second circular path about an axis spaced from, and parallel to said axis of said one circular path; and further comprising sheet separator means operative, upon the movement of said sheets from said stored positions, to separate said major portions of the sheets from each other on the basis of said different widths thereof and to direct said one sheet into said sheet guide means, and second sheet guide means receiving said other sheet from said separator means during movement of said other sheet to its operative position and guiding said major portion of said other sheet in an arcuate path substantially coinciding with at least a portion of said second circular path of the second transducer means.

38. An apparatus according to claim 37; further comprising a holder fixed relative to said separator means and the first mentioned and second sheet guide means for receiving and positioning said envelope substantially horizontally with the relatively wide sheet at the bottom and the relatively narrow sheet at the top; and in which said sheets are resiliently flexible to elastically resist deviation thereof from flat planes, said separator means includes a plate extending from said open end of the envelope positioned by said holder and having laterally spaced apart, downwardly curving extensions defining a cutout therebetween across the plate and which is substantially as wide as the top sheet so that the latter can move through said cutout while the bottom sheet is further deflected by the downwardly curving extensions at the opposite sides of said cutout for separating said top and bottom sheets, and said first and second sheet guide means have entry portions which open upwardly at spaced apart locations for receiving the respective sheets.

39. An apparatus according to claim 1; in which each said sheet is substantially rectangular and said cover means is constituted by a relatively rigid, substantially rectangular envelope having an open end through which each said sheet is slidable with the opposite side edges of the sheet being loosely guided by the adjacent sides of said envelope, a holder is fixed relative to said sheet guide means for receiving and positioning said envelope relative to said sheet guide means, and said sheet guide means includes parallel, spaced apart arcuate guide members defining respective guide grooves coinciding with said arcuate path and opening in the direction of said axis toward each other and at least at one end for slidably receiving said opposite side edges of the sheet when the latter is moved to said operative position.

40. An apparatus according to claim 39; in which each of said guide grooves has parallel, spaced apart wall surfaces between which the respective groove opens in said direction of the axis at one side of said wall surfaces and an end wall extending along said groove and closing the latter at the opposite side of said wall surfaces for laterally guiding the adjacent side edge of said sheet; and in which at least one of said guide members includes means for adjusting the plane of the respective end wall in relation to said axis of rotation.

41. An apparatus according to claim 40; in which the other of said guide members also includes means for adjusting the plane of the respective end wall in relation to said axis of rotation.

42. An apparatus according to claim 40; in which the other of said guide members includes resilient means for urging the adjacent side edge of the sheet toward said one guide member for maintaining guiding engagement of said end wall of said one guide member with said side edge of the sheet adjacent thereto.

43. An apparatus according to claim 1; in which said sheet is substantially rectangular and is engaged by said sheet guide means at the opposite side edges of the sheet, said signal transducer means project radially from the circumferential surface of a rotary, co-axial drum, and a sheet support member is fixed in the direction of said axis of rotation relative to said drum and has an arcuate surface confronting said circumferential surface of the drum with a clearance therebetween for accommodating said sheet, said arcuate surface of the sheet support member having a recess extending longitudinally therein in registration with said circular path of the signal transducer means so that the latter urge said sheet into said recess.

44. An apparatus according to claim 43; in which said signal transducer means are resiliently mounted on said drum so as to be movable in the radial direction in respect to the latter.

45. An apparatus according to claim 43; in which a stop member is mounted on said sheet support member for engagement by an end edge of said sheet in said operative position of the latter.

46. An apparatus according to claim 1; in which a holder is fixed relative to said sheet guide means for receiving and positioning said cover means thereon, said signal transducer means are selectively operable to record and reproduce signal information in said record tracks on said major portion of the sheet in said arcuate path, said cover means has a removable portion which, by its absence, indicates the recording on said sheet of signal information which is not to be erased, and means adjacent said holder for detecting the absence of said removable portion from the cover means positioned on said holder and for preventing the recording operation of said transducer means in response to said detecting.

47. An apparatus according to claim 1; in which each said sheet is substantially rectangular, said cover means is constituted by a relatively rigid, substantially rectangular envelope having an open end through which said sheet is slidable, and said envelope has notches in its opposite side portions at different distances from said open end; and further comprising a holder fixed relative to said sheet guide means and including a table on which said envelope is longitudinally slidable to and from a loaded position, spring operated means for yieldable urging said envelope away from said loaded position, and latches disposed adjacent the opposite sides of said table and being urged against the adjacent side portions of said envelope for engagement in said notches when said envelope is in said loaded position, whereby to hold said envelope in said loaded position against the force of said spring operated means, said latches being offset relative to each other in the longitudinal direction of said envelope so as to be engageable in said notches only when said envelope is in a predetermined orientation on said holder.

48. A record assembly comprising at least one substantially rectangular, flexible sheet adapted to have signal information recorded thereon, and a relatively rigid, substantially rectangular envelope having an open end through which said sheet is slidable between a stored position in which the sheet is substantially enclosed by said envelope and an operative position in which a major portion of said sheet extends out of said envelope and a minor portion of said sheet remains within said envelope, with the opposite side edges of said sheet being loosely guided by the adjacent sides of said envelope in the movement of said sheet between said stored and operative positions.

49. A record assembly according to claim 48; in which a limited area of said sheet is exposed even when said sheet is in said stored position so that said limited exposed area may be engaged for moving said sheet to said operative position.

50. A record assembly according to claim 49; in which said envelope has at least one cutout therein adjacent said open end and through which said limited area of the sheet is exposed in said stored position of the sheet.

51. A record assembly according to claim 50; in which each said cutout is positioned so that, in said stored and operative positions of the sheet, the opposite end edges, respectively, of the sheet extend across said cutout intermediate the ends of the latter.

52. A record assembly according to claim 51; in which said ends of the cutout extend at substantial angles to the transverse direction of the sheet for avoiding interference with movement of the sheet by engagement of the end edges of the latter with said ends of the cutout.

53. A record assembly according to claim 48; in which another flexible sheet adapted to have signal information recorded thereon is superposed on said one sheet and is movable independently of said one sheet in respect to said envelope between said stored and operative positions.

54. A record assembly according to claim 53; in which said envelope has opposed first and second walls with first and second openings therein adjacent said open end and being spaced from the longitudinal median of said envelope at oppostie sides of said median, and said one and other sheets have first and second cutouts, respectively, therein which, in said stored positions of the respective sheets, register with said first and second openings of the envelope.

55. A record assembly according to claim 53; in which said one and other sheets have respective laterally spaced end tabs which are exposed adjacent said open end of the envelope when said sheets are in the stored positions thereof so that said end tabs may be selectively engaged for moving the respective sheets to the operative positions thereof.

56. A record assembly according to claim 53; in which said one sheet and said other sheet have different widths, and said sides of the envelope define first and second sets of channels therealong opening toward each other with the lateral distances between said first set of channels and between said second set of channels being different to slidably accommodate the side edge portions of said one sheet and said other sheet in said first and second sets of channels, respectively.

57. A record assembly according to claim 48; in which said envelope has at least one removable portion adjacent an edge thereof for indicating, by its absence, that signal information recorded on said sheet is not to be erased.

58. A record assembly according to claim 48; in which said envelope has latching notches in the opposite side portions thereof at different distances from said open end.

* * * * *